US012732823B1

(12) United States Patent
Jonytis et al.

(10) Patent No.: US 12,732,823 B1
(45) Date of Patent: Sep. 8, 2026

(54) SECURE CHANNEL ESTABLISHMENT VIA CLIENT-SIDE PARSING OF CAPABILITY-BASED SECURITY PROFILES

(71) Applicant: UAB 360 IT, Vilnius (LT)

(72) Inventors: Mantas Jonytis, Grigiskes (LT); Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 19/380,586

(22) Filed: Nov. 5, 2025

Related U.S. Application Data

(60) Provisional application No. 63/893,060, filed on Oct. 3, 2025.

(51) Int. Cl.
*H04W 12/69* (2021.01)
*H04W 8/24* (2009.01)
*H04W 12/03* (2021.01)

(52) U.S. Cl.
CPC ............. *H04W 12/69* (2021.01); *H04W 8/24* (2013.01); *H04W 12/03* (2021.01)

(58) Field of Classification Search
CPC ........ H08W 12/69; H04W 8/24; H04W 12/03
USPC .......................................................... 380/264
See application file for complete search history.

(56) References Cited

U.S. PATENT DOCUMENTS 7,234,063 B1 6/2007 Baugher et al.
8,868,967 B2 * 10/2014 Wu .................... H04L 41/0677 714/4.2
9,215,075 B1 12/2015 Poltorak
9,871,771 B2 * 1/2018 Antonakakis ....... H04L 63/0428
10,728,234 B2 * 7/2020 Guo ...................... G06F 21/629
11,863,588 B2 1/2024 Bosch et al.
12,015,674 B2 6/2024 Pileckas et al.
12,333,574 B2 * 6/2025 Dhingra ............ G06Q 30/0276
2003/0105830 A1 6/2003 Pham et al.
2008/0112363 A1 * 5/2008 Rahman ................ H04W 8/005 370/331
2009/0089863 A1 4/2009 Vanniarajan
2018/0103018 A1 4/2018 Chauhan et al.
2022/0141191 A1 5/2022 Mehta et al.
2022/0174044 A1 6/2022 Konda et al.
2023/0156038 A1 * 5/2023 Konda ................. H04L 9/0643 713/151

(Continued)

FOREIGN PATENT DOCUMENTS

CA 3135131 A1 10/2020
CN 109379383 A 2/2019

(Continued)

*Primary Examiner* — Bryan F Wright
(74) *Attorney, Agent, or Firm* — Young Basile Hanlon & MacFarlane. P.C

(57) ABSTRACT

One or more capabilities of the client device are determined at the client device. A request for a security profile is transmitted from a client device to a remote server. The request includes information related to the one or more capabilities of the client device. The security profile, defining a set of communication parameters based on at least some of the one or more capabilities, is received at the client device from the remote server. The received security profile is interpreted by the client device to obtain instructions for establishing the secure communication channel. The secure communication channel with a second server is then established by the client device based on the instructions from the security profile.

20 Claims, 29 Drawing Sheets

(56) References Cited

U.S. PATENT DOCUMENTS

| | | | |
|---|---|---|---|
| 2024/0356849 | A1 | 10/2024 | Inbal |

FOREIGN PATENT DOCUMENTS

| | | | |
|---|---|---|---|
| CN | 109644129 | A | 4/2019 |
| WO | 2018075965 | A1 | 4/2018 |

* cited by examiner 200
220
222
224
226
228
230
232
210
212
214
216
218
238
242
202
NETWORK
240
236
204
234
206
208

FIG. 11

SECURE CHANNEL ESTABLISHMENT VIA CLIENT-SIDE PARSING OF CAPABILITY-BASED SECURITY PROFILES

CROSS REFERENCE TO RELATED APPLICATIONS

This application claims the benefit of and priority to U.S. Provisional Patent Application Ser. No. 63/893,060, filed Oct. 3, 2025, the entire disclosure of which is incorporated herein by reference.

FIELD

This application relates generally to dynamic configuration in secure communication networks, and more specifically to capability-based secure communication channel establishment for client devices.

SUMMARY

Disclosed herein are one or more examples of implementations of capability-based secure communication channel establishment for client devices in dynamic cryptographic configuration systems.

One aspect of the disclosed implementations relates to a method for establishing a secure communication channel from a client device. The method includes determining, at the client device, one or more capabilities of the client device; transmitting, from the client device to a remote server, a request for a security profile, the request including information related to the determined capabilities; receiving, at the client device, the security profile from the remote server, wherein the security profile defines a set of communication parameters based on the determined capabilities; interpreting, by the client device, the received security profile to obtain instructions for establishing the secure communication channel; and establishing, by the client device, the secure communication channel with a second server based on the instructions from the security profile.

One aspect of the disclosed implementations relates to a device that includes a memory subsystem and processing circuitry. The processing circuitry is configured to execute instructions stored in the memory subsystem to determine, at a client device, one or more capabilities of the client device; transmit, from the client device to a remote server, a request for a security profile, the request including information related to the determined capabilities; receive, at the client device, the security profile from the remote server, wherein the security profile defines a set of communication parameters based on the determined capabilities; interpret, by the client device, the received security profile to obtain instructions for establishing a secure communication channel; and establish, by the client device, the secure communication channel with a second server based on the instructions from the security profile.

One aspect of the disclosed implementations relates to one or more non-transitory computer-readable storage media including instructions that, when executed by one or more processors, perform operations for establishing a secure communication channel from a client device. The operations include determining, at the client device, one or more capabilities of the client device; transmitting, from the client device to a remote server, a request for a security profile, the request including information related to the determined capabilities; receiving, at the client device, the security profile from the remote server, wherein the security profile defines a set of communication parameters based on the determined capabilities; interpreting, by the client device, the received security profile to obtain instructions for establishing the secure communication channel; and establishing, by the client device, the secure communication channel with a second server based on the instructions from the security profile.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 11 is a flowchart of an example of a technique for managing requests for cryptographic components by providing mechanisms for hash checking and binary downloads based on client authorization and target architecture requirements.

DETAILED DESCRIPTION

Figure 1:
FIG. 1 is a block diagram of an example of a computing device.
Figure 1:
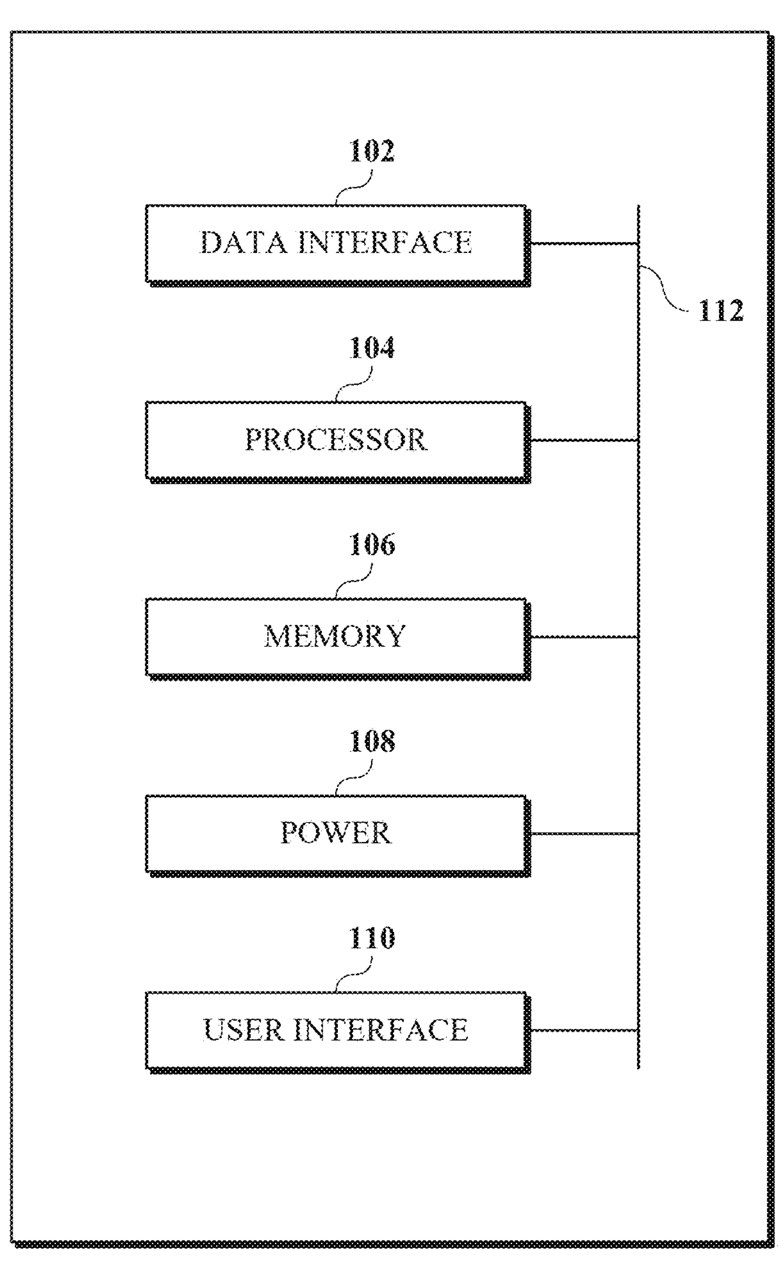

Virtual Private Network (VPN) systems provide secure communication channels over public networks by implementing cryptographic protocols and algorithms to protect data transmission between client devices and remote servers. These computer-implemented systems rely on cryptographic operations including encryption, hashing, and digital signature algorithms to ensure confidentiality, integrity, and authentication of network communications. A key technical challenge in this domain is maintaining security and performance as cyber threats evolve and cryptographic research advances.

Existing VPN implementations typically employ static cryptographic configurations that are hard-coded or manually configured within client and server software and remain fixed from installation until the software is replaced or upgraded. Current VPN clients implementing protocols such as Transport Layer Security (TLS), Internet Protocol Security (IPsec), Open VPN, or WireGuard utilize predetermined sets of cryptographic algorithms that cannot be modified after the software has been installed and is running on client devices, requiring complete application reinstallation to modify or enhance cryptographic capabilities. This rigid approach results in significant security vulnerabilities due to the inability to rapidly adapt to emerging threats and evolving cryptographic standards.

Current secure communication implementations face technical challenges when cryptographic vulnerabilities are discovered or when new cryptographic standards are adopted. Additionally, current implementations face particular vulnerabilities as the cryptographic landscape evolves toward post-quantum standards, with the approaching "quantum cliff" potentially rendering traditional cryptographic methods obsolete. Consequently, when a cryptographic algorithm, protocol, and/or implementation is compromised, existing secure communication deployments are often paralyzed, unable to transition to secure alternatives without lengthy and complex software update cycles. This creates a single point of failure where every instance using the compromised algorithm, protocol, and/or implementation is exposed to potential exploitation, jeopardizing the security of all protected data. The process of deploying new cryptographic algorithms may thus necessitate complete application replacement involving multiple layers of validation and distribution, creating substantial lag time between vulnerability discovery and security update deployment.

The static nature of current cryptographic implementations prevents VPN implementations from optimizing performance based on varying hardware capabilities. Existing VPN clients cannot dynamically select cryptographic algorithms and/or protocols based on available hardware acceleration features such as AES-NI instruction sets or Trusted Platform Module (TPM) capabilities. A single, predetermined cryptographic configuration cannot be optimized for varying device capabilities, causing implementations to default to generic software-based algorithms that create suboptimal performance even when devices possess, for example, dedicated cryptographic processors or hardware acceleration capabilities for specific encryption standards such as Advanced Encryption Standard (AES).

Current secure communication systems create operational challenges for network administrators who must manage cryptographic policy compliance across diverse client populations. Existing implementations require manual configuration management and coordinated software deployments to implement cryptographic policy changes, creating administrative overhead and increasing the likelihood of configuration errors. These limitations become particularly problematic in enterprise environments where cryptographic requirements may vary based on user roles, device types, security contexts, and regulatory requirements such as Federal Information Processing Standards (FIPS) and international information security management ISO 27001 and implementation guidelines ISO 27002 standards, yet current secure communication implementations lack mechanisms to dynamically select appropriate algorithms based on specific device capabilities or adapt to diverse security requirements without extensive manual intervention.

Implementations according to this disclosure solve problems such as these by providing a cryptographically agile VPN system that enables dynamic adaptation of cryptographic configurations without requiring software reinstallation or application replacement. The disclosed subject matter introduces a comprehensive framework for establishing secure VPN connections through intelligent selection and execution of profiles, where each profile defines a specific combination of cryptographic algorithms, protocols, and operational parameters tailored to particular hardware capabilities and security requirements.

The system provides for cryptographic agility, wherein various parameters and components can be dynamically updated without requiring a full reinstallation of client software, thereby enabling adaptation to changing security requirements, network conditions, and hardware capabilities. Aspects of the system that can be dynamically configured include, but are not limited to: 1) User Identity and Authentication: Management of user credentials, authentication methods (including multi-factor authentication), and cryptographic key lifecycle operations such as creation, rotation, and revocation; 2) Device Security Policies: Enforcement of device-specific policies, such as limiting access or features based on the device's security posture and support for external cryptographic hardware; 3) Cryptographic Algorithms and Protocols: Dynamic updates to the set of supported cryptographic algorithms and communication protocols, allowing for the addition of new standards or the deprecation of obsolete ones; 4) Hardware and Performance Optimization: The ability to detect and utilize specific hardware features, such as cryptographic accelerators (e.g., AES-NI), and to select optimal cryptographic libraries based on the underlying device architecture to improve performance; and 5) Tamper Resistance and Integrity Verification: tamper resistance through build-in client-side hash calculation and comparison against server-side reference values, enabling automated detection of unauthorized modifications to components and files.

An object of the disclosed system is to provide automated cryptographic component management that maintains system security through continuous monitoring and integration of updated cryptographic elements without manual intervention. The system automatically downloads and validates updated algorithms, libraries, and profiles and/or protocols when they become available, ensuring that secure communication systems can rapidly adopt stronger encryption methods and respond to newly discovered vulnerabilities. This automated approach substantially reduces the lag time between vulnerability discovery and security update deployment that characterizes existing implementations, while reducing the administrative burden by narrowing the set of stakeholders involved in the process. This approach enables cryptographic capabilities to be updated seamlessly without involving application developers or disrupting the application development lifecycle.

Another object of the disclosed system is to optimize secure communication system performance through hardware-aware cryptographic selection that leverages available acceleration capabilities on client devices. The system determines hardware capabilities including integrated circuit microprocessor properties such as the number of central processing units (CPU), support of CPU-level multithreading, instruction set architecture (ISA), as well as hardware acceleration features such as Advanced Encryption Standard New Instructions (AES-NI), the presence of coprocessors such as Trusted Platform Module (TPM), as well as network metrics such as carrier type, latency and bandwidth. Based on these capabilities, the system selects optimal cryptographic configurations that maximize performance while maintaining security requirements, thereby eliminating the suboptimal performance that results when systems default to generic software-based algorithms on capable hardware.

The disclosed system for cryptographic agility implements a state machine architecture for executing cryptographic protocols through a systematic approach that loads profiles, parses them into executable instructions, and orchestrates the precise sequence of cryptographic operations required for VPN connection establishment. The profile state machine transitions through distinct connection states corresponding to different phases of the VPN establishment process, including initialization, handshake, data exchange, and termination phases, with each state defining specific cryptographic operations that must be performed to advance the connection process. This modular architecture provides a robust and flexible framework for secure communication that is adaptable, efficient, and resilient to a changing threat landscape.

Server-side infrastructure supports the cryptographic agility framework by providing intelligent profile generation capabilities that respond to client requests with optimized configurations. The system receives profile requests containing client hardware capabilities and connection requirements, determines compatibility with existing profiles, and generates custom profiles. Machine learning (ML) may be used to generate a profile. The ML may be a large language model (LLM) or some other ML model. Generating a profile can involve selecting from predefined templates, customizing existing profiles, or creating entirely new profiles, with validation against security and compliance policies to ensure appropriate configuration for specific hardware combinations and security contexts.

The teachings herein for cryptographic agility provide comprehensive management of cryptographic resources through modular subsystems that handle testing of hardware capabilities, updating of cryptographic components, creation and adaptation of profiles, and local storage of cached configurations. These subsystems operate collaboratively to ensure that VPN clients maintain current cryptographic capabilities while optimizing performance based on real-time assessment of device capabilities and security requirements. The system includes features such as caching received profiles for future use and implementing fallback procedures if primary security settings fail, thereby providing a robust foundation for long-term cryptographic agility in dynamic network environments.

While cryptographic agility is described herein mainly in the context of VPNs, the teachings herein are not so limited and may apply to various secure communication systems. The disclosed cryptographic agility framework can be applied to any computer-implemented system that requires secure communication channels and would benefit from dynamic adaptation of cryptographic parameters based on device capabilities, security requirements, or changing threat landscapes. Internet of Things (IoT) devices, such as smart home appliances or industrial sensors with limited processing power, may automatically update their encryption methods without manual firmware updates, with the system selecting efficient algorithms based on each device's computational constraints. Web browsers may dynamically select optimal TLS configurations for different websites, using high-security profiles for banking sites and low-latency profiles for streaming services. Secure messaging applications may seamlessly transition to new end-to-end encryption protocols as they are developed, while point-of-sale terminals and banking applications could adjust security levels based on transaction types and device capabilities. Gaming and streaming applications may balance security and performance requirements by selecting hardware-accelerated cryptographic algorithms that maintain low latency without compromising protection.

The term "agilability," as used herein, refers to the capability of individual system components, parameters, and operational elements to be dynamically modified, updated, or reconfigured without requiring complete system reinstallation or service interruption. Implementations according to this disclosure provide agilability for components including but are not limited to cryptographic algorithms, protocol specifications, key management parameters, device configurations, security policies, and authentication mechanisms. This agilability extends across multiple system layers including user identity management, device security policies, cryptographic implementations, and hardware optimization features, enabling comprehensive adaptation to changing security requirements and operational conditions.

To describe some implementations in greater detail, reference is first made to examples of hardware and software structures used to implement capability-based secure communication channel establishment for client devices in dynamic cryptographic configuration systems. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium. In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), UV, visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hardwired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

Figure 2:
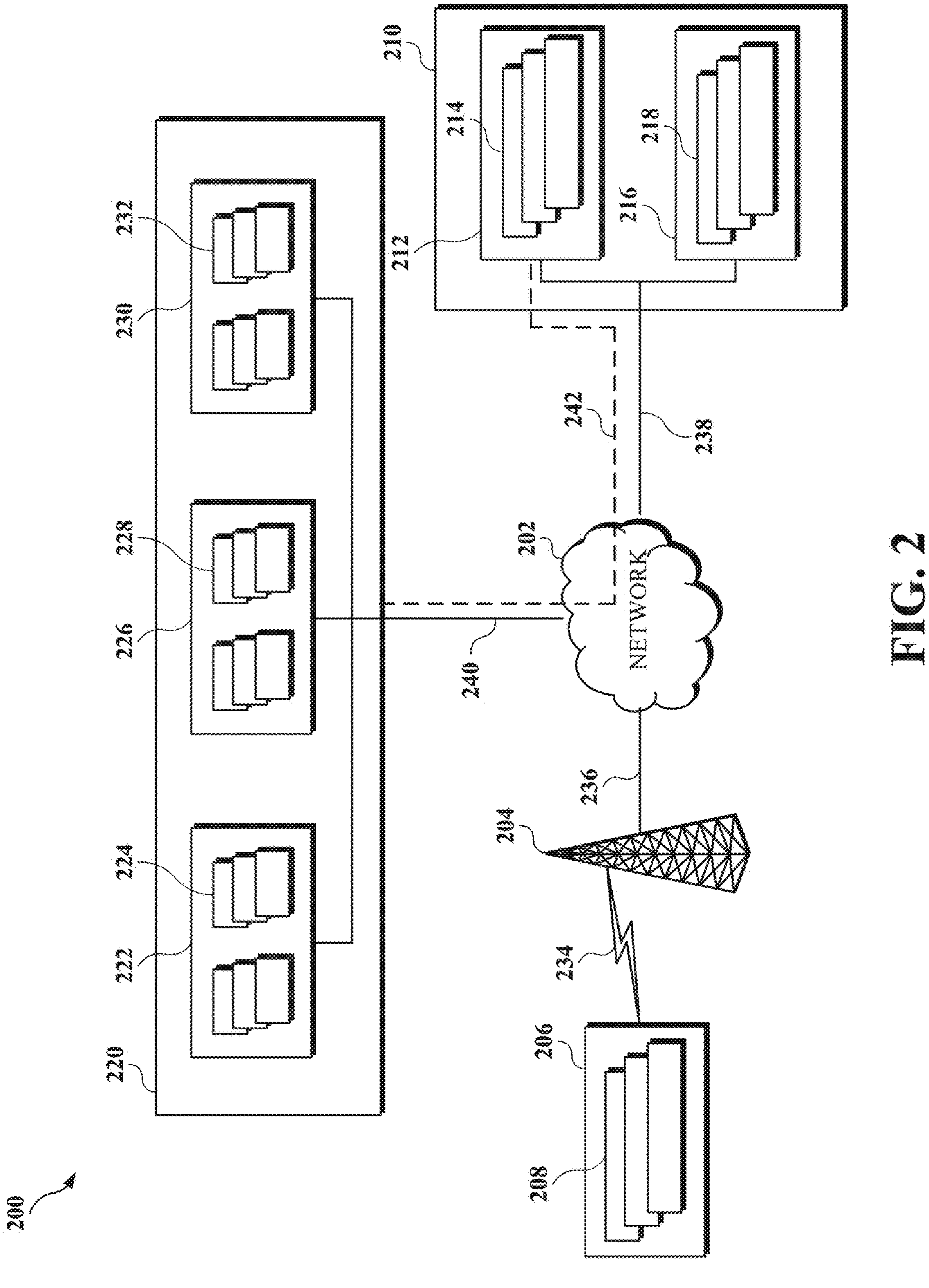
FIG. 2 is a block diagram of an example of a computing and communications system.

FIG. 2 is a diagram of an example of a computing and communications system 200. The computing and communications system 200 includes a first network 202, an access point 204, a first computing and communications device 206, a second network 210, and a third network 220. The second network 210 includes a second computing and communications device 212 and a third computing and communications device 216. The third network 220 includes a fourth computing and communications device 222, a fifth computing and communications device 226, and a sixth computing and communications device 230. Other configurations, including fewer or more computing and communications devices, fewer or more networks, and fewer or more access points, may be used.

One or more of the networks 202, 210, 220 may be, or may include, a local area network (LAN), wide area network (WAN), virtual private network (VPN), a mobile or cellular telephone network, the Internet, or any other means of electronic communication. The networks 202, 210, 220 respectively transmit, receive, convey, carry, or exchange wired or wireless electronic communications using one or more communications protocols, or combinations of communications protocols, the transmission control protocol (TCP), the UDP, the internet protocol (IP), the real-time transport protocol (RTP), the HyperText Transport Protocol (HTTP), or a combination thereof. For example, a respective network 202, 210, 220, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 204 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 204 is shown as a single unit, an access point can include any number of interconnected elements. Although one access point (i.e., the access point 204) is shown, fewer or more access points may be used. The access point 204 may communicate with other communicating devices via wired or wireless electronic communications links or via a sequence of such links.

As shown, the access point 204 communicates via a first communications link 234 with the first computing and communications device 206. Although the first communications link 234 is shown as wireless, the first communications link 234 may be implemented as, or may include, one or more wired or wireless electronic communications links or a sequence of such links, which may include parallel communications links for multipath communications.

As shown, the access point 204 communicates via a second communications link 236 with the first network 202. Although the second communications link 236 is shown as wired, the second communications link 236 may be implemented as, or may include, one or more wired or wireless electronic communications links or a sequence of such links, which may include parallel communications links for multipath communications.

As shown, the first network 202 communicates with the second network 210 via a third communications link 238. Although the third communications link 238 is shown as wired, the third communications link 238 may be implemented as, or may include, one or more wired or wireless electronic communications links or a sequence of such links, which may include parallel communications links for multipath communications.

As shown, the first network 202 communicates with the third network 220 via a fourth communications link 240. Although the fourth communications link 240 is shown as wired, the fourth communications link 240 may be implemented as, or may include, one or more wired or wireless electronic communications links or a sequence of such links, which may include parallel communications links for multipath communications.

The computing and communications devices 206, 212, 216, 222, 226, 230 are, respectively, computing devices, such as the computing device 100 shown in FIG. 1. For example, the first computing and communications device 206 may be a user device, such as a mobile computing device or a smartphone, the second computing and communications device 212 may be a user device, such as a laptop, the third computing and communications device 216 may be a user device, such as a desktop, the fourth computing and communications device 222 may be a server, such as a database server, the fifth computing and communications device 226 may be a server, such as a cluster or a mainframe, and the sixth computing and communications device 230 may be a server, such as a web server.

The computing and communications devices 206, 212, 216, 222, 226, 230 communicate, or exchange data, such as voice communications, audio communications, data communications, video communications, messaging communications, broadcast communications, or a combination thereof, with one or more of the other computing and communications devices 206, 212, 216, 222, 226, 230 respectively using one or more of the networks 202, 210, 220, which may include communicating using the access point 204, via one or more of the communications links 234, 236, 238, 240.

For example, the first computing and communications device 206 may communicate with the second computing and communications device 212, the third computing and communications device 216, or both, via the first communications link 234, the access point 204, the second communications link 236, the network 202, the third communications link 238, and the second network 210. The first computing and communications device 206 may communicate with one or more of the third computing and communications device 222, the fourth computing and communications device 226, the fifth computing and communications device 226, via the first communications link 234, the access point 204, the second communications link 236, the network 202, the fourth communications link 240, and the third network 220.

For simplicity and clarity, the sequence of communications links, access points, networks, and other communications devices between a sending communicating device and a receiving communicating device may be referred to herein as a communications path. For example, the first computing and communications device 206 may send data to the second computing and communications device 212 via a first communications path, or via a combination of communications paths including the first communications path, and the second computing and communications device 212 may send data to the first computing and communications device 206 via the first communications path, via a second communications path, or via a combination of communications paths, which may include the first communications path.

The first computing and communications device 206 includes, such as executes, performs, or operates, one or more applications or services 208. The second computing and communications device 212 includes, such as executes, performs, or operates, one or more applications or services 214. The third computing and communications device 216 includes, such as executes, performs, or operates, one or more applications or services 218. The fourth computing and communications device 222 includes, such as stores, hosts, executes, performs, or operates, one or more documents, applications or services 224. The fifth computing and communications device 226 includes, such as stores, hosts, executes, performs, or operates, one or more documents, applications, or services 228. The sixth computing and communications device 230 includes, such as stores, hosts, executes, performs, or operates, one or more documents, applications or services 232.

In some implementations, one or more of the computing and communications devices 206, 212, 216, 222, 226, 230 may communicate with one or more other computing and communications devices 206, 212, 216, 222, 226, 230, or with one or more of the networks 210, 220, via a virtual private network. For example, the second computing and communications device 212 is shown as communicating with the third network 220, and therefore with one or more of the computing and communications devices 222, 226, 230 in the third network 220, via a virtual private network 242, which is shown using a broken line to indicate that the virtual private network 242 uses the first network 202, the third communications link 238, and the fourth communications link 240.

In some implementations, two or more of the computing and communications devices 206, 212, 216, 222, 226, 230 may be in a distributed, or clustered, configuration. For example, the third computing and communications device 222, the fourth computing and communications device 226, and the fifth computing and communications device 226 may, respectively, be elements, or nodes, in a distributed configuration.

In some implementations, one or more of the computing and communications devices 206, 212, 216, 222, 226, 230 may be a virtual device. For example, the third computing and communications device 222, the fourth computing and communications device 226, and the fifth computing and communications device 226 may, respectively, be virtual devices operating on shared physical resources.

Figure 3:
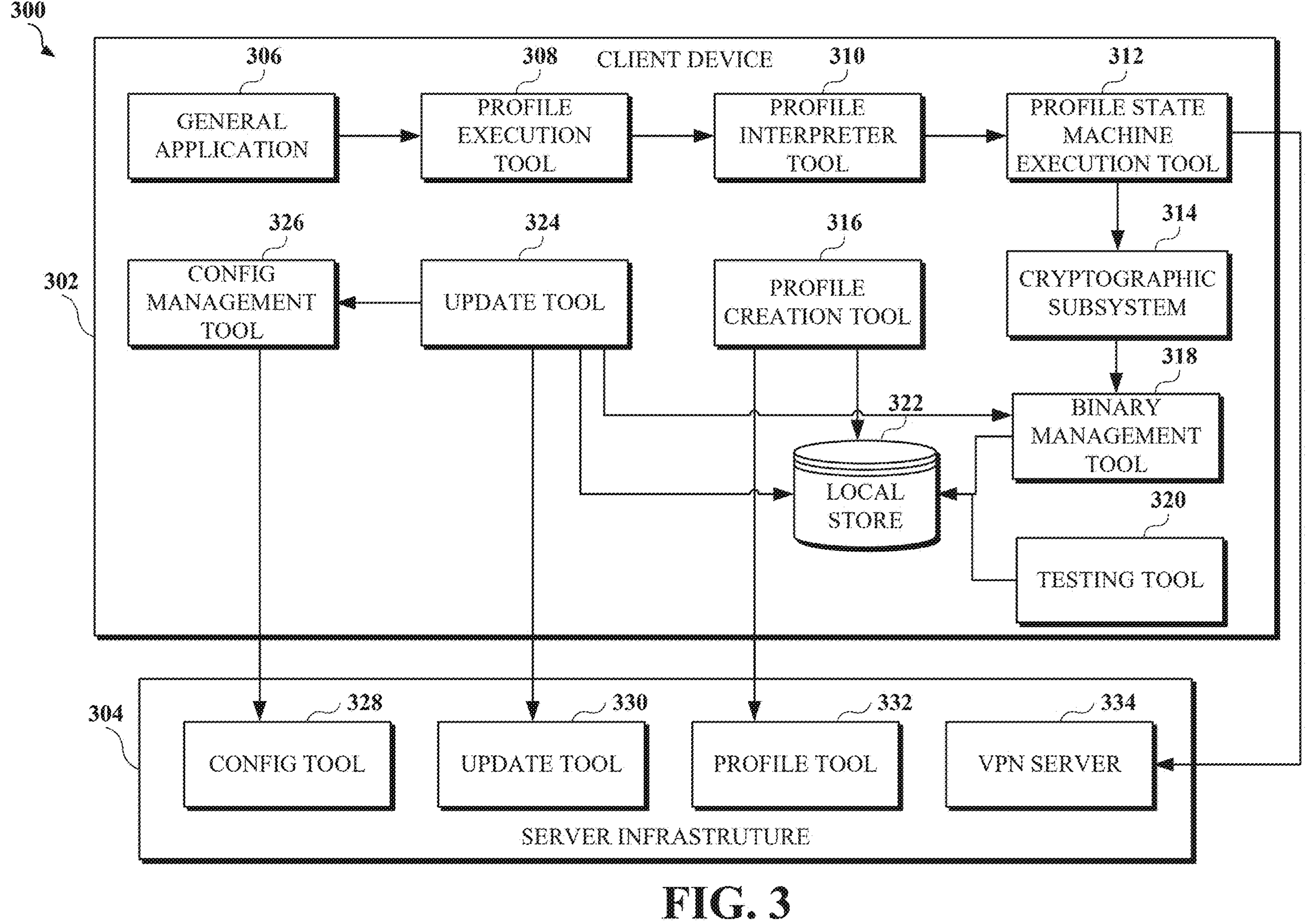
FIG. 3 is a high-level diagram of a system for providing cryptographic agility in secure communication networks.

FIG. 3 is a high-level diagram of a system 300 for providing cryptographic agility in secure communication networks. The system 300 is shown as including a client device 302 and a server infrastructure 304 that may include one or more service devices. The components shown in FIG. 3 may be implemented using the computing and communications infrastructure described with respect to FIG. 2. The client device 302 may be the user device 206 of FIG. 2. The server infrastructure 304 may be implemented across one or more networks, such as the second network 210 of FIG. 2, with various components distributed across computing devices such as the computing and communications devices 212, 216 shown in FIG. 2.

The client device 302 and the server infrastructure 304 are shown as including tools, such as engines, applications, servers, modules, programs, subprograms, functions, routines, subroutines, operations, executable instructions, and/or the like for, inter alia and as further described below, establishing dynamically configurable secure VPN connections through intelligent profile selection and execution.

At least some of the tools of the client device 302 and the server infrastructure 304 can be implemented as respective software programs that may be executed by one or more computing devices. A software program can include machine-readable instructions that may be stored in a memory, and that, when executed by a processor, may cause the computing device to perform the instructions of the software program. These tools are designed to interact with external systems, client infrastructure, and various internal components to achieve intelligent orchestration and seamless integration of cryptographic capabilities.

As shown, the client device 302 includes general application 306, profile execution tool 308, profile interpreter tool 310, profile state machine execution tool 312, cryptographic subsystem 314, profile creation tool 316, binary management tool 318, testing tool 320, local store 322, update tool 324, config management tool 326. As shown, the server infrastructure 304 includes config tool 328, update tool 330, profile tool 332, VPN server 334.

The general application 306 may represent a client-side application that requires secure communication or cryptographic capabilities, such as a VPN client, a secure messaging application, or an IoT control interface. The general application 306 may include user authentication interfaces, connection status displays, server selection menus, and system preference panels. The general application 306 may present a graphical interface enabling users to initiate VPN connections, monitor connection status, or configure application settings. The general application 306 may initiate connection requests by communicating with the profile execution tool 308 and may receive status updates and notifications from various subsystem components throughout the connection establishment process.

The profile execution tool 308 may be configured to orchestrate the lifecycle of protocol profile execution from loading and validation through execution monitoring and optimization. The profile execution tool 308 may coordinate between multiple subsystem tools to ensure proper sequencing of cryptographic operations and connection establishment procedures. For example, the profile execution tool 308 may load profiles from the local store 322, validate compatibility with current hardware capabilities, and monitor execution progress to detect and respond to connection failures. The profile execution tool 308 may communicate with the profile interpreter tool 310 to process profile definitions and with the profile state machine execution tool 312 to manage connection state transitions.

The profile interpreter tool 310 may be configured to parse, validate, and transform protocol profile definitions from their stored format into executable instructions for the profile state machine execution tool 312. The profile interpreter tool 310 may convert high-level profile specifications into low-level cryptographic operation sequences, validate profile syntax and semantic correctness, and optimize instruction sequences for target hardware architectures. For example, the profile interpreter tool 310 may translate XML or JSON-based profile definitions into binary instruction formats, verify that specified algorithms are supported by available cryptographic libraries, or reorder operations to improve hardware acceleration utilization. The profile interpreter tool 310 may include a just-in-time compiler that generates native code from profile definitions, a domain-specific language interpreter for custom profile scripting, or a template-based processor that instantiates profiles from predefined patterns with parameter substitution. The profile interpreter tool 310 may receive profile data from the profile execution tool 308 and provide processed instructions to the profile state machine execution tool 312.

The profile state machine execution tool 312 may be configured to execute the protocol flow by maintaining connection state and orchestrating the predetermined sequence of cryptographic operations defined by the profile. The profile state machine execution tool 312 may transition through distinct connection phases including initialization, handshake, data exchange, and termination states, with each state defining specific cryptographic operations and transition conditions. For example, the profile state machine execution tool 312 may perform initial key generation in the initialization state, execute certificate validation and key exchange protocols in the handshake state, and manage data encryption and decryption operations in the data exchange state. The profile state machine execution tool 312 may utilize the cryptographic subsystem 314 for performing cryptographic operations and may communicate with the VPN server 334 to establish and maintain secure connections.

The cryptographic subsystem 314 may provide a consistent application programming interface (API) for the general application 306 to perform cryptographic tasks, regardless of whether the operations are executed by native optimized libraries, virtual machine modules, or embedded fallback code. The cryptographic subsystem 314 may abstract differences between various cryptographic libraries and provide both synchronous and asynchronous operation modes for different types of cryptographic functions. For example, the cryptographic subsystem 314 may offer synchronous operations like encrypt( ), decrypt( ), hash( ), and sign( ) that return results directly, as well as asynchronous APIs for complex, time-consuming operations like async_handshake( ), async_key_exchange( ), and async_encrypt( ), that use callbacks or promises for non-blocking execution.

The cryptographic subsystem 314 may implement a plugin architecture that supports dynamic loading of cryptographic providers, a hardware abstraction layer that automatically utilizes available cryptographic accelerators, or a distributed cryptographic service that offloads computationally intensive operations to dedicated hardware security modules. The cryptographic subsystem 314 may receive cryptographic libraries and algorithms from the binary management tool 318 and may be utilized by the profile state machine execution tool 312 for executing protocol-specific cryptographic operations.

The cryptographic subsystem 314 may support algorithm families including but not limited to advanced encryption standard (AES), Salsa20 and the closely related ChaCha stream ciphers, Ascon-Based Lightweight Cryptography Standards for Constrained Devices, RSA (Rivest-Shamir-Adleman) cryptosystem, digital signature algorithm (DSA) and its variant elliptic curve digital signature algorithm (ECDSA), and Edwards-curve Digital Signature Algorithm (EdDSA). The cryptographic subsystem 314 may also support cryptographic hash functions (such as SHA and Blake) and message authentication codes (such as Poly1305), as well as post-quantum cryptography (PQ) standards such as FIPS 203 Module-Lattice-Based Key-Encapsulation Mechanism (ML-KEM) and FIPS 204 Module-Lattice-Based Digital Signature Algorithm (ML-DSA).

The profile creation tool 316 may be configured to manage protocol logic by creating, adapting, and managing detailed instructions for secure connections based on testing results and server configurations. The profile creation tool 316 may analyze hardware capabilities provided by the testing tool 320, apply security policies from the config management tool 326, and generate optimized profiles tailored to specific connection requirements and device characteristics. For example, the profile creation tool 316 may create performance-optimized profiles for gaming applications that prioritize low latency, security-focused profiles for financial transactions that maximize encryption strength, or resource-constrained profiles for IoT devices with limited computational capabilities. The profile creation tool 316 may include a machine learning-based optimizer that learns from historical performance data to improve profile selection, a collaborative filtering system that recommends profiles based on similar device configurations and usage patterns, or a genetic algorithm-based generator that evolves optimal profile parameters through iterative testing and refinement. The profile creation tool 316 may store generated profiles in the local store 322 and may interact with the profile tool 332 in the server infrastructure 304 to obtain templates and validation for custom profile generation.

The binary management tool 318 may be configured to acquire, verify, and maintain cryptographic implementation binaries configured for specific hardware architectures and feature sets. The binary management tool 318 may download platform-specific cryptographic libraries from the server infrastructure 304, verify digital signatures and integrity checksums, and manage version control and compatibility validation for cryptographic components. For example, the binary management tool 318 may maintain separate binaries for x86 architectures with AES-NI support, ARM processors with cryptographic extensions, and generic fallback implementations for unsupported hardware configurations. The binary management tool 318 may include a just-in-time compilation system that generates optimized code for specific hardware configurations, a containerized deployment mechanism that isolates cryptographic libraries in secure execution environments, or a distributed caching system that shares verified binaries across organizational network segments to reduce download bandwidth and latency. The binary management tool 318 may receive update notifications from the update tool 324 and may provide cryptographic libraries to the cryptographic subsystem 314 for utilization in secure communication operations.

The testing tool 320 may determine the hardware configuration and performance capabilities of the client device 302 to enable suitable cryptographic algorithm selection and system configuration. The testing tool 320 may perform hardware capability detection, benchmark cryptographic operation performance, and cache results to avoid redundant testing while providing mechanisms for forced re-testing when hardware configurations change. For example, the testing tool 320 may detect the presence of hardware-based cryptographic accelerators such as AES-NI instructions, ARM v8-A Cryptographic Extension security extensions, or dedicated cryptographic coprocessors, and measure the performance characteristics of various encryption algorithms on the specific hardware configuration.

The testing tool 320 may implement continuous monitoring that adapts to changing system conditions such as thermal throttling or power management states, a comparative benchmarking framework that evaluates multiple cryptographic libraries against standardized performance metrics. The testing tool 320 may implement predictive modeling that estimates performance characteristics for untested algorithm combinations based on hardware specifications and historical data. The testing tool 320 may store capability and performance data in the local store 322 and may provide hardware information to the profile creation tool 316 for generating optimized profiles.

The local store 322 may be used to provide persistent storage for cached hardware capability data, cryptographic binaries, and protocol profile definitions utilized by various client-side components. The local store 322 may implement encrypted storage mechanisms to protect sensitive configuration data, caching strategies to optimize data retrieval performance, and synchronization protocols to maintain consistency across multiple application instances or device configurations. The local store 322 may receive data from multiple client-side tools including the testing tool 320, the profile creation tool 316, and the binary management tool 318, while providing cached information to support efficient system operation and reduced network communication requirements.

The update tool 324 may be configured to coordinate the updating of all cryptographic components by checking for new versions of libraries, profiles, and configurations, handling smart downloads using hash checking mechanisms to minimize bandwidth utilization. The update tool 324 coordinates cryptographic component updates through the local store 322 and binary management tool 318, while maintaining configuration synchronization with the config management tool 326 and server infrastructure update tool 330.

The update tool 324 may implement a three-tier system architecture that attempts to use native optimized cryptographic libraries first, falls back to virtual machine implementations as an intermediate option, and maintains embedded backup cryptographic components as a last resort to facilitate system availability. For example, the update tool 324 may periodically query the update tool 330 in the server infrastructure 304 for available updates, compare local component versions with available updates using cryptographic hash comparisons, and download only modified components to reduce network traffic and update installation time. The update tool 324 may communicate with the update tool 330 in the server infrastructure 304 to obtain updates and may coordinate with the binary management tool 318 to install and validate updated cryptographic components.

The config management tool 326 may be configured to handle the retrieval, validation, and maintenance of configuration data for the client device 302. The config management tool 326 may manage user preferences, security policies, network settings, and administrative policies received from the server infrastructure 304. For example, the config management tool 326 may store and validate organizational compliance requirements, user access controls, or device-specific restrictions. The config management tool 326 may include a distributed configuration manager that synchronizes settings across multiple client applications, a policy enforcement engine that validates configuration changes against security requirements, or a configuration templating system that applies standardized settings based on device types or user roles. The config management tool 326 may communicate with the config tool 328 in the server infrastructure 304 to obtain updated configuration parameters and to facilitate compliance with organizational policies.

The config tool 328 in the server infrastructure 304 may be configured to handle client configuration requests by applying organizational policies, filtering algorithms based on hardware capabilities, and enforcing compliance requirements across diverse client populations. The config tool 328 may maintain policy databases that define cryptographic requirements for different user roles, device types, and security contexts, and may dynamically generate configuration parameters that satisfy both security requirements and hardware constraints reported by client devices. For example, the config tool 328 may be configured to enforce minimum encryption key lengths for financial services applications, restrict certain cryptographic algorithms for export control compliance, or require specific authentication factors based on user access levels and data sensitivity classifications.

The config tool 328 may implement a rule-based expert system that applies complex policy logic to generate appropriate configurations, a machine learning-based system that optimizes configurations based on historical performance and security metrics, or a federated configuration service that coordinates policy enforcement across multiple organizational domains and jurisdictions. The config tool 328 may respond to requests from the config management tool 326 and may coordinate with other server infrastructure components to facilitate consistent policy application across the distributed system architecture.

The update tool 330 in the server infrastructure 304 may be configured to manage requests for cryptographic components by providing mechanisms for, inter alia, hash checking and binary downloads based on client authorization and target architecture requirements. In an implementation, the update tool 330 may process Hypertext Transfer Protocol (HTTP) HEAD requests for hash checking and GET requests for binary downloads. The update tool 330 may implement and/or maintain cryptographic signatures for components distributed to client devices to ensure integrity and authenticity, and support differential updates to minimize bandwidth requirements for incremental component modifications. For example, the update tool 330 may serve architecture-specific cryptographic libraries optimized for different processor families, provide incremental updates that modify only changed functions within large cryptographic libraries, or implement bandwidth throttling and prioritization mechanisms to manage network resource utilization during peak update periods.

The update tool 330 may include a distributed mirror system that replicates updates across multiple geographic regions to reduce latency and improve availability, a version control system that maintains historical component versions to support rollback operations when compatibility issues arise, or an automated testing framework that validates component functionality and compatibility before making updates available to client populations. The update tool 330 may respond to requests from the update tool 324 and may coordinate with the binary management and cryptographic subsystem components to facilitate proper component distribution and installation.

The profile tool 332 may be configured to handle profile requests from client devices by returning cached compatible profiles, adapting existing profiles for specific hardware constraints, or generating custom profiles through machine learning integration when standard profiles are insufficient for specific client requirements. The profile tool 332 may maintain a repository of template profiles optimized for common use cases and hardware configurations, implement adaptation algorithms that modify existing profiles to accommodate specific client limitations or requirements, and integrate with machine learning models such as one or more LLMs to generate novel profile configurations for unusual or complex client scenarios. For example, the profile tool 332 may provide pre-optimized profiles for common scenarios such as mobile device connections with limited battery life, high-throughput data transfer applications requiring maximum performance, or high-security applications requiring enhanced encryption and authentication mechanisms.

The profile tool 332 may include a collaborative filtering system that recommends profiles based on similar client configurations and historical performance data, a genetic programming approach that evolves suitable profile parameters through iterative testing and evaluation, or a constraint satisfaction solver that generates profiles meeting complex requirements involving multiple competing objectives such as security, performance, and resource utilization. The profile tool 332 may respond to requests from the profile creation tool 316 and may utilize machine learning models and template databases to generate appropriate profiles for diverse client requirements and capabilities.

The system 300 may provide comprehensive agilability across multiple system domains. User identity and authentication agilability may encompass, without limitation, one or more of long-term and ephemeral cryptographic keys, signature keys with configurable validity periods based on time or usage counts, dynamic key creation and registration processes, automated key rotation and revocation procedures, and flexible key size management supporting minimal required, maximum supported, and preferred default key lengths. The system 300 may support device creation and registration, device revocation capabilities, and device-specific limitations that may restrict available options based on device characteristics. Multi-factor authentication agilability may include configurable acceptable authentication factors and support for external cryptographic devices such as hardware security keys and authenticator applications, with dynamic creation, registration, revocation, and limitation capabilities. Comprehensive cryptographic activity logging may capture connection metadata including login timing, IP addresses, session duration, and device identification.

Client application agilability may include one or more of dynamic management of supported cryptographic algorithms through creation, revocation, and profile-specific algorithm assignment capabilities. Key management agility may support one or more of hardware security modules (for example, Trusted Platform Module), configuration for devices without local key storage, and external key storage with creation, revocation, and purging capabilities. The system 300 may provide dynamic secure communication protocol management including one or more of creation of new protocol support, protocol revocation, and profile-specific protocol assignment. Complex rule implementation may enable sophisticated policy combinations, such as device-specific requirements, hardware key dependencies, quantum-resistant protocol selection, IP address filtering, and time-based access controls.

User device agilability may encompass one or more of hardware configuration detection for cryptographic acceleration features (for example, AES-NI instruction support) and hardware-based key management capabilities, such as TPM module presence and functionality. Server-side agility may mirror user-side capabilities and may additionally include infrastructure-specific features such as kernel TLS offload support and distributed cryptographic processing capabilities.

Figure 4:
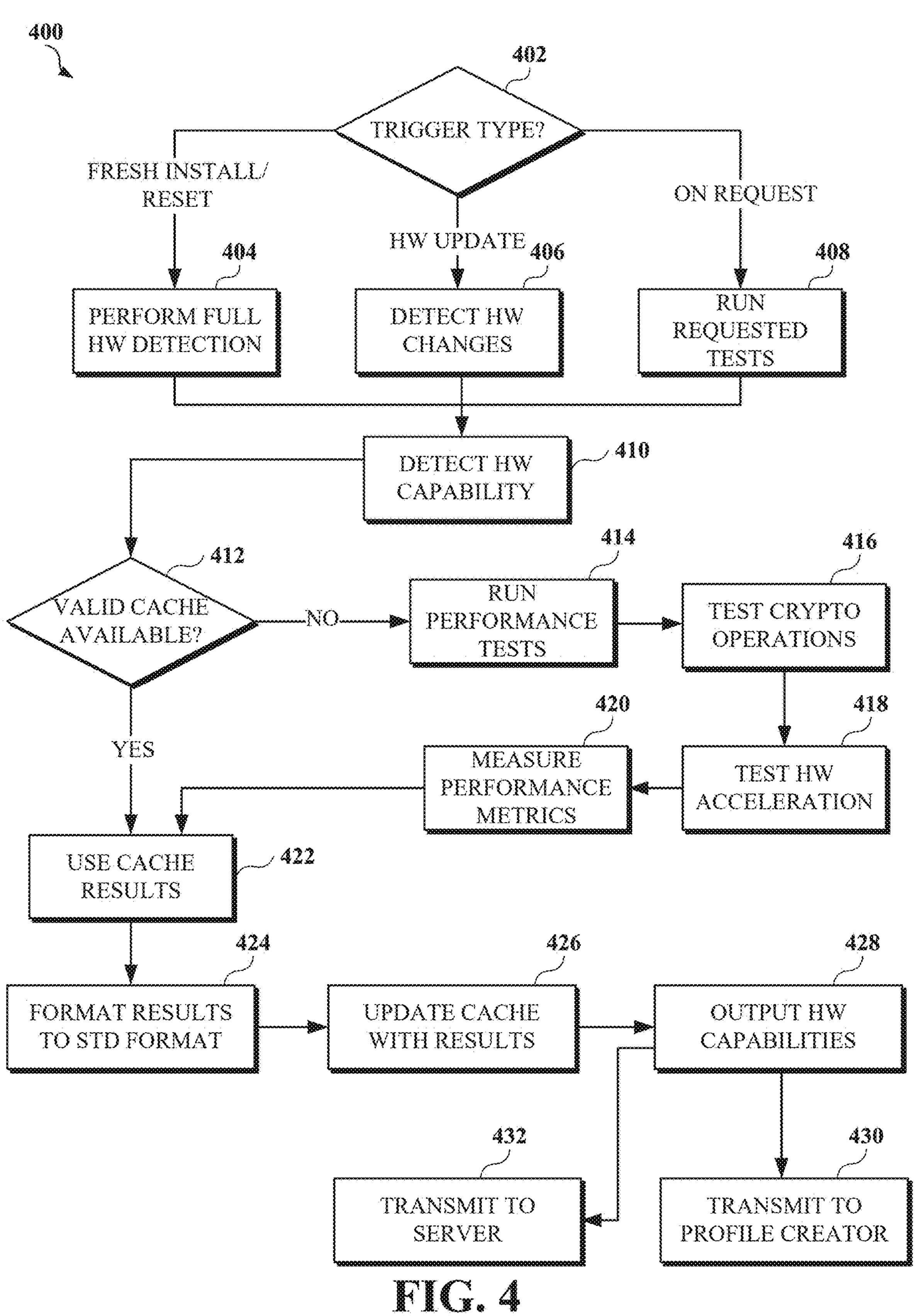
FIG. 4 is a flowchart of an example of a technique associated with determining client device hardware configuration and passing results to Profile Creator and Update subsystems through intelligent testing and caching mechanisms.

FIG. 4 is a flowchart of an example of a technique 400 associated with determining client device hardware configuration and passing results to Profile Creator and Update subsystems through intelligent testing and caching mechanisms. The technique 400 can be executed or performed, in whole or in part, by the testing tool 320 and the profile creation tool 316 of FIG. 3.

At 402, the technique 400 determines a trigger type that initiates the hardware testing process. For example, a testing tool (e.g., the testing tool 320 shown in FIG. 3) may evaluate (identify or receive) distinct trigger conditions that may involve a hardware capability assessment. As shown, the trigger type operates as a case statement with three possible execution paths based on the initiating condition. The trigger type determination may include evaluating system state indicators, monitoring hardware change notifications, or receiving explicit testing requests from other system components. Alternative implementations may include time-based triggers that periodically initiate testing cycles, event-driven triggers that respond to system configuration changes, or priority-based triggers that queue multiple testing requests based on urgency or system load conditions.

At 404, the technique 400 performs full hardware detection when triggered by a fresh install or system reset condition. For example, a testing subsystem (e.g., the testing tool 320 shown in FIG. 3) may execute comprehensive hardware capability scanning to establish baseline device characteristics. Full hardware detection may include detecting processor architecture, available instruction sets, memory configurations, and specialized cryptographic hardware components. Full hardware detection may utilize operating system APIs to query hardware specifications, execute low-level hardware probes to identify capabilities not exposed through standard interfaces, or perform capability validation tests to confirm reported hardware features are functional.

At 406, the technique 400 detects hardware changes when triggered by a hardware update condition. For example, a hardware monitoring component (e.g., the testing tool 320 shown in FIG. 3) may compare current hardware configuration against cached baseline data to identify modifications. This step may include detecting new hardware installations, driver updates, firmware modifications, or hardware component removals that affect cryptographic capabilities. Hardware change detection may monitor system event logs for hardware modification notifications, compare hardware identifiers against stored reference values, or execute selective capability tests on potentially modified components. Alternative implementations may include continuous monitoring systems that detect changes in real-time, differential analysis systems that identify specific changes rather than requiring full re-detection, or predictive change detection systems that anticipate hardware modifications based on system update patterns.

At 408, the technique 400 runs (e.g., executes or performs) requested tests when triggered, such as by an on-demand testing request. For example, a profile creation system (e.g., the profile creation tool 316 shown in FIG. 3) may request specific hardware capability tests to support dynamic profile generation. This step may include executing targeted capability assessments, performance benchmarks for specific cryptographic operations, or validation tests for newly installed cryptographic libraries. The requested testing may enable external components to specify particular test suites, customize testing parameters based on immediate requirements, or prioritize certain capability assessments over others.

At 410, the technique 400 detects hardware capability regardless of the trigger path, consolidating one or more trigger types into a unified capability assessment process. For example, a hardware analysis engine (e.g., the testing tool 320 shown in FIG. 3) may execute standardized capability detection procedures to identify available cryptographic resources. This step represents the convergence point where all trigger paths begin systematic hardware evaluation. The hardware capability detection may utilize standardized testing frameworks that ensure consistent capability identification across different trigger scenarios, implement capability classification systems that categorize detected features according to cryptographic utility, or employ capability validation mechanisms that verify the functional availability of detected hardware features.

At 412, the technique 400 determines whether a valid cache is available to avoid redundant testing operations. For example, a cache management system (e.g., the local store 322 shown in FIG. 3) may evaluate stored hardware capability data against freshness criteria and hardware change indicators. This step implements caching mechanisms that balance testing efficiency against accuracy requirements. The cache validation may include comparing cached data timestamps against configurable expiration thresholds, validating cache integrity through cryptographic checksums, or assessing cache relevance based on detected system changes.

In some implementations, the cache validation process may include hardware identifier (HWID) verification to ensure cached capability data corresponds to the current hardware configuration. For example, a hardware identification system (e.g., the testing tool 320 shown in FIG. 3) may generate a unique hardware identifier based on processor characteristics, memory configuration, and available cryptographic hardware features, then compare this HWID against stored cache metadata to validate cache relevance. The HWID generation may include creating cryptographic fingerprints of hardware components, combining multiple hardware identifiers into composite identification strings, or generating time-stamped hardware configuration signatures that enable change detection.

When hardware modifications are detected through HWID comparison, the technique 400 may invalidate affected cache entries and trigger appropriate re-testing procedures. Alternative implementations may include hierarchical HWID systems that track component-level changes, distributed HWID systems that coordinate hardware identification across multiple applications, or encrypted HWID storage systems that protect hardware configuration information from unauthorized access.

At 422, when valid cache is available, the technique 400 uses cached results to avoid redundant hardware testing. For example, a cache retrieval system (e.g., the local store 322 shown in FIG. 3) may load previously determined hardware capabilities and performance characteristics. This optimization path may significantly reduce system overhead by reusing verified capability data when hardware configuration remains unchanged. The cached result utilization may include validating cached data against current system state, merging cached results with partial updates for changed components, or prioritizing cached data while selectively updating specific capability categories.

At 414, when valid cache is not available, the technique 400 runs performance tests to measure cryptographic operation efficiency. For example, a benchmarking engine (e.g., the testing tool 320 shown in FIG. 3) may execute standardized performance assessments to quantify hardware-specific cryptographic capabilities. This step measures how fast different security operations run on the client device 302 to enable suitable algorithm selection during profile creation. Performance testing may include executing predefined benchmark suites for common cryptographic algorithms, measuring performance under various load conditions, or comparing performance across different cryptographic library implementations. Alternative implementations may include adaptive performance testing that adjusts benchmark complexity based on detected hardware capabilities, continuous performance monitoring that tracks capability changes over time, or collaborative performance testing that shares benchmark results across similar hardware configurations.

At 416, the technique 400 tests cryptographic operations to evaluate algorithm-specific performance characteristics. For example, a cryptographic testing framework (e.g., the cryptographic subsystem 314 shown in FIG. 3) may execute Advanced Encryption Standard (AES) encryption performance tests for various key lengths, Rivest-Shamir-Adleman (RSA) asymmetric encryption and digital signature benchmarks, Elliptic Curve Cryptography (ECC) point multiplication assessments, post-quantum cryptography algorithm evaluations including module-lattice-based and code-based schemes, hash function speed measurements across Secure Hash Algorithm (SHA) families and alternative algorithms, and random number generation performance tests evaluating both hardware and software-based entropy sources. This step enables the system to make informed decisions about which cryptographic algorithms to use based on device capabilities and performance requirements.

The cryptographic operation testing may include evaluating symmetric encryption algorithms under different block cipher modes, measuring asymmetric key generation and verification performance across different key sizes, or assessing cryptographic hash function throughput across varying input data sizes. Alternative implementations may include parallel cryptographic testing that evaluates multiple algorithm families simultaneously, progressive cryptographic testing that advances from basic operations to complex protocol combinations, or comparative cryptographic testing that benchmarks different library implementations against standardized reference performance metrics.

At 418, the technique 400 tests hardware acceleration to identify available cryptographic acceleration features. For example, a hardware acceleration detector (e.g., the testing tool 320 shown in FIG. 3) may probe for specialized instruction sets, dedicated cryptographic processors, or hardware security modules. This step identifies hardware-based cryptographic accelerators that can significantly improve performance for cryptographic operations. To illustrate, the hardware acceleration testing may include detecting AES-NI instructions, Arm v8-A Cryptographic Extension, dedicated cryptographic coprocessors, or TPM capabilities. Alternative implementations may include dynamic acceleration testing that evaluates acceleration effectiveness under different workload conditions, comprehensive acceleration testing that identifies acceleration features across multiple processor generations, or adaptive acceleration testing that learns optimal acceleration utilization patterns based on application usage profiles.

At 420, the technique 400 measures performance metrics to quantify the efficiency of detected cryptographic capabilities across all tested algorithm categories. For example, a performance analysis system (e.g., the testing tool 320 shown in FIG. 3) may calculate AES encryption and decryption throughput rates for 128-bit, 192-bit, and 256-bit key configurations, RSA key generation times and signature verification speeds for 2048-bit and 4096-bit keys, ECC point multiplication performance for various curve parameters including but not limited to Curve25519, P-256 and P-384 elliptic curves, post-quantum algorithm computational overhead measurements for Code-Based or Module-Lattice-Based Key Encapsulation Mechanism and Module-Lattice-Based or Stateless Hash-Based digital signature schemes, hash function processing speeds across different input block sizes for SHA and BLAKE variants, and RNG entropy generation rates with quality assessments for both hardware-based and pseudorandom number generators.

The performance measurement may include statistical analysis of multiple test iterations to ensure measurement reliability, performance profiling under varying system load conditions to assess algorithm behavior during resource contention, or comparative analysis between hardware-accelerated implementations and pure software-based alternatives. This step provides quantitative data that enables intelligent algorithm selection during profile creation based on measured device-specific performance characteristics.

Alternative implementations may include real-time performance monitoring that continuously updates algorithm-specific metrics based on actual cryptographic usage patterns, predictive performance modeling that estimates efficiency metrics for untested algorithm parameter combinations, or adaptive performance measurement that dynamically adjusts testing precision and duration based on detected performance variation patterns across different cryptographic operation categories.

At 424, the technique 400 formats results to standard format to ensure compatibility across system components. For example, a data formatting engine (e.g., the testing tool 320 shown in FIG. 3) may convert raw capability and performance data into standardized data structures that can be consumed by profile creation and update subsystems. This standardization enables various system components to determine (e.g., select) a configuration for security methods, file downloads, and profiles. The result of the formatting may include generating structured capability descriptors, normalizing performance metrics across different measurement scales, or creating compatibility matrices that map capabilities to supported cryptographic algorithms. Alternative implementations may include extensible formatting systems that support multiple output formats for different system components, compressed formatting systems that minimize data storage and transmission overhead, or versioned formatting systems that maintain backward compatibility while supporting format evolution.

At 426, the technique 400 updates a cache with the results to optimize future testing operations. For example, a cache management system (e.g., the local store 322 shown in FIG. 3) may store formatted capability and performance data with appropriate metadata including timestamps, hardware identifiers (HWID), and validation checksums. Caching may be used to prevent redundant testing while providing mechanisms for forced re-testing when configurations change. The cache update may include implementing cache expiration policies based on hardware stability characteristics, maintaining separate cache entries for different capability categories, or implementing cache synchronization mechanisms for multi-application environments.

At 428, the technique 400 outputs hardware capabilities to dependent system components. For example, a capability distribution system (e.g., the testing tool 320 shown in FIG. 3) may provide formatted capability data to profile creation and update subsystems that require hardware information for suitable operation. This output enables other system components to make informed decisions about cryptographic algorithm selection, binary downloads, and configuration parameters.

At 430, the technique 400 transmits capabilities to the profile creator to enable hardware-aware profile generation. For example, a communication interface (e.g., the testing tool 320 shown in FIG. 3) may deliver capability data to the profile creation tool 316 to support intelligent profile selection and customization based on detected hardware characteristics. This transmission enables the profile creation subsystem to select profiles from available options based on determined hardware capabilities.

At 432, the technique 400 transmits capabilities to the server to enable server-side optimization and configuration management. For example, a network communication component (e.g., the testing tool 320 shown in FIG. 3) may send capability data to server infrastructure components to support centralized policy enforcement and optimization decisions. This server communication enables the distributed system to coordinate capability-aware configuration management across multiple client devices and organizational policies.

Figure 5:
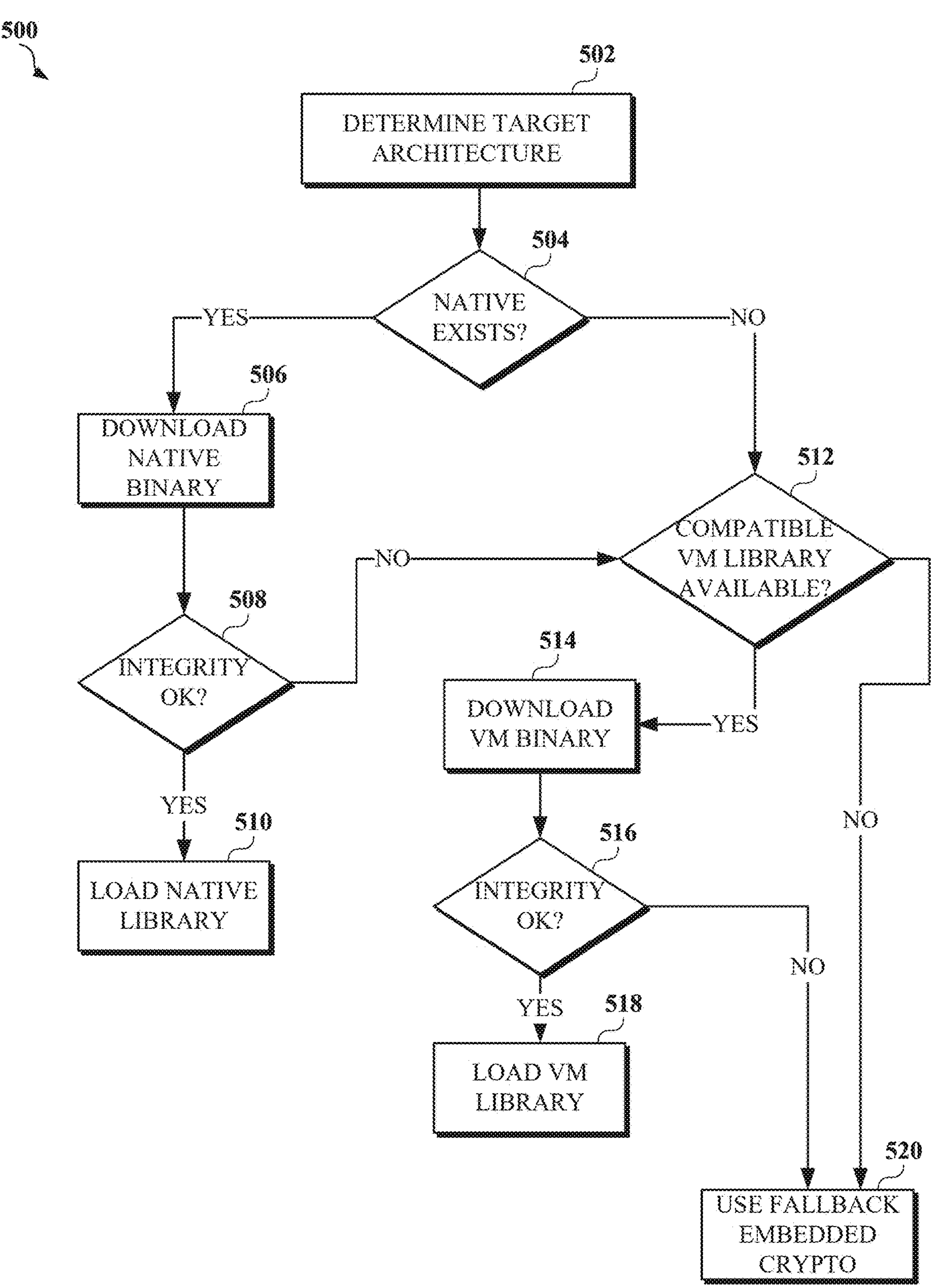
FIG. 5 is a flowchart illustrating a technique for updating cryptographic components based on the hardware capabilities of a client device.

FIG. 5 is a flowchart illustrating a technique 500 for updating cryptographic components based on the hardware capabilities of a client device. The update process can be initiated automatically, for example, upon a new installation or application reset, or in response to various triggers such as time-based schedules or user requests. The technique 500 implements a tiered approach to ensure the availability of cryptographic functions, prioritizing optimized native libraries, then falling back to more compatible options like virtual machine (VM)-based libraries, and ultimately relying on embedded cryptographic functions if other options fail. The technique 500 may be implemented in whole or in part by the update tool 324, binary management tool 318, and cryptographic subsystem 314 of FIG. 3.

At 502, the technique 500 determines a target architecture of the client device to identify an appropriate cryptographic library configuration for the client device hardware. For example, an architecture detection system (e.g., the update tool 324 shown in FIG. 3) may analyze processor specifications, available instruction sets, and hardware acceleration capabilities to determine a suitable cryptographic library architecture. This step may include identifying x86 processors with AES-NI support, ARM processors with cryptographic extensions, or specialized hardware security modules that require specific library implementations. The target architecture determination may utilize hardware capability data previously gathered by the testing tool 320, evaluate processor feature flags to identify supported cryptographic instruction sets, or analyze system configuration parameters to determine compatibility requirements for different library architectures.

At 504, the technique 500 evaluates whether native optimized libraries exist for the determined target architecture. For example, a library availability assessment system (e.g., the update tool 324 shown in FIG. 3) may query update servers to determine if architecture-specific native libraries are available for download. This evaluation represents the first tier of the three-tier system that prioritizes native optimized cryptographic libraries for enhanced performance. In some implementations, the native library evaluation may include checking library repositories for processor-specific optimizations, validating library compatibility against current system configurations, or assessing library versions to determine if updates are available.

When native libraries are available for the determined architecture, the technique 500 proceeds, at 506, to download the binary components from an update server. In some implementations, the update tool (e.g., the update tool 324 of FIG. 3) may implement a download process by first sending a request to the server that includes a hash value representing the client's current version of the library. This request, such as an HTTP HEAD request with a "Want-Content-Digest" header, signals to the server that the client is to receive only the hash of the latest available version of the library.

Upon receiving the server's response, which may include a "Content-Digest" header containing the hash of the latest version, the update tool compares this remote hash with the hash of the locally stored version. If the hashes match, the local version is up-to-date, and no download is required. If the hashes differ, indicating an updated version is available, the system then initiates a full download of the new binary component. After the download is complete, a verification check is performed by calculating the hash of the downloaded file and comparing it to the hash provided by the server. If the hashes match, the update is considered successful. If the verification fails, the system may attempt to download the file again, up to a predefined number of retries, before marking the update as failed and potentially moving to an alternative update strategy, such as using a different library or providing a notification to the user.

At 508, the technique 500 evaluates download integrity to facilitate cryptographic library authenticity and completeness. For example, an integrity verification system (e.g., the binary management tool 318 shown in FIG. 3) may validate digital signatures, verify cryptographic checksums, and confirm library completeness through comprehensive integrity checking procedures. This integrity validation can be used to confirm that downloaded native libraries have not been corrupted during transmission and originate from trusted sources. The integrity checking may include validating multiple hash algorithms for enhanced security, verifying digital certificates against trusted certificate authorities, or performing library format validation to verify proper binary structure.

At 510, when integrity validation succeeds, the technique 500 loads the native library into the cryptographic subsystem for immediate utilization. For example, a library loading mechanism (e.g., the cryptographic subsystem 314 shown in FIG. 3) may dynamically link the verified native library, initialize cryptographic function pointers, and configure the library for a desired level of performance on the target hardware architecture. The loading process may include integrating the native library into the runtime environment of the client device, making its cryptographic functions available to other components, and establishing the library as the primary cryptographic provider. Library loading may include performing runtime compatibility tests to verify correct library function, establishing function call mappings between the common API and native library implementations, or configuring hardware acceleration features specific to the loaded library. Alternative implementations may include hot-swapping mechanisms that replace existing libraries without system restart, versioned loading systems that maintain multiple library versions simultaneously, or isolated loading environments that contain library operations within secure execution contexts.

At 512, when native libraries are not available (at 504) or integrity validation fails (at 508), the technique 500 evaluates whether compatible VM libraries are available as a fallback option. For example, a VM library assessment system (e.g., the update tool 324 shown in FIG. 3) may query available VM-based cryptographic implementations that provide platform independence while maintaining reasonable performance characteristics. This evaluation represents a second tier of the three-tier system that provides intermediate performance and compatibility when native optimizations are unavailable. The VM library evaluation may include assessing Java-based cryptographic providers, .NET cryptographic implementations, or other managed runtime environments that offer cross-platform compatibility. Alternative implementations may include adaptive VM selection that chooses suitable virtual machine implementations based on system resources, performance-based VM evaluation that benchmarks different VM options against current requirements, or distributed VM coordination that synchronizes VM library selection across multiple applications.

At 514, when compatible VM libraries are available, the technique 500 downloads VM binary components using the same download mechanisms employed for native libraries. For example, a VM library download system (e.g., the update tool 324 shown in FIG. 3) may implement identical HTTP hash-based download procedures including HEAD requests with Want-Content-Digest headers, hash comparison validation, and retry mechanisms to facilitate VM library acquisition, as described with respect to 506. The VM library download may include acquiring additional runtime dependencies required for VM operation, downloading platform-specific VM configurations, or obtaining VM-specific optimization parameters.

At 516, the technique 500 evaluates VM library download integrity using validation procedures similar to those employed for native library verification, at 508. The VM integrity checking may include validating VM runtime compatibility, verifying VM-specific security configurations, or performing VM library format validation. Alternative implementations may include VM-aware integrity systems that account for virtual machine security models, distributed VM validation that coordinates integrity checking across VM environments, or a second type of VM verification that includes runtime security assessments beyond static integrity validation.

At 518, when VM library integrity validation succeeds, the technique 500 loads the VM library into the cryptographic subsystem as the active cryptographic provider. For example, a VM library integration system (e.g., the cryptographic subsystem 314) may initialize a virtual machine environment, load a VM-based cryptographic library, and establish function mappings between the common cryptographic API and VM library implementations. The VM library loading process may include configuring the virtual machine runtime, integrating VM cryptographic functions with system components, or improving VM performance for the current hardware configuration. In some implementations, the VM library loading may include configuring VM memory allocation for cryptographic operations, establishing VM security contexts for sensitive operations, or improving VM just-in-time compilation for cryptographic functions.

At 520, when neither native nor VM libraries are available or when the previous options fail integrity validation, the technique 500 utilizes fallback embedded cryptographic implementations to facilitate system availability. For example, an embedded crypto system (e.g., the cryptographic subsystem 314 shown in FIG. 3) may activate pre-integrated cryptographic implementations that are compiled directly into the application (e.g., the general application 306 of FIG. 3) executable and provide basic cryptographic functionality without external dependencies. This fallback mechanism represents the third tier of the three-tier system and helps provide that cryptographic capabilities remain available even when network connectivity is limited or external library sources are unavailable.

Figure 6:
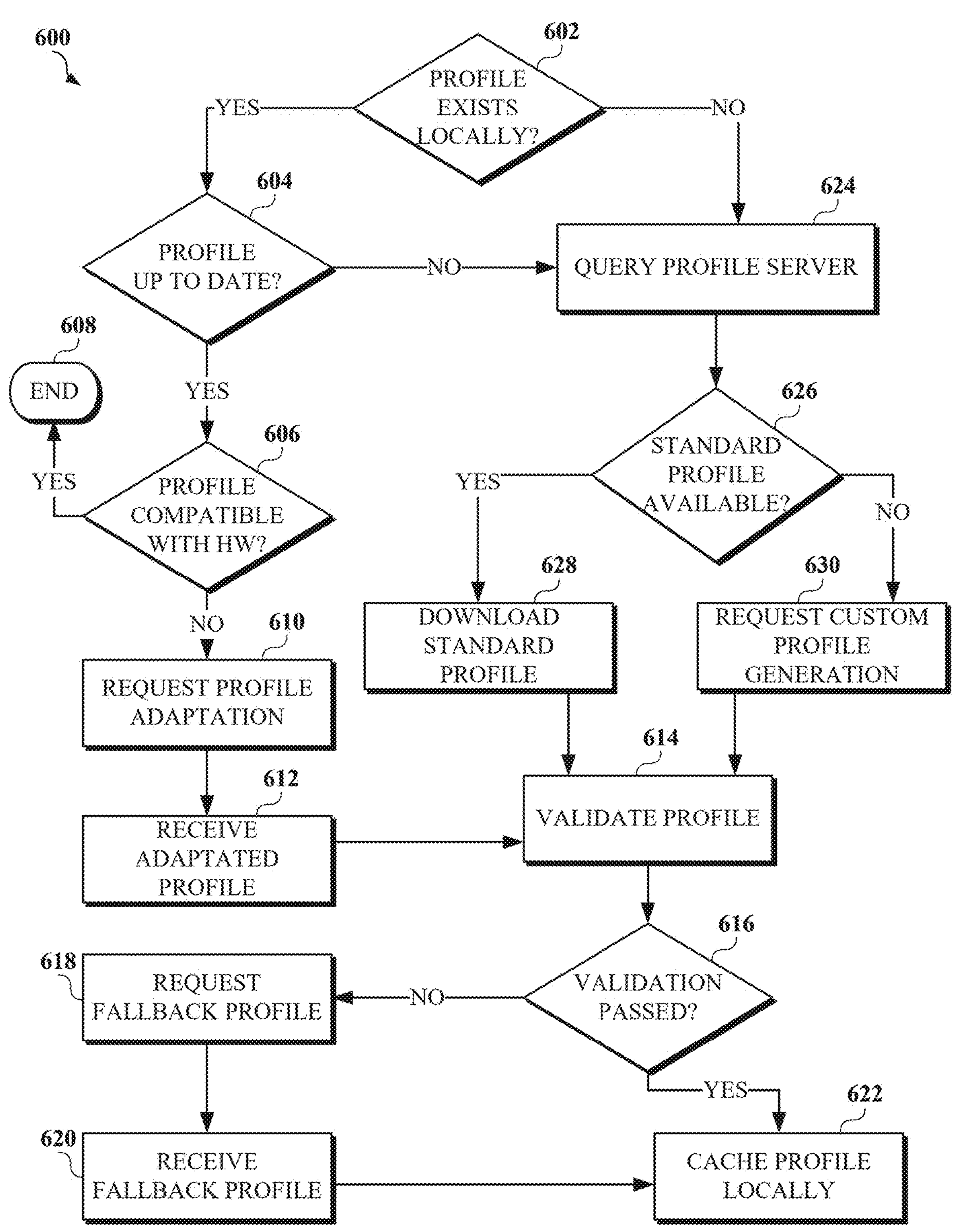
FIG. 6 is a flowchart of an example of a technique for creating, adapting, and managing profiles that enable client devices (e.g., VPN clients) to establish secure connections based on hardware capabilities and security requirements.

FIG. 6 is a flowchart of an example of a technique 600 for creating, adapting, and managing profiles that enable client devices (e.g., VPN clients) to establish secure connections based on hardware capabilities and security requirements. The technique 600 can be implemented in whole or in part by the profile creation tool 316, profile tool 332, and local store 322 of FIG. 3. The technique 600 may be triggered (e.g., initiated or started) when, for example, the general application 306 of FIG. 3 requests a VPN connection, when hardware capabilities change as detected by the testing tool 320, or when configuration updates require profile modification.

A "profile" as used herein, represents a configuration specification that defines the sequence (e.g., complete sequence) of operations, algorithms, protocols, and parameters used to establish and maintain a secure VPN connection. For example, a profile may specify the initial key generation algorithms to be used, the step-by-step handshake procedures for connection establishment, the exact sequence of encryption, signing, and verification operations during data exchange, the timing and methods for encryption key rotation, the data encryption and decryption procedures for actual traffic protection, and the error handling procedures to be followed when connection issues arise.

A profile may essentially function as a detailed script that may be compiled into a native library optimized for the target hardware architecture, exposing a minimal interface that requires only network input/output functions to be provided while handling all protocol execution internally. Profile examples may include corporate-secure profiles that emphasize strong encryption and compliance logging for business environments, low-latency profiles that prioritize connection speed for gaming applications, high-security profiles that incorporate traffic obfuscation and quantum-resistant encryption for sensitive communications, or hardware-optimized profiles that leverage specific acceleration features such as TPM secure key storage capabilities.

At 602, the technique 600 evaluates whether a profile exists locally. For example, a profile management system (e.g., the profile creation tool 316 shown in FIG. 3) may query the local store 322 to determine if the profile selected by the user (which may be a profile designated for gaming, work, or traveling) exists on the local system and has not been deleted, moved, or corrupted since creation. The local profile evaluation may include verifying profile file integrity, confirming file accessibility, and validating that the stored profile data can be properly loaded for execution.

At 604, when a profile exists locally, the technique 600 determines whether the local (cached) profile remains current and reflects the latest security policies and configuration updates. For example, a profile validation system (e.g., the profile creation tool 316 shown in FIG. 3) may compare profile timestamps against configured expiration policies, validate profile versions against server-maintained version databases, or assess profile relevance based on recent security policy changes. This currency validation enables maintaining security by facilitating the use of profiles that incorporate the latest protocols, standards and organizational policies. The profile currency assessment may include checking profile modification dates against policy update timestamps, validating profile cryptographic algorithms against deprecated algorithm lists, or comparing profile security parameters against current compliance requirements.

At 606, when the local (cached) profile is current (i.e., is up to date), the technique 600 evaluates whether the profile remains compatible with current hardware capabilities and client device configuration. For example, a compatibility assessment system (e.g., the profile creation tool 316 shown in FIG. 3) may compare profile requirements against hardware capabilities data provided by the testing tool 320, validate profile algorithm specifications against available cryptographic libraries, or assess profile performance requirements against current system resources. This compatibility evaluation facilitates profile selection that can improve performance while maintaining security requirements based on the specific hardware characteristics of the client device. In some implementations, the hardware compatibility assessment may include verifying that profile-specified algorithms are supported by available hardware acceleration features, validating that profile key size requirements can be satisfied by current cryptographic implementations, or confirming that profile performance targets are achievable on the current hardware configuration.

At 608, when the local (cached) profile is current and compatible with hardware capabilities, the technique 600 completes successfully by utilizing the existing profile without requiring additional processing or network communication.

At 610, when the local (cached) profile is not compatible with current hardware capabilities, the technique 600 requests profile adaptation from server infrastructure to modify the existing profile for current system requirements. For example, a profile adaptation request system (e.g., the profile creation tool 316 shown in FIG. 3) may transmit hardware capability data and compatibility constraints to the profile tool 332 in the server infrastructure, with the server determining appropriate modifications based on the received technical parameters, or request profile optimization for detected hardware acceleration features. This adaptation process enables the maintenance of security objectives while accommodating hardware-specific performance characteristics and capability limitations.

At 612, the technique 600 receives the adapted profile from the server infrastructure after server-side processing modifies the original profile to address compatibility requirements. For example, a profile reception system (e.g., the profile creation tool 316 shown in FIG. 3) may download the modified profile data, validate profile transmission integrity, and prepare the adapted profile for local validation procedures. The adapted profile incorporates modifications that address hardware compatibility issues while maintaining the security objectives and operational characteristics of the original profile.

At 614, the technique 600 validates the received profile to verify correctness (e.g., syntactic validity), security compliance, and functional suitability for the current system configuration. For example, a profile validation system (e.g., the profile creation tool 316 shown in FIG. 3) may verify profile syntax and semantic correctness, validate that profile cryptographic parameters meet security requirements, confirm that profile algorithms are supported by available cryptographic libraries, and assess profile compatibility with current hardware capabilities. This validation process facilitates profile integrity and functionality before profile deployment and utilization in secure connection establishment.

At 616, the technique 600 evaluates whether the profile validation process completed successfully and the received profile is suitable for establishing a secure connection. For example, a validation assessment system (e.g., the profile creation tool 316 shown in FIG. 3) may analyze validation results to determine if the profile satisfies security, compatibility, and functional requirements. If validation is successful, the technique proceeds to cache the validated profile locally for future use and immediate deployment.

At 618, when profile validation fails, the technique 600 requests a fallback profile from the server infrastructure to provide an alternative profile configuration that prioritizes compatibility and basic functionality over advanced features or performance optimization. For example, a fallback request system (e.g., the profile creation tool 316 shown in FIG. 3) may transmit metadata about the intended use case (such as gaming for performance priority or financial transactions for security priority), operational constraints, and compatibility requirements to the profile tool 332, allowing the server to determine appropriate fallback strategies including reduced complexity profiles, alternative algorithm selections, and security parameters for fallback profile generation.

At 620, the technique 600 receives the fallback profile from the server infrastructure designed to provide basic secure connectivity with broad compatibility across diverse hardware configurations. For example, a fallback profile reception system (e.g., the profile creation tool 316 shown in FIG. 3) may download the simplified profile, validate fallback profile integrity, and prepare the fallback profile for caching and deployment. Fallback profiles typically prioritize compatibility and reliability over performance optimization while maintaining acceptable security level.

At 622, the technique 600 caches the validated profile locally to facilitate future connection requests and minimize network communication requirements. For example, a profile caching system (e.g., the local store 322 shown in FIG. 3) may store the validated profile with appropriate metadata including timestamps, hardware compatibility information, and usage statistics.

At 624, when no suitable profile exists locally (at 602) or when cached profiles are outdated or incompatible (at 604), the technique 600 queries the profile server to obtain appropriate profiles from server-maintained profile repositories. For example, a server query system (e.g., the profile creation tool 316 shown in FIG. 3) may transmit connection requirements, hardware capabilities, and security preferences to the profile tool 332 in the server infrastructure to request suitable profile recommendations or generation services.

At 626, the technique 600 evaluates whether standard predefined profiles are available that meet the specified connection requirements and hardware constraints. For example, a standard profile assessment system (e.g., the profile tool 332 shown in FIG. 3) may search profile repositories for existing profiles that match client specifications, validate standard profile compatibility with reported hardware capabilities, and assess standard profile suitability for specified security requirements and connection contexts.

At 628, when suitable standard profiles are available (at 626), the technique 600 downloads the selected standard profile from the server infrastructure. For example, a standard profile download system (e.g., the profile creation tool 316 shown in FIG. 3) may retrieve the selected profile data, validate download integrity, and prepare the standard profile for local validation and deployment. Standard profiles represent pre-configured settings for common hardware and security scenarios that facilitate efficient profile deployment, thereby reducing the need for custom generation. From 628, the technique 600 proceeds to 614.

At 630, when suitable standard profiles are not available (at 626), the technique 600 requests custom profile generation from server infrastructure to create specialized profiles tailored to unique hardware configurations, security requirements, or operational contexts. For example, a custom profile request system (e.g., the profile creation tool 316 shown in FIG. 3) may transmit detailed hardware specifications, specific security requirements, and operational constraints to the profile tool 332 for processing by machine learning models or specialized profile generation algorithms.

This custom generation capability enables the system to generate profiles optimized for client hardware capabilities and connection requirements when standard profiles are insufficient. The custom profile generation process may utilize machine learning models such as LLMs to create novel profile configurations for unusual or complex client scenarios, enabling the system to adapt to diverse hardware environments and security contexts that are not addressed by standard profile templates. From 630, the technique 600 proceeds to 614.

Figure 7:
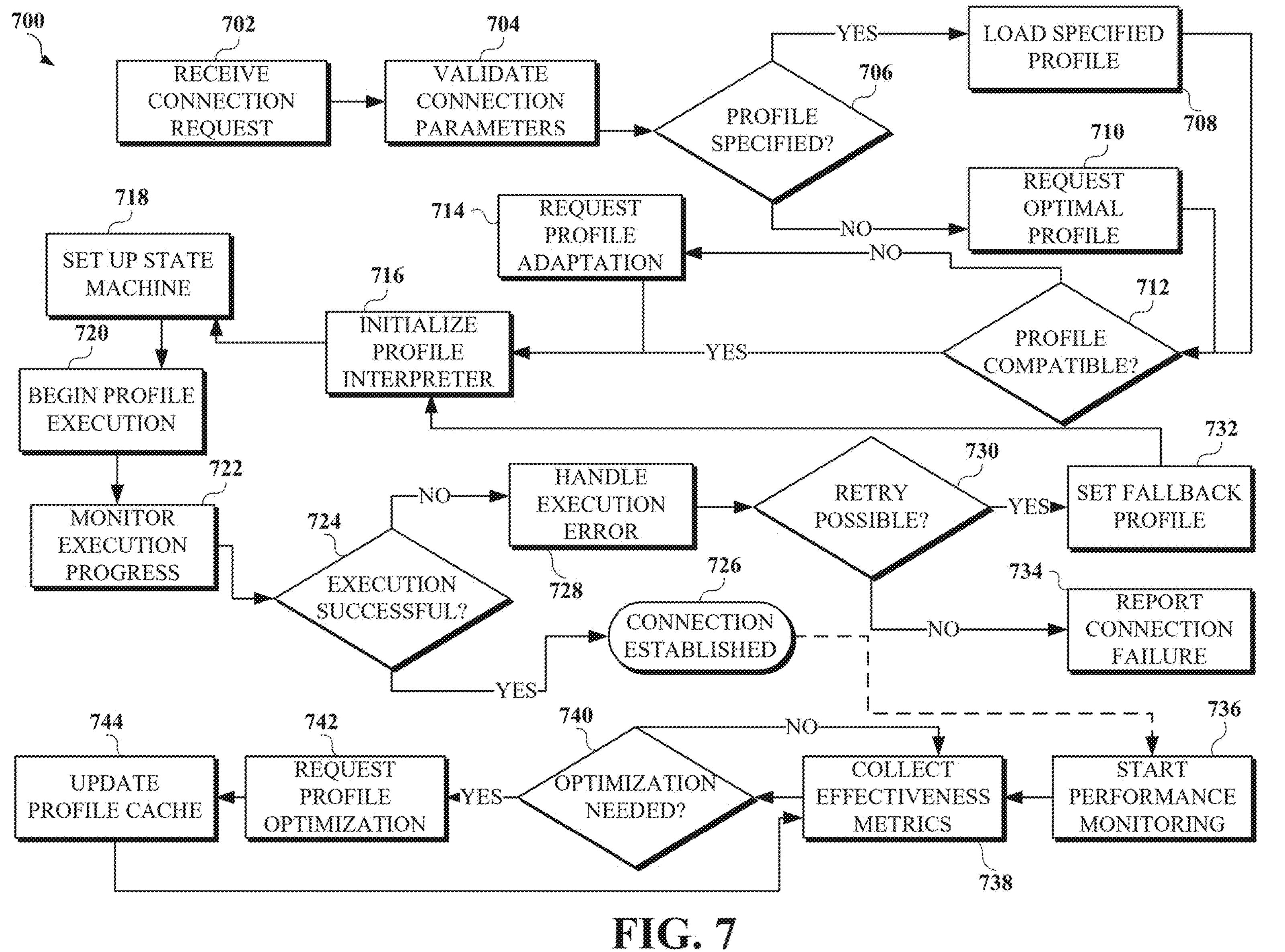
FIG. 7 is a flowchart of an example of a technique for orchestrating the lifecycle of protocol profile execution from loading and validation through execution monitoring and optimization.

FIG. 7 is a flowchart of an example of a technique 700 for orchestrating the lifecycle of protocol profile execution from loading and validation through execution monitoring and optimization. The technique 700 can be implemented in whole or in part by the profile execution tool 308, profile interpreter tool 310, profile state machine execution tool 312, and profile creation tool 316 of FIG. 3. The technique 700 may be triggered when the general application 306 receives a user connection request, such as when a user clicks "connect" in a VPN application interface.

At 702, the technique 700 receives a connection request that initiates the profile execution process for establishing a secure VPN connection. For example, a connection request handler (e.g., the profile execution tool 308 shown in FIG. 3) may receive connection parameters from the general application 306 including target server information, user credentials, connection preferences, and security requirements. The request may also include connection type (e.g., "streaming," "gaming," or "high-security"), a unique device identifier (HWID) to retrieve cached profiles, and a session ID for logging and tracking. Additionally, the request may contain the specific server IP or domain the user is trying to connect to. This initial step represents the entry point where high-level user connection requests are translated into specific profile execution requirements that guide the subsequent connection establishment process.

At 704, the technique 700 validates connection parameters to verify that the received connection request contains sufficient and valid information for secure connection establishment. For example, a parameter validation system (e.g., the profile execution tool 308 shown in FIG. 3) may verify server address validity, validate user authentication credentials, confirm security policy compliance, and assess connection parameter completeness. This validation process facilitates connection reliability by identifying potential issues before initiating resource-intensive cryptographic operations and profile execution procedures.

For example, for server address validity, the system may perform a DNS lookup to ensure the address is a legitimate, routable IP address and not a malicious or invalid entry. For example, for credential validation, the system may verify a username and password, validate a digital certificate, or check the validity of an OAuth token to ensure the user has the right to connect. For example, for security policy compliance, the system may check if the requested security settings (e.g., using a specific protocol or key size) align with predefined organizational rules, such as a policy mandating a minimum security level (i.e. NIST security level 1, inter alia encryption strength not less than of AES-128) for all connections.

At 706, the technique 700 evaluates whether a specific profile has been designated for the current connection request. For example, a profile specification detector (e.g., the profile execution tool 308 shown in FIG. 3) may examine connection parameters to determine if user preferences, organizational policies, or application settings have specified a particular profile for use with the target server or connection type. A connection request may specify one or more of a target (e.g., "corp-srv.company.com:443"), a user (e.g., "bob@company.com"), a Network (e.g., "cellular" connection), and Device type (e.g., "mobile" with limited battery).

Using such parameters, the system can identify profiles compatible with corporate servers based on the domain, optimized for cellular networks and mobile battery constraints. If no compatible profile exists, the system creates one; if a suitable profile is found, it is designated for use. This evaluation enables the system to respect explicit profile preferences while providing fallback mechanisms for connections without predefined profile assignments.

At 708, when a specific profile is designated, the technique 700 loads the specified profile from local storage or retrieves it from server infrastructure 304 of FIG. 3. For example, a profile loading system (e.g., the profile execution tool 308 shown in FIG. 3) may access the local store 322 to retrieve cached profile data or communicate with the profile creation tool 316 to obtain the designated profile from server sources. The profile loading process includes validating profile integrity and preparing profile data for compatibility assessment and execution procedures.

At 710, when no specific profile is designated, the technique 700 requests an appropriate profile from the profile creation subsystem based on connection requirements and hardware capabilities. For example, a profile request system (e.g., the profile execution tool 308 shown in FIG. 3) may communicate with the profile creation tool 316 to obtain a profile optimized for the current hardware configuration, target server characteristics, and security requirements. This request mechanism enables the technique 700 to dynamically select profiles based on determined hardware capabilities, facilitating performance optimization while maintaining security standards.

At 712, the technique 700 evaluates whether the obtained profile is compatible with current capabilities of the client device and connection requirements. For example, a compatibility assessment system (e.g., the profile execution tool 308 shown in FIG. 3) may validate profile algorithms against available cryptographic libraries, verify profile hardware requirements against detected capabilities from the testing tool 320, and confirm profile compatibility with target server supported protocols. This compatibility evaluation facilitates profile execution by identifying potential incompatibilities before attempting connection establishment.

At 714, when the profile is not compatible with current system capabilities, the technique 700 requests profile adaptation from the server infrastructure 304 to modify the profile for current hardware and constraints. For example, a profile adaptation request system (e.g., the profile execution tool 308 shown in FIG. 3) may communicate with the profile creation tool 316 or profile tool 332 to obtain a modified version of the profile that accommodates current system limitations while preserving security objectives and connection functionality.

At 716, the technique 700 initializes the profile interpreter to prepare for profile parsing and execution instruction generation. For example, a profile interpreter initialization system (e.g., the profile interpreter tool 310 shown in FIG. 3) may load the validated profile data, initialize parsing engines, and prepare instruction generation capabilities for converting high-level profile specifications into executable operation sequences. This initialization establishes the foundation for systematic profile execution through the state machine architecture.

At 718, the technique 700 sets up a state machine to manage the sequential execution of operations defined by the profile. For example, a state machine initialization system (e.g., the profile state machine execution tool 312 shown in FIG. 3) may configure initial state parameters, establish state transition rules based on profile specifications, and prepare operation handlers for each connection phase. The state machine setup enables systematic progression through connection establishment phases including initialization, handshake, data exchange, and termination procedures.

At 720, the technique 700 begins profile execution by initiating the first phase of the connection establishment process as defined by the loaded profile. For example, a profile execution controller (e.g., the profile state machine execution tool 312 shown in FIG. 3) may start the initial operations, begin certificate validation procedures, or initiate key exchange protocols according to profile specifications. This execution initiation represents the transition from preparation activities to active connection establishment procedures.

At 722, the technique 700 monitors execution progress to track the advancement of connection establishment procedures and detect potential issues or failures. For example, an execution monitoring system (e.g., the profile execution tool 308 shown in FIG. 3) may observe state machine transitions, validate intermediate results, track protocol message exchanges, and assess execution timing against expected parameters. This monitoring capability enables early detection of connection problems and facilitates appropriate error handling responses.

At 724, the technique 700 evaluates whether the profile execution process has completed successfully with the required operations and protocol exchanges finished correctly. For example, an execution success evaluator (e.g., the profile execution tool 308 shown in FIG. 3) may verify that the state machine phases have completed successfully, validate that handshake procedures have established secure channels, and confirm that connection parameters meet security and functionality requirements. This success evaluation determines whether the connection establishment process can proceed to completion or may involve error handling procedures.

At 726, when execution succeeds, the technique 700 establishes the connection and transitions to operational data exchange mode. For example, a connection establishment finalizer (e.g., the profile state machine execution tool 312 shown in FIG. 3) may activate secure data channels, notify other system components of the establishment of the connection, and prepare the system for secure data transmission and reception. The establishment of the connection represents the completion of the profile execution process and the beginning of secure communication operations.

At 728, when execution fails, the technique 700 handles execution errors by analyzing failure conditions and determining appropriate recovery procedures. For example, an error handling system (e.g., the profile execution tool 308 shown in FIG. 3) may diagnose connection failures, categorize error types, assess recovery possibilities, and determine whether alternative profiles or fallback procedures should be attempted. This error handling capability enables the system to respond intelligently to connection failures and improve connection success rates.

At 730, the technique 700 evaluates whether retry attempts are possible and potentially beneficial for addressing the current execution failure. For example, a retry assessment system (e.g., the profile execution tool 308 shown in FIG. 3) may analyze error conditions to determine if transient network issues, temporary server unavailability, or recoverable protocol errors might be resolved through retry attempts. This retry evaluation enables the system to distinguish between permanent failures and temporary conditions that might be resolved through additional attempts.

At 732, when retry is possible, the technique 700 sets a fallback profile that can provide an alternative means for connection establishment. For example, a fallback profile selector (e.g., the profile execution tool 308 shown in FIG. 3) may communicate with the profile creation tool 316 to obtain alternative profiles with different algorithm selections, reduced complexity, or different compatibility characteristics. This fallback mechanism facilitates connection reliability by providing alternative approaches when primary profiles encounter execution difficulties.

At 734, when retry is not possible or fallback attempts have been exhausted, the technique 700 reports connection failure to inform users and system components of the unsuccessful connection attempt. For example, a failure reporting system (e.g., the profile execution tool 308 shown in FIG. 3) may generate user notifications, log failure details for diagnostic purposes, and provide error information to the general application 306 for user interface presentation.

At 736, upon establishment of the connection, the technique 700 may optionally start performance monitoring to assess connection effectiveness and identify potential optimization opportunities. For example, a performance monitoring initializer (e.g., the profile execution tool 308 shown in FIG. 3) may begin collecting connection performance metrics, establish monitoring parameters, and prepare obfuscated data collection mechanisms for ongoing connection assessment. This performance monitoring represents an optional enhancement that enables continuous improvement of connection quality and profile effectiveness.

At 738, the technique 700 collects effectiveness metrics to quantify connection performance characteristics and identify areas for potential improvement. For example, a metrics collection system (e.g., the profile execution tool 308 shown in FIG. 3) may measure connection throughput, latency characteristics, error rates, and resource utilization patterns to assess overall connection effectiveness. These metrics provide valuable data for adjusting future profile selections and improving system performance.

At 740, the technique 700 evaluates whether an adjustment is needed based on collected performance metrics and established performance thresholds. For example, an assessment system (e.g., the profile execution tool 308 shown in FIG. 3) may compare current performance metrics against expected values, identify performance bottlenecks or inefficiencies, and determine whether profile modifications or alternative approaches might improve connection characteristics.

At 742, when a modification is needed, the technique 700 requests a profile modification to obtain profiles with different performance characteristics. For example, a profile modification requester (e.g., the profile execution tool 308 shown in FIG. 3) may communicate performance metrics and modification requirements to the profile creation tool 316 or profile tool 332 to obtain profiles with different performance characteristics. This capability enables continuous improvement of connection performance through profile refinement and adaptation.

At 744, the technique 700 updates the profile cache with optimized profiles to facilitate improved performance for future connections. For example, a profile cache updater (e.g., the local store 322 shown in FIG. 3) may store optimized profile data, update profile metadata, and maintain version information to facilitate the use of improved profiles in subsequent connection attempts. This cache updating mechanism enables the system to learn from performance experience and continuously improve connection effectiveness over time.

Figure 8:
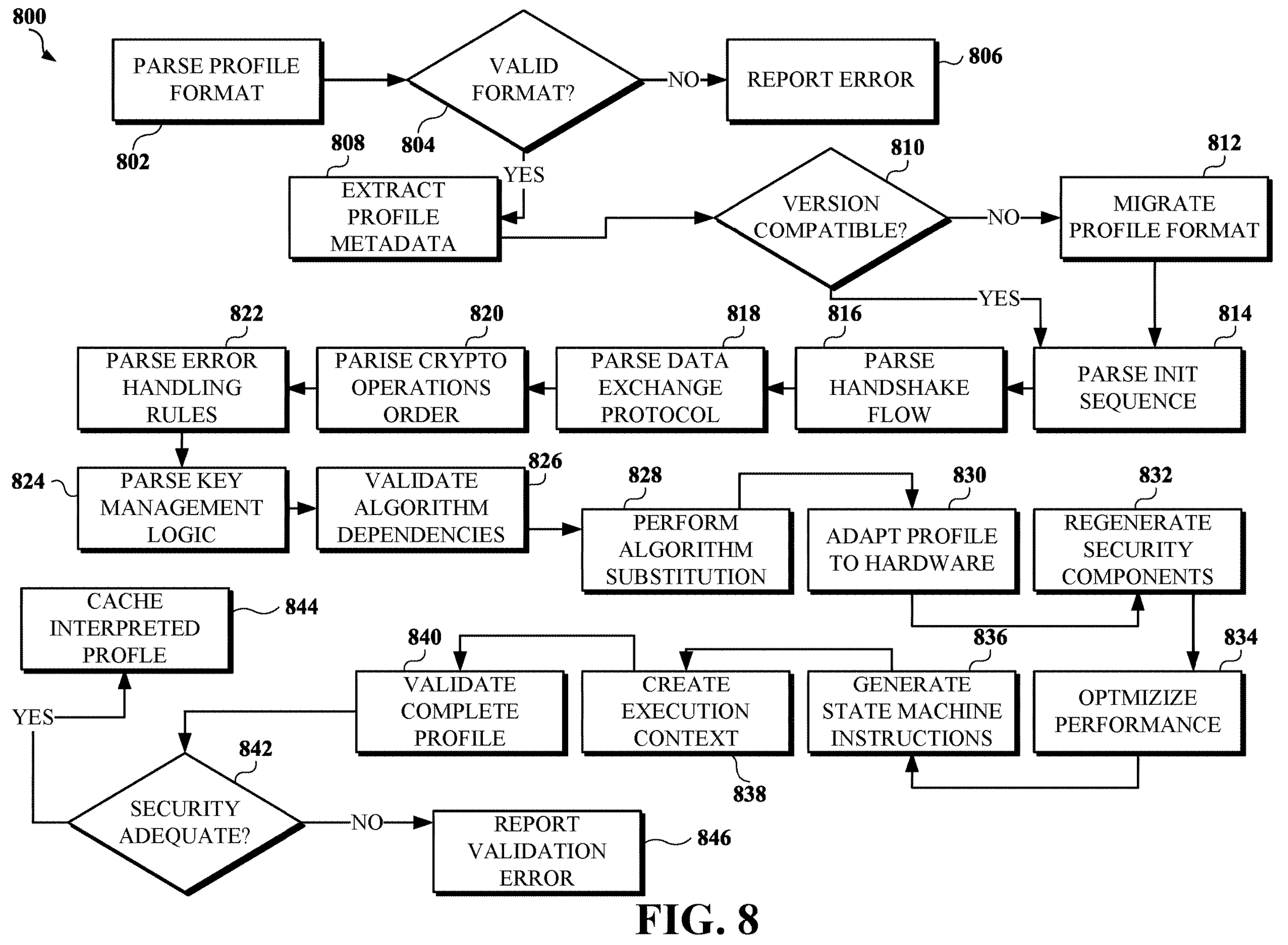
FIG. 8 is a flowchart of an example of a technique for parsing, validating, and transforming protocol profile definitions from their stored format into executable instructions for the state machine.

FIG. 8 is a flowchart of an example of a technique 800 for parsing, validating, and transforming protocol profile definitions from their stored format into executable instructions for the state machine. The technique 800 can be implemented in whole or in part by the profile interpreter tool 310, profile state machine execution tool 312, and cryptographic subsystem 314 of FIG. 3. The technique 800 may be triggered when the profile execution tool 308 provides a profile for interpretation and preparation for state machine execution.

At 802, the technique 800 parses the profile format to extract structural information and validate the profile's basic organization. For example, a profile interpreter tool (e.g., the profile interpreter tool 310 shown in FIG. 3) may analyze profile data structures, identify format specifications such as XML or JSON encoding, and extract fundamental organizational elements that define the profile's structure. This parsing process establishes the foundation for subsequent profile interpretation activities by creating accessible data structures from stored profile definitions.

At 804, the technique 800 evaluates whether the parsed profile format is valid and conforms to expected structural requirements. For example, a format validation system (e.g., the profile interpreter tool 310 shown in FIG. 3) may verify profile schema compliance, validate required elements presence, and confirm structural integrity of the parsed profile data. This validation facilitates reliable profile processing by identifying format issues that would prevent successful profile interpretation and execution.

At 806, when format validation fails, the technique 800 reports an error condition to indicate that the profile cannot be processed due to format issues. For example, an error reporting system (e.g., the profile interpreter tool 310 shown in FIG. 3) may generate diagnostic messages identifying specific format violations, provide error details to calling systems, and terminate profile processing to prevent execution of invalid profiles.

At 808, when format validation succeeds, the technique 800 extracts profile metadata including version information, creation timestamps, target hardware specifications, and compatibility requirements. For example, a metadata extraction system (e.g., the profile interpreter tool 310 shown in FIG. 3) may parse profile headers, identify version identifiers, extract hardware capability requirements, and collect compatibility information that guides subsequent processing decisions. This metadata extraction may provide information for version compatibility checking and hardware adaptation procedures.

At 810, the technique 800 evaluates whether the profile version is compatible with the current device capabilities and interpreter requirements. For example, a version compatibility checker (e.g., the profile interpreter tool 310 shown in FIG. 3) may compare profile version identifiers against supported version ranges, validate feature compatibility between profile requirements and system capabilities, and assess whether direct profile interpretation is possible. This compatibility evaluation determines whether profile migration is required before interpretation can proceed.

At 812, when version compatibility issues are detected, the technique 800 migrates the profile format to make it compatible with current system capabilities. For example, a profile migration system (e.g., the profile interpreter tool 310 shown in FIG. 3) may convert deprecated profile elements to current equivalents, update algorithm specifications to supported versions, and transform profile structures to match current interpreter requirements. This migration capability facilitates backward compatibility and enables the use of profiles created for different system versions.

The technique 800 then performs a profile content parsing phase (814 through 826). At 814, the technique 800 parses the initialization sequence specified in the profile. The initialization sequence defines the initial setup operations for connection establishment. For example, an initialization parser (e.g., the profile interpreter tool 310 shown in FIG. 3) may extract key generation parameters, identify initial cryptographic setup requirements, and parse system initialization procedures specified by the profile. This initialization sequence parsing represents the first phase of detailed profile content interpretation.

At 816, the technique 800 parses a handshake flow specified in the profile. The handshake flow defines the negotiation and authentication procedures for establishing secure connections. For example, a handshake flow parser (e.g., the profile interpreter tool 310 shown in FIG. 3) may extract certificate validation procedures, identify key exchange protocols, parse authentication sequences, and define negotiation parameters specified by the profile. This handshake flow parsing captures the connection establishment procedures that will be executed by the state machine.

At 818, the technique 800 parses a data exchange protocol specified in the profile. The data exchange protocol defines how data will be transmitted and received once the secure connection is established. For example, a data exchange parser (e.g., the profile interpreter tool 310 shown in FIG. 3) may extract encryption parameters for data protection, identify data integrity verification procedures, parse flow control mechanisms, and define data handling protocols specified by the profile.

At 820, the technique 800 parses a cryptographic operations order specified in the profile. The cryptographic operations order specifies the sequence and timing of cryptographic functions throughout the connection lifecycle. For example, a cryptographic operations parser (e.g., the profile interpreter tool 310 shown in FIG. 3) may extract operation sequencing rules, identify cryptographic function dependencies, parse timing requirements for cryptographic operations, and define the order of cryptographic procedures specified by the profile.

At 822, the technique 800 parses error handling rules specified in the profile. The error handling rules define how the system should respond to various error conditions and failure scenarios. For example, an error handling parser (e.g., the profile interpreter tool 310 shown in FIG. 3) may extract error detection procedures, identify recovery mechanisms for different failure types, parse fallback strategies for error conditions, and define error response protocols specified by the profile.

At 824, the technique 800 parses key management logic specified in the profile. The key management logic defines key generation, distribution, rotation, and revocation procedures throughout the connection lifecycle. For example, a key management parser (e.g., the profile interpreter tool 310 shown in FIG. 3) may extract key lifecycle specifications, identify key rotation timing and procedures, parse key distribution mechanisms, and define key security requirements specified by the profile.

At 826, the technique 800 validates algorithm dependencies to verify that the cryptographic algorithms specified in the profile are available and properly supported. For example, an algorithm dependency validator (e.g., the profile interpreter tool 310 shown in FIG. 3) may check algorithm availability in cryptographic libraries, validate algorithm parameter compatibility, verify algorithm interdependencies, and assess whether all profile-specified algorithms can be utilized successfully.

The technique 800 then starts a profile adaptation phase (828 through 832). At 828, the technique 800 performs algorithm substitution when some algorithms are not available by conducting an embedded evaluation process that determines algorithm availability and substitutes compatible alternatives when necessary. For example, an algorithm substitution system (e.g., the profile interpreter tool 310 shown in FIG. 3) may first evaluate whether the specified algorithms are available, and when algorithms are unavailable, identify functionally equivalent alternatives, validate substitute algorithm compatibility, and modify profile specifications to utilize available algorithms while preserving security and functional requirements. This substitution process may involve no changes when all algorithms are available or significant modifications when multiple substitutions are required.

At 830, the technique 800 adapts the profile to hardware capabilities by conducting an embedded evaluation process that determines hardware compatibility and generates hardware-specific adaptations when necessary. For example, a hardware adaptation system (e.g., the profile interpreter tool 310 shown in FIG. 3) may first evaluate whether the profile is compatible with current hardware capabilities, and when compatibility issues exist, modify algorithm selections to utilize available hardware acceleration features, adjust performance parameters based on hardware limitations, and generate hardware-adapted profile components that maximize performance while maintaining security requirements. This adaptation process may preserve the original profile when hardware is compatible or create extensively modified versions when significant adaptation is required.

At 832, the technique 800 regenerates security components by conducting an embedded evaluation process that determines security adequacy and generates enhanced security elements when necessary. For example, a security regeneration system (e.g., the profile interpreter tool 310 shown in FIG. 3) may first evaluate whether current security components meet established security requirements, and when security is inadequate, generate stronger cryptographic parameters, enhance key size specifications, modify authentication requirements, and create security components that meet or exceed security policy requirements. This regeneration process may maintain existing security components when they are adequate or generate entirely new security specifications when enhanced protection is required.

The technique 800 then begins a profile optimization phase (834 through 840). At 834, the technique 800 optimizes performance characteristics of the interpreted profile to maximize efficiency while maintaining security and functional requirements. For example, a performance optimization system (e.g., the profile interpreter tool 310 shown in FIG. 3) may analyze profile execution characteristics, identify performance improvement opportunities, optimize algorithm selection for current hardware capabilities, and refine operational parameters to enhance connection performance. This optimization phase represents the beginning of profile refinement procedures that prepare the profile for efficient state machine execution.

At 836, the technique 800 generates state machine instructions that translate the parsed and adapted profile into executable commands for the profile state machine execution tool 312. For example, an instruction generation system (e.g., the profile interpreter tool 310 shown in FIG. 3) may convert high-level profile specifications into low-level state machine commands, create instruction sequences for each connection phase, generate conditional execution logic for error handling, and produce executable instructions that the profile state machine execution tool 312 can execute directly.

At 838, the technique 800 creates an execution context that provides the runtime environment and supporting data structures required for profile execution. An execution context refers to a runtime container of all the data and resources needed to execute the state machine's instructions. For example, an execution context creator (e.g., the profile interpreter tool 310 shown in FIG. 3) may initialize data structures for state management, prepare memory allocation for cryptographic operations, establish interface connections to the cryptographic subsystem 314, and configure runtime parameters that support profile execution.

At 840, the technique 800 validates the complete profile to verify that the interpretation, adaptation, and optimization procedures have produced a functionally correct and secure profile ready for execution. This validation is a final, comprehensive check performed to ensure the integrity of the entire profile after it has been parsed and adapted. For example, a complete profile validator (e.g., the profile interpreter tool 310 shown in FIG. 3) may verify instruction sequence correctness, validate security parameter adequacy, confirm hardware compatibility, and assess overall profile integrity to facilitate successful state machine execution.

At 842, the technique 800 evaluates whether security requirements are adequately addressed by the final interpreted profile. For example, a security adequacy evaluator (e.g., the profile interpreter tool 310 shown in FIG. 3) may compare final security parameters against policy requirements, validate cryptographic strength against threat models, assess authentication mechanisms against security standards, and determine whether the interpreted profile provides sufficient security for the intended connection context.

At 844, when security requirements are adequately addressed, the technique 800 caches the interpreted profile for efficient reuse in future connection attempts. For example, a profile caching system (e.g., the local store 322 shown in FIG. 3) may store the interpreted profile with metadata indicating hardware compatibility, security level, and usage context to facilitate rapid profile retrieval for subsequent connections with similar requirements.

At 846, when security requirements are not adequately addressed, the technique 800 reports a validation error to indicate that the profile cannot be used for secure connections due to insufficient security characteristics. For example, a validation error reporting system (e.g., the profile interpreter tool 310 shown in FIG. 3) may generate error messages identifying specific security deficiencies, provide diagnostic information for profile correction, and terminate profile processing to prevent the use of inadequately secured profiles in connection establishment procedures.

Figure 9A:
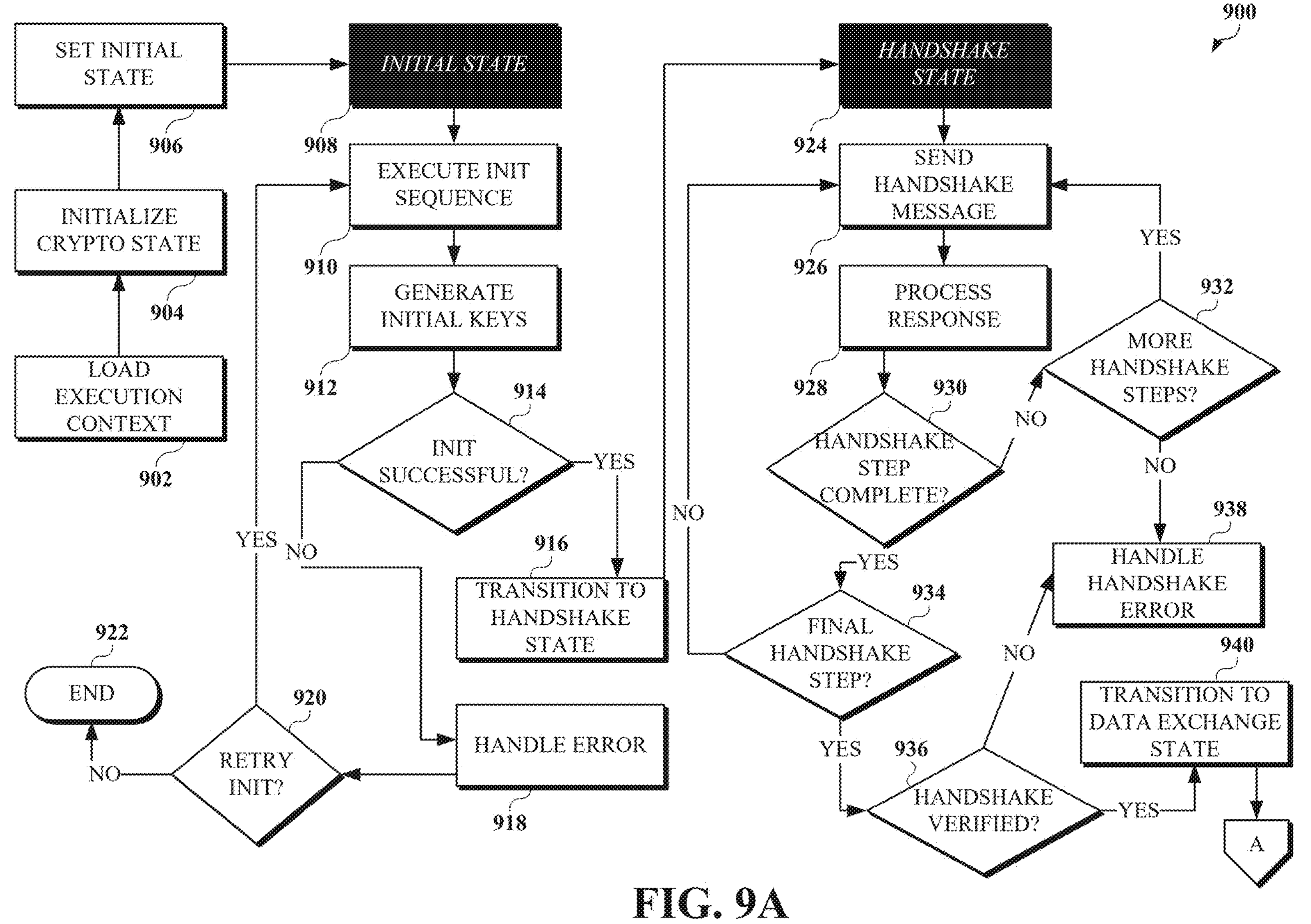
FIGS. 9A-9B is a flowchart of an example of a technique for executing the actual protocol flow by maintaining a connection state and orchestrating the precise sequence of cryptographic operations defined by the profile through a state machine architecture.
Figure 9B:
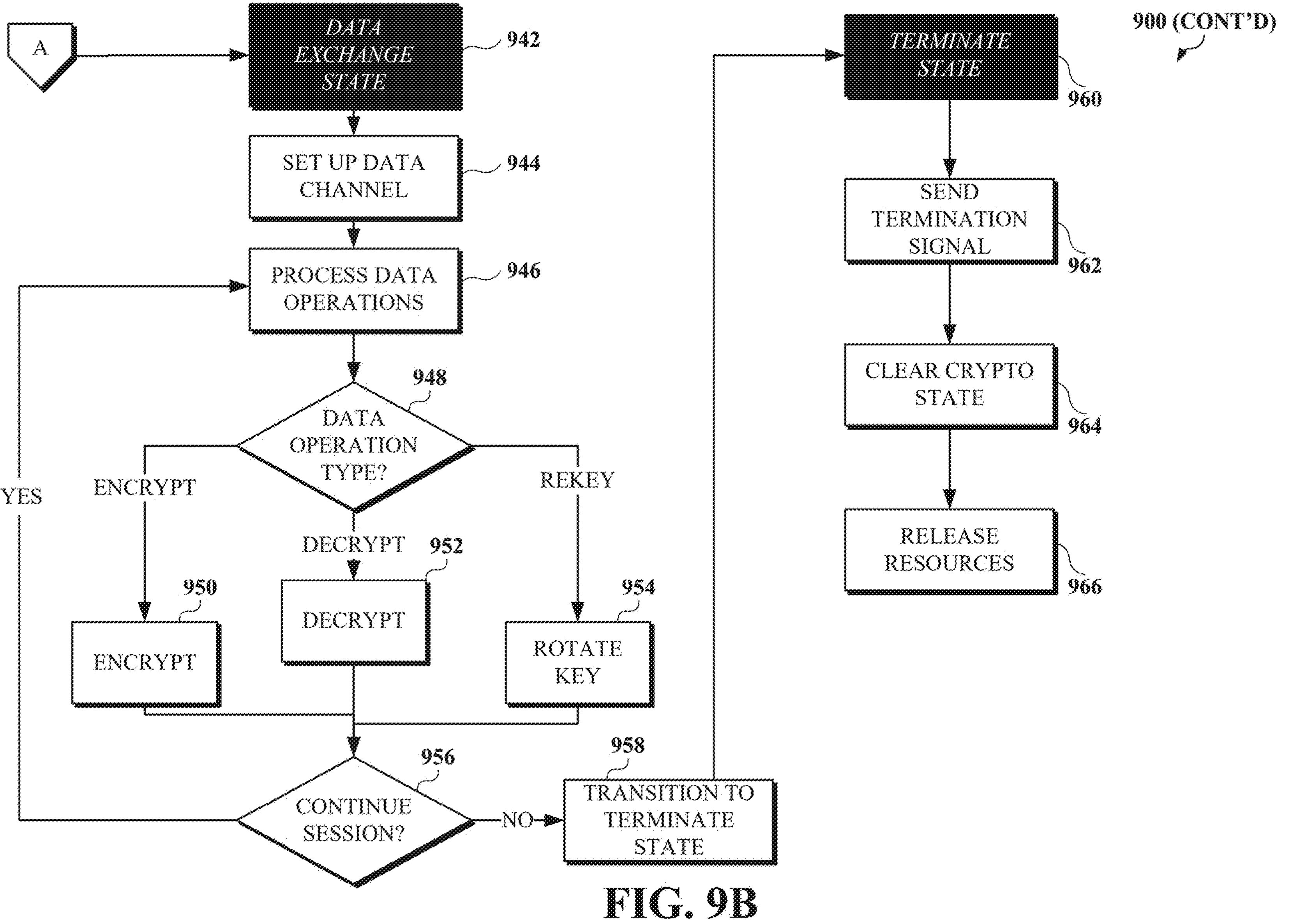

FIGS. 9A-9B is a flowchart of an example of a technique 900 for executing the actual protocol flow by maintaining a connection state and orchestrating the precise sequence of operations defined by the profile through a state machine architecture. The technique 900 can be implemented in whole or in part by the profile state machine execution tool 312, the cryptographic subsystem 314, and the profile interpreter tool 310 of FIG. 3. The technique 900 may be triggered when a user initiates a connection request through the general application 306, which then causes the profile execution tool 308 to initiate profile execution after successful profile loading and validation procedures.

The technique 900 progresses through four distinct execution states that manage different phases of the secure connection lifecycle. An initialization state facilitates foundational cryptographic setup operations including key generation, system parameter configuration, and preliminary security checks required before connection establishment. A handshake state manages connection negotiation and authentication procedures including certificate validation, key exchange protocols, and secure channel establishment with remote endpoints. A data exchange state coordinates ongoing data transmission and reception operations including data encryption, decryption, and periodic key rotation procedures throughout the active connection period. The terminate state handles secure connection cleanup operations including termination signal transmission, cryptographic state clearing, and system resource release to complete the connection lifecycle At 902, the technique 900 loads the execution context, which provides the runtime environment and data structures used for state machine operation. For example, an execution context loader (e.g., the profile state machine execution tool 312 shown in FIG. 3) may initialize memory structures for state management, establish connections to the cryptographic subsystem 314, load profile-specific parameters, and prepare runtime data structures that support state machine execution. This context loading establishes the foundation for systematic execution of operations defined by the interpreted profile.

At 904, the technique 900 initializes the cryptographic state to prepare cryptographic systems for protocol execution. For example, a cryptography initialization system (e.g., the profile state machine execution tool 312 shown in FIG. 3) may configure cryptographic libraries through the cryptographic subsystem 314, establish algorithm parameters based on profile specifications, initialize random number generators, and prepare cryptographic resources for subsequent operations. This cryptographic state initialization facilitates reliable cryptographic operations throughout the connection establishment and data exchange phases.

At 906, the technique 900 sets the initialization state to establish the starting point for state machine execution according to profile specifications. For example, a state initialization system (e.g., the profile state machine execution tool 312 shown in FIG. 3) may configure initial state parameters, establish state transition rules based on profile definitions, set initial connection variables, and prepare the state machine for entry into the first protocol execution phase.

At 908, the technique 900 enters the initialization state, which represents the first major phase of the protocol execution process where foundational cryptographic setup operations are performed. This state entry establishes the execution context for performing initial key generation, system parameter setup, and preliminary cryptographic operations as defined by the profile specifications.

At 910, the technique 900 executes the initialization sequence by performing the setup operations specified in the initialization phase of the profile. For example, an initialization executor (e.g., the profile state machine execution tool 312 shown in FIG. 3) may perform system parameter validation, execute cryptographic algorithm initialization procedures, establish communication parameters, and perform preliminary security checks as defined by the interpreted profile instructions.

At 912, the technique 900 generates initial keys used for subsequent cryptographic operations in the protocol flow. For example, a key generation system (e.g., the cryptographic subsystem 314 shown in FIG. 3) may create symmetric encryption keys, generate asymmetric key pairs, establish key derivation parameters, and produce initial cryptographic materials according to profile specifications and current security requirements.

At 914, the technique 900 evaluates whether the initialization process completed successfully by testing whether the initialization operations have been completed without errors. For example, an initialization success evaluator (e.g., the profile state machine execution tool 312 shown in FIG. 3) may verify that key generation completed successfully, validate that cryptographic systems are configured, confirm that initialization sequence operations successfully executed, and assess whether the system is ready to proceed to handshake operations.

At 916, if the initialization succeeds (at 914), the technique 900 transitions to a handshake state to begin the connection negotiation and authentication phase of the protocol. For example, a state transition controller (e.g., the profile state machine execution tool 312 shown in FIG. 3) may update state machine status, prepare handshake operation parameters, configure handshake message handling systems, and establish the execution context for handshake protocol operations.

At 918, when initialization fails (at 914), the technique 900 handles initialization errors by analyzing failure conditions and determining appropriate recovery procedures. For example, an error handling system (e.g., the profile state machine execution tool 312 shown in FIG. 3) may diagnose initialization failures, categorize error types, assess recovery possibilities, and determine whether retry attempts or error reporting procedures should be initiated.

At 920, the technique 900 evaluates whether retry of initialization procedures is possible and potentially beneficial for addressing the initialization failure. For example, a retry assessment system (e.g., the profile state machine execution tool 312 shown in FIG. 3) may analyze error conditions to determine if transient failures, resource availability issues, or recoverable cryptographic errors might be resolved through additional initialization attempts.

At 922, when retry is not possible or when initialization ultimately fails after retry attempts, the technique 900 ends the state machine execution and reports failure conditions to calling systems. This termination represents unsuccessful completion of the protocol execution attempt.

At 924, the technique 900 enters the handshake state, which represents the second major phase of protocol execution where connection negotiation, authentication, and secure channel establishment operations are performed. This state entry establishes the execution context for performing certificate validation, key exchange, and authentication procedures as defined by the profile specifications.

At 926, the technique 900 sends handshake messages to the remote endpoint to initiate or continue the handshake negotiation process. For example, a handshake message sender (e.g., the profile state machine execution tool 312 shown in FIG. 3) may transmit certificate information, send key exchange data, provide authentication credentials, or deliver protocol negotiation messages according to the handshake sequence defined by the profile.

At 928, the technique 900 processes response messages received from the remote endpoint during handshake operations. For example, a response processing system (e.g., the profile state machine execution tool 312 shown in FIG. 3) may wait for handshake response messages, validate received certificate information, process key exchange data from the remote endpoint, and analyze authentication responses according to profile-specified handshake procedures.

At 930, the technique 900 evaluates whether the current handshake step has completed successfully by testing whether the expected handshake operations for the current step have been finished. For example, a handshake step evaluator (e.g., the profile state machine execution tool 312 shown in FIG. 3) may verify that message exchanges for the current step have completed, validate that operations have succeeded, and assess whether the handshake can proceed to subsequent steps.

At 932, when the current handshake step is not complete, the technique 900 evaluates whether more handshake steps remain in the current handshake phase. For example, a handshake step counter (e.g., the profile state machine execution tool 312 shown in FIG. 3) may assess progress through the handshake sequence, determine if additional message exchanges are to be performed, and identify whether the handshake process should continue with additional steps or proceed to completion evaluation.

At 934, when the current handshake step is complete, the technique 900 evaluates whether this represents the final handshake step in the handshake sequence. For example, a final step detector (e.g., the profile state machine execution tool 312 shown in FIG. 3) may compare current handshake progress against profile-defined handshake sequence length, assess whether the handshake operations have been completed, and determine whether handshake verification should be initiated.

At 936, when the final handshake step is reached, the technique 900 evaluates whether the handshake has been verified successfully by testing the overall handshake integrity and authentication results. For example, a handshake verification system (e.g., the profile state machine execution tool 312 shown in FIG. 3) may verify certificate chains, validate authentication credentials, confirm key exchange integrity, and assess whether the established secure channel meets security requirements specified by the profile.

At 938, when handshake steps are incomplete or handshake verification fails, the technique 900 handles handshake errors by analyzing failure conditions and determining appropriate recovery procedures. For example, a handshake error handler (e.g., the profile state machine execution tool 312 shown in FIG. 3) may diagnose handshake failures, identify specific error conditions, assess whether retry attempts are appropriate, and determine whether alternative handshake approaches should be attempted.

At 940, when handshake verification succeeds, the technique 900 transitions to data exchange state to begin data transmission and reception operations. For example, a data exchange transition controller (e.g., the profile state machine execution tool 312 shown in FIG. 3) may configure data channel parameters, establish encryption contexts for data operations, prepare data handling systems, and initialize the data exchange execution environment.

At 942, the technique 900 enters the data exchange state, which represents the third major phase of protocol execution where encrypted data transmission, reception, and key management operations are performed throughout the active connection lifecycle. This state entry establishes the execution context for performing data encryption, decryption, and key rotation operations as defined by the profile specifications.

At 944, the technique 900 sets up the data channel by configuring parameters and establishing data transmission capabilities. For example, a data channel setup system (e.g., the profile state machine execution tool 312 shown in FIG. 3) may configure data encryption algorithms, establish data integrity verification mechanisms, prepare data transmission buffers, and initialize data handling systems according to profile specifications and established secure channel parameters.

At 946, the technique 900 processes data operations by managing the various types of operations performed during data exchange. For example, a data operation processor (e.g., the profile state machine execution tool 312 shown in FIG. 3) may coordinate data encryption and decryption operations, manage key rotation procedures, handle data integrity verification, and orchestrate the various cryptographic functions for secure data exchange.

At 948, the technique 900 evaluates the data operation type to determine which specific operation should be performed, functioning as a case statement that directs execution to appropriate operation handlers. For example, an operation type classifier (e.g., the profile state machine execution tool 312 shown in FIG. 3) may analyze current data operation requirements, identify whether encryption, decryption, or key rotation operations are to be performed, and direct execution to appropriate operation-specific procedures.

At 950, for an encryption operation, the technique 900 performs the encrypt operation to protect outgoing data according to profile-specified encryption parameters. For example, an encryption operation handler (e.g., the cryptographic subsystem 314 shown in FIG. 3) may encrypt outgoing data using established encryption keys, apply data integrity protection mechanisms, format encrypted data for transmission, and manage encryption context according to profile specifications and current security parameters.

At 952, for a decryption operations, the technique 900 performs the decrypt operation to recover plaintext data from received encrypted data. For example, a decryption operation handler (e.g., the cryptographic subsystem 314 shown in FIG. 3) may decrypt incoming encrypted data using established decryption keys, verify data integrity protection mechanisms, extract plaintext data for application use, and manage decryption context according to profile specifications.

At 954, for a key rotation operation, the technique 900 performs the rotate key operation to refresh encryption keys according to profile-specified key management procedures. For example, a key rotation handler (e.g., the cryptographic subsystem 314 shown in FIG. 3) may generate new encryption keys, coordinate key exchange with remote endpoints, update encryption and decryption contexts with new key material, and manage key lifecycle according to profile security requirements and key rotation policies.

At 956, the technique 900 evaluates whether the session should continue by testing whether additional data operations are to be performed or whether the connection should be terminated. For example, a session continuation evaluator (e.g., the profile state machine execution tool 312 shown in FIG. 3) may assess connection status, monitor for termination requests, evaluate session timeout conditions, and determine whether data exchange operations should continue or whether transition to termination procedures should be initiated.

At 958, when session continuation is not indicated, the technique 900 transitions to the terminate state to begin connection cleanup and resource release procedures. For example, a termination transition controller (e.g., the profile state machine execution tool 312 shown in FIG. 3) may prepare termination procedures, configure cleanup operations, establish termination message handling, and initialize the termination execution environment.

At 960, the technique 900 enters the terminate state, which represents the final major phase of protocol execution where connection cleanup, resource release, and secure termination operations are performed. This state entry establishes the execution context for performing secure connection termination, cryptographic state cleanup, and resource deallocation as defined by the profile specifications.

At 962, the technique 900 sends termination signals to notify remote endpoints and other system components of connection termination. For example, a termination signal sender (e.g., the profile state machine execution tool 312 shown in FIG. 3) may transmit connection termination messages, notify remote endpoints of session closure, send cleanup notifications to system components, and provide termination status information according to profile-specified termination procedures.

At 964, the technique 900 clears crypto state by securely removing cryptographic materials and resetting cryptographic system parameters. For example, a crypto state clearer (e.g., the cryptographic subsystem 314 shown in FIG. 3) may securely erase encryption keys, clear cryptographic contexts, reset algorithm parameters, and remove sensitive cryptographic materials to prevent unauthorized access to connection-specific cryptographic information.

At 966, the technique 900 releases resources by deallocating memory, closing communication channels, and returning system resources to available pools. For example, a resource release system (e.g., the profile state machine execution tool 312 shown in FIG. 3) may deallocate execution context memory, close network connections, release cryptographic library resources, and clean up data structures used during protocol execution. This resource release completes the state machine execution cycle and prepares the system for subsequent connection attempts.

Figure 10:
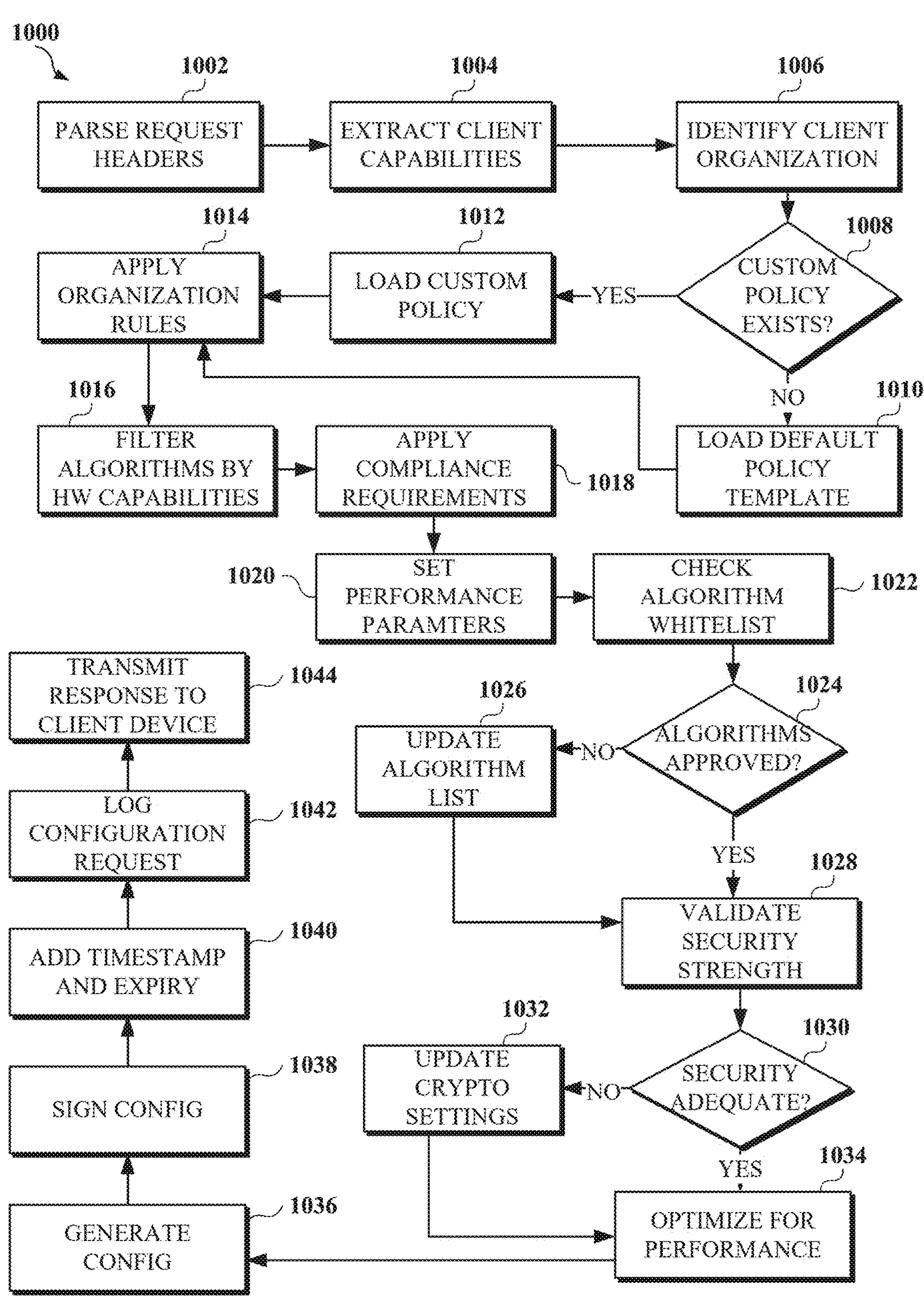
FIG. 10 is a flowchart of an example of a technique for handling client configuration requests by applying organizational policies, filtering algorithms based on hardware capabilities, and enforcing compliance requirements across diverse client populations.

FIG. 10 is a flowchart of an example of a technique 1000 for handling client configuration requests by applying organizational policies, filtering algorithms based on hardware capabilities, and enforcing compliance requirements across diverse client populations. The technique 1000 can be implemented in whole or in part by the config tool 328 of the server infrastructure 304 shown in FIG. 3. The technique 1000 may be triggered when the config tool 328 receives a configuration request from a client device through the config management tool 326.

At 1002, the technique 1000 parses request headers to extract communication metadata and request context information from the incoming client configuration request. For example, a request header parser (e.g., the config tool 328 shown in FIG. 3) may analyze HTTP headers, authentication tokens, request timestamps, and protocol version information to understand the nature and context of the configuration request. The request header parsing may include validating request format compliance, extracting security credentials, identifying request priority levels, and determining communication protocol requirements.

At 1004, the technique 1000 extracts client capabilities from the parsed request to identify the hardware and software characteristics of the requesting client device. For example, a capability extraction system (e.g., the config tool 328 shown in FIG. 3) may parse capability data including processor architecture specifications, available cryptographic acceleration features, memory configurations, and supported algorithm lists provided by the client device through the testing tool 320. This capability extraction enables the server to understand the technical constraints and optimization opportunities available for the specific client configuration.

At 1006, the technique 1000 identifies the client organization, if any, to determine applicable policies, security requirements, and compliance frameworks for the requesting client. For example, an organization identification system (e.g., the config tool 328 shown in FIG. 3) may analyze authentication credentials, domain information, or organizational identifiers to determine the appropriate policy framework and retrieve organizational policies from an organizational policies store such as a database containing enterprise-specific security requirements, compliance mandates, and configuration standards. This organizational identification facilitates the application of appropriate governance and security controls based on the client's organizational context.

At 1008, the technique 1000 evaluates whether custom policies exist for the identified client organization by testing whether organization-specific configuration rules have been defined. For example, a policy existence checker (e.g., the config tool 328 shown in FIG. 3) may query policy databases to determine if the identified organization has established custom security requirements, algorithm preferences, or compliance specifications that differ from standard default configurations. This evaluation determines whether specialized organizational policies should be applied or whether standard default policies are appropriate.

At 1010, when custom policies do not exist, the technique 1000 loads a default policy template that provides standard configuration parameters applicable to general client requirements. For example, a default policy loader (e.g., the config tool 328 shown in FIG. 3) may retrieve a template from a default template store such as a database containing standard security configurations, algorithm selections, and performance parameters that represent best practices for typical deployment scenarios. From 1010, the technique 1000 proceeds to 1014.

At 1012, when custom policies exist, the technique 1000 loads the custom policy specific to the identified organization to apply specialized configuration requirements. For example, a custom policy loader (e.g., the config tool 328 shown in FIG. 3) may retrieve organization-specific policies that may include requirements such as mandatory use of Federal Information Processing Standards approved algorithms for government organizations, specific key length requirements for financial institutions, restricted algorithm lists for export-controlled entities, or enhanced authentication requirements for healthcare organizations handling protected health information. These custom policies reflect the unique security, compliance, and operational requirements of specific organizational contexts.

At 1014, the technique 1000 applies organization rules to incorporate organizational governance requirements into the configuration generation process. For example, an organization rule processor (e.g., the config tool 328 shown in FIG. 3) may implement organizational policies including user access controls based on role-based permissions, geographic restrictions for international operations, time-based access limitations for enhanced security, and data classification handling requirements that dictate appropriate cryptographic strength levels based on information sensitivity classifications.

When applying organization rules at step 1014, the technique 1000 may implement various policy types. Examples of organization rules may include: role-based access controls that deny connections to specific networks or machines (such as preventing junior engineers from accessing live production database servers), geographic restrictions where internal networks can only be accessed from specific countries or public WiFi networks are prohibited from accessing work networks, time-based access controls that deny connections during specified hours (such as between 2 AM to 6 AM), and device trust requirements that only allow company-issued devices with TPM capabilities along with certificate verification, multi-factor authentication, and device attestation.

At 1016, the technique 1000 filters algorithms by hardware capabilities to identify cryptographic algorithms that are compatible with the client device's hardware configuration. For example, an algorithm compatibility filter (e.g., the config tool 328 shown in FIG. 3) may analyze client hardware capabilities against algorithm requirements to eliminate algorithms that require unavailable hardware acceleration features, exclude algorithms that exceed available memory or processing resources, and prioritize algorithms that can utilize detected hardware optimization capabilities such as AES-NI instructions or dedicated cryptographic coprocessors.

At 1018, the technique 1000 applies compliance requirements to validate that proposed configurations meet regulatory and industry standards applicable to the client organization. For example, a compliance validation system (e.g., the config tool 328 shown in FIG. 3) may implement compliance checks such as validating that encryption algorithms meet minimum strength requirements specified by industry regulations, confirming that key management procedures comply with applicable standards, verifying that authentication mechanisms satisfy regulatory requirements for data protection, and ensuring that logging and auditing capabilities meet compliance documentation requirements. Examples of compliance checks may include verifying that encryption algorithms used in profiles are FIPS-approved and appear on NIST-approved lists, or ensuring compliance with regulatory standards such as HIPAA requirements that mandate AES-256 as the minimum cryptographic strength, thereby preventing the use of weaker algorithms such as AES-192.

At 1020, the technique 1000 sets performance parameters to optimize configuration settings for the specific hardware capabilities and operational requirements of the client device. For example, a performance parameter optimizer (e.g., the config tool 328 shown in FIG. 3) may configure algorithm-specific parameters including optimal key sizes for detected hardware acceleration capabilities, connection timeout values based on network characteristics, encryption buffer sizes optimized for available memory configurations, and thread allocation parameters for multicore processor utilization.

At 1022, the technique 1000 checks an algorithm whitelist to verify that proposed algorithms are approved for use within the organizational security framework. For example, an algorithm whitelist validator (e.g., the config tool 328 shown in FIG. 3) may compare filtered algorithms against organizational approved algorithm lists, validate algorithm versions against security policy requirements, and confirm that algorithm combinations meet organizational security standards and compliance requirements.

At 1024, the technique 1000 evaluates whether algorithms are approved by testing whether the proposed algorithm configuration satisfies organizational approval requirements. For example, an algorithm approval evaluator (e.g., the config tool 328 shown in FIG. 3) may verify that all selected algorithms appear on organizational whitelists, confirm that algorithm strength levels meet minimum requirements, and validate that algorithm combinations are compatible with organizational security policies.

At 1026, when an algorithm is not approved, the technique 1000 updates the algorithm list to replace any non-approved algorithms with acceptable alternatives that meet both hardware compatibility and organizational approval requirements. For example, an algorithm list updater (e.g., the config tool 328 shown in FIG. 3) may substitute non-approved algorithms with functionally equivalent approved alternatives, adjust algorithm parameters to meet approval criteria, and select alternative algorithm combinations that satisfy both technical and policy requirements.

At 1028, the technique 1000 validates security strength to verify that the proposed configuration provides adequate cryptographic protection for the intended use case and organizational security requirements. For example, a security strength validator (e.g., the config tool 328 shown in FIG. 3) may assess overall cryptographic strength of the proposed configuration, validate key lengths against current security recommendations, evaluate algorithm combinations for security vulnerabilities, and confirm that the configuration meets organizational minimum security requirements.

At 1030, the technique 1000 evaluates whether security is adequate by testing whether the proposed configuration meets minimum security strength requirements. For example, a security adequacy evaluator (e.g., the config tool 328 shown in FIG. 3) may compare cryptographic strength metrics against organizational security policies, validate that key lengths meet current best practices, and assess whether algorithm combinations provide sufficient protection against known attack vectors and threat models.

At 1032, when security is not adequate, the technique 1000 updates cryptographic settings to enhance security strength by selecting stronger algorithms, increasing key lengths, or modifying security parameters. For example, a cryptographic settings updater (e.g., the config tool 328 shown in FIG. 3) may increase encryption key lengths to meet security requirements, select stronger hash algorithms to enhance data integrity protection, upgrade cipher suites to provide better security characteristics, and modify authentication parameters to strengthen identity verification processes.

At 1034, the technique 1000 optimizes for performance to balance security requirements with operational efficiency based on client hardware capabilities and usage patterns. For example, a performance optimizer (e.g., the config tool 328 shown in FIG. 3) may adjust algorithm selections to utilize available hardware acceleration, optimize buffer sizes for memory efficiency, configure connection parameters for network conditions, and balance cryptographic strength with processing overhead to achieve acceptable performance characteristics while maintaining required security levels.

At 1036, the technique 1000 generates the configuration by assembling all validated parameters into a comprehensive configuration specification ready for client deployment. A configuration differs from a profile in that a profile may define the cryptographic protocol logic (what to do), such as using Kyber-768 for key exchange, AES-256-GCM for data encryption, or rotating keys every hour, while a configuration may define implementation parameters (how to do it), such as system settings and operational parameters. For example, a configuration generator (e.g., the config tool 328 shown in FIG. 3) may compile server names ("vpn1.corp.com:443", "vpn2.corp.com:53"), connection timeouts (30 seconds, 2 minutes), buffer sizes (1K, 2M, "adaptive"), cryptographic library preferences (native_optimized, webassembly, embedded), and hardware acceleration settings (AES_NI: use_if_available, TPM: required_for_key_storage, hardware_rng: preferred) into a structured configuration format that the client device can interpret and implement through the config management tool 326.

At 1038, the technique 1000 signs the configuration to provide authentication and integrity protection for the generated configuration data. For example, a configuration signing system (e.g., the config tool 328 shown in FIG. 3) may apply digital signatures using server private keys, generate cryptographic hashes for integrity verification, create authentication tokens for configuration validation, and embed security metadata that enables client devices to verify configuration authenticity and detect unauthorized modifications.

At 1040, the technique 1000 adds timestamp and expiry information to establish configuration validity periods and facilitate configuration lifecycle management. For example, a timestamp and expiry processor (e.g., the config tool 328 shown in FIG. 3) may embed creation timestamps for configuration tracking, set expiration times based on organizational policies, define refresh intervals for configuration updates, and establish validity periods that balance security requirements with operational convenience.

At 1042, the technique 1000 logs the configuration request to maintain audit trails and facilitate security monitoring and compliance reporting. For example, a configuration logging system (e.g., the config tool 328 shown in FIG. 3) may record obfuscated client identification information, document applied policies and compliance requirements, log configuration parameters and security settings, and create audit records that support security monitoring, compliance validation, and operational troubleshooting activities.

At 1044, the technique 1000 transmits the response to the client device by delivering the signed, timestamped configuration to the requesting client. For example, a response transmission system (e.g., the config tool 328 shown in FIG. 3) may compress the configuration prior to transmission to the client device to reduce bandwidth utilization, encrypt the response for secure delivery, establish secure communication channels with the client device, and provide the complete configuration package to the config management tool 326 for local implementation and deployment. This transmission completes the server-side configuration generation process and enables the client device to implement the customized, policy-compliant configuration for secure communication operations.

Figure 11:
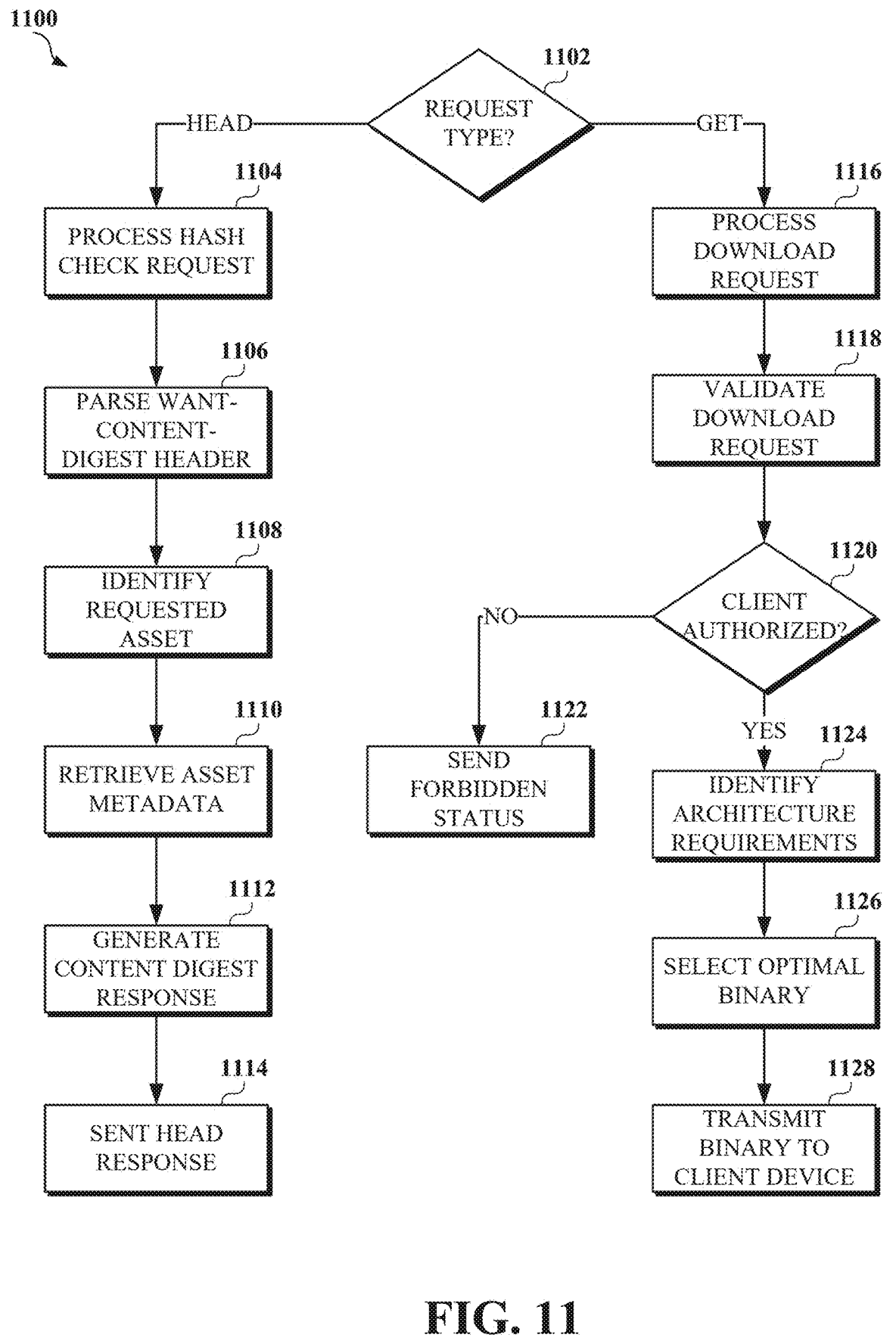

FIG. 11 is a flowchart of an example of a technique 1100 for managing requests for cryptographic components by providing mechanisms for hash checking and binary downloads based on client authorization and target architecture requirements. The technique 1100 can be implemented in whole or in part by the update tool 330 of the server infrastructure 304 shown in FIG. 3. The technique 1100 may be triggered when the update tool 330 receives requests from client devices for cryptographic library updates or hash verification through the update tool 324.

At 1102, the technique 1100 evaluates the request type to determine the appropriate processing pathway. The technique 1100 directs execution based on the type of request received from the client device. The technique 1100 may be configured to handle different types of requests, such as requests for content verification and requests for component downloads. In some implementations, the requests may be received in the form of standard network protocol messages that specify the desired operation type and required parameters. For example, a request type classifier (e.g., the update tool 330 shown in FIG. 3) may analyze incoming HTTP requests to distinguish between HEAD requests intended for hash checking operations and GET requests intended for binary download operations. This request type evaluation enables the server to provide appropriate responses for different client update scenarios including bandwidth-efficient hash comparisons and full binary downloads when updates are required.

At 1104, when a HEAD request is received, the technique 1100 processes the hash check request to facilitate efficient update checking without requiring full binary downloads. A hash check request is a client request to obtain a cryptographic hash or digest of a server-side file or component, which enables the client to compare this hash against the hash of its local version to determine if the files are identical or if an update is needed. For example, a hash check processor (e.g., the update tool 330 shown in FIG. 3) may handle client requests for content verification by generating cryptographic hashes of requested assets, prepare hash comparison operations that allow clients to perform local file integrity checks, and initialize metadata retrieval procedures that enable clients to determine whether local versions of components are current without consuming bandwidth for unnecessary downloads.

At 1106, the technique 1100 parses the want-content-digest header to extract client preferences for hash algorithm types and digest formats for content verification. The "Want-Content-Digest" header may be an HTTP header field that the client device includes in its request to signal that it requires a cryptographic digest or hash of the requested resource in the server's response. The want-content-digest header may also specify which hash algorithms the client supports. For example, a header parsing system (e.g., the update tool 330 shown in FIG. 3) may analyze HTTP headers to identify requested hash algorithms such as SHA-256 or SHA-512 specified in the Want-Content-Digest header, determine preferred digest encoding formats indicated by the client, and extract client capabilities for different hash verification methods. This header parsing enables the server to provide hash information in formats that are compatible with client verification capabilities and organizational security requirements by responding with a corresponding "Content-Digest" header containing the requested hash values.

At 1108, the technique 1100 identifies the requested asset by analyzing the request to determine which specific cryptographic component or binary is being referenced. For example, an asset identification system (e.g., the update tool 330 shown in FIG. 3) may parse request URLs to extract asset names, analyze version specifications, identify architecture requirements, and determine the specific cryptographic library or component that the client is requesting for update verification. This asset identification facilitates precise targeting of the appropriate cryptographic components for hash generation and download operations.

At 1110, the technique 1100 retrieves (e.g., queries for, determines, etc.) asset metadata by retrieving information about the identified cryptographic component including version details, architecture specifications, and integrity information. For example, an asset metadata retrieval system (e.g., the update tool 330 shown in FIG. 3) may access component databases to obtain current version numbers, retrieve cryptographic signatures for integrity verification, extract architecture compatibility information, and collect performance characteristics that inform client update decisions.

At 1112, the technique 1100 generates a content digest response by creating cryptographic hashes of the identified asset using algorithms specified in the client request headers. For example, a content digest generator (e.g., the update tool 330 shown in FIG. 3) may calculate SHA-256 hashes of cryptographic binaries, generate multiple hash algorithms for enhanced verification, create digest responses in requested formats, and prepare hash information for transmission to client devices. The content digest enables the client device to compare local asset hashes against server-side versions to determine whether updates are required.

At 1114, the technique 1100 sends the HEAD response containing the generated content digest to the requesting client device without transmitting the actual binary content. For example, a HEAD response sender (e.g., the update tool 330 shown in FIG. 3) may transmit HTTP responses containing Content-Digest headers with calculated hash values, include metadata about asset versions and characteristics, and provide hash information that enables client-side update determination. This HEAD response completes the hash checking process and enables clients to make informed decisions about whether full binary downloads are necessary.

At 1116, when a GET request is received, the technique 1100 processes the download request to prepare for binary transmission to the requesting client device. For example, a download request processor (e.g., the update tool 330 shown in FIG. 3) may analyze GET request parameters, extract client identification information, prepare binary selection procedures, and initialize download preparation processes that lead to component transmission when authorization and compatibility requirements are satisfied.

At 1118, the technique 1100 validates the download request to verify that the request contains appropriate parameters and meets basic formatting requirements for binary download operations. For example, a download request validator (e.g., the update tool 330 shown in FIG. 3) may verify request parameter completeness, validate client identification information, confirm asset specification accuracy, and assess request formatting compliance to facilitate appropriate processing of binary download requests.

At 1120, the technique 1100 evaluates whether the client device (and/or user of the client device) is authorized by testing whether the client device and the user of the client device have appropriate permissions for downloading the requested components. For example, a client authorization validator (e.g., the update tool 330 shown in FIG. 3) may verify client authentication credentials, validate organizational permissions for specific components, assess export control compliance for restricted algorithms, and confirm that both device-level and user-level authorization requirements are satisfied for the requested download operation. This authorization verification facilitates secure distribution of components while maintaining compliance with security policies and regulatory requirements.

At 1122, when the client is not authorized, the technique 1100 sends a forbidden status response to indicate that the client lacks sufficient permissions for the requested download operation. For example, a forbidden status sender (e.g., the update tool 330 shown in FIG. 3) may transmit an HTTP 403 Forbidden responses, include diagnostic information about authorization failures, provide guidance for obtaining appropriate permissions, and may log unauthorized access attempts for security monitoring and audit purposes.

At 1124, when the client is authorized, the technique 1100 identifies architecture requirements by analyzing capabilities of the client device and determining the appropriate binary configuration for the requesting device. For example, an architecture requirements analyzer (e.g., the update tool 330 shown in FIG. 3) may extract processor architecture specifications, identify hardware acceleration capabilities, determine operating system compatibility requirements, and assess performance optimization opportunities to select the most appropriate cryptographic library version for the client device. This architecture analysis facilitates delivery of optimized binary components that maximize performance while maintaining compatibility with hardware configurations of the client device.

At 1126, the technique 1100 selects the suitable binary from available component versions based on client architecture requirements and performance optimization criteria. For example, a binary selection system (e.g., the update tool 330 shown in FIG. 3) may choose native optimized libraries for clients with compatible hardware acceleration features, select VM-based implementations for cross-platform compatibility requirements, identify specialized versions for specific processor families, and prioritize binary versions that provide enhanced performance characteristics for detected hardware capabilities. This binary selection process facilitates delivery of components that are tailored to specific client requirements and capabilities.

At 1128, the technique 1100 transmits the binary to the client device. The technique 1100 may stream the selected component to the requesting client for installation and utilization. For example, a binary transmission system (e.g., the update tool 330 shown in FIG. 3) may establish secure communication channels with the client device, stream binary content using efficient transfer protocols, provide integrity verification information during transmission, and coordinate with client-side components including the update tool 324 and binary management tool 318 to facilitate proper component installation and validation. This binary transmission completes the server-side update distribution process and enables client devices to integrate updated components into their local systems for enhanced security and performance in subsequent connection operations.

Figure 12A:
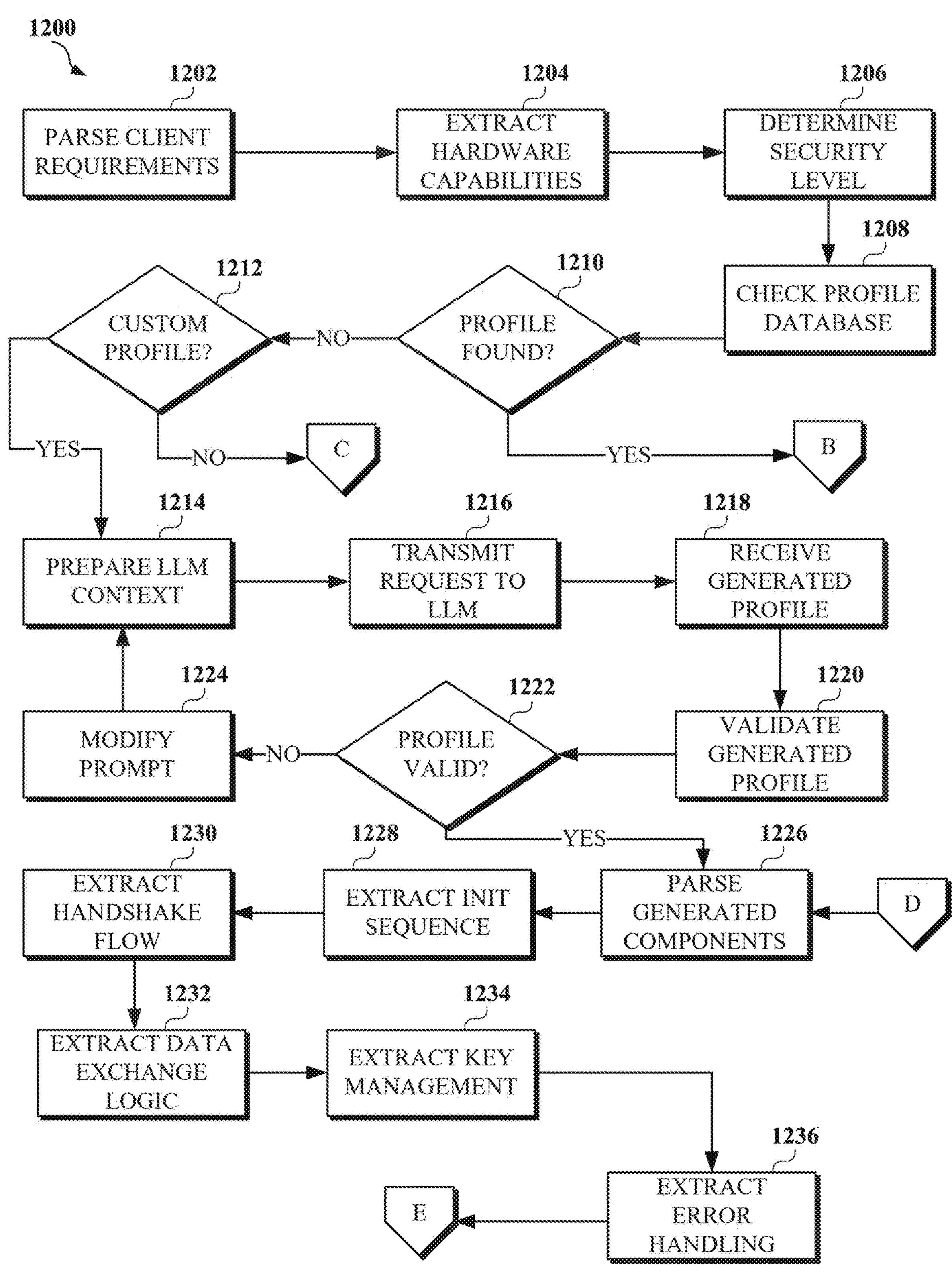
FIGS. 12A-12C is a flowchart of an example of a technique for handling profile requests from client devices through multiple pathways including returning cached compatible profiles, adapting existing profiles for hardware constraints, generating custom profiles via machine learning integration, and customizing template profiles.
Figure 12B:
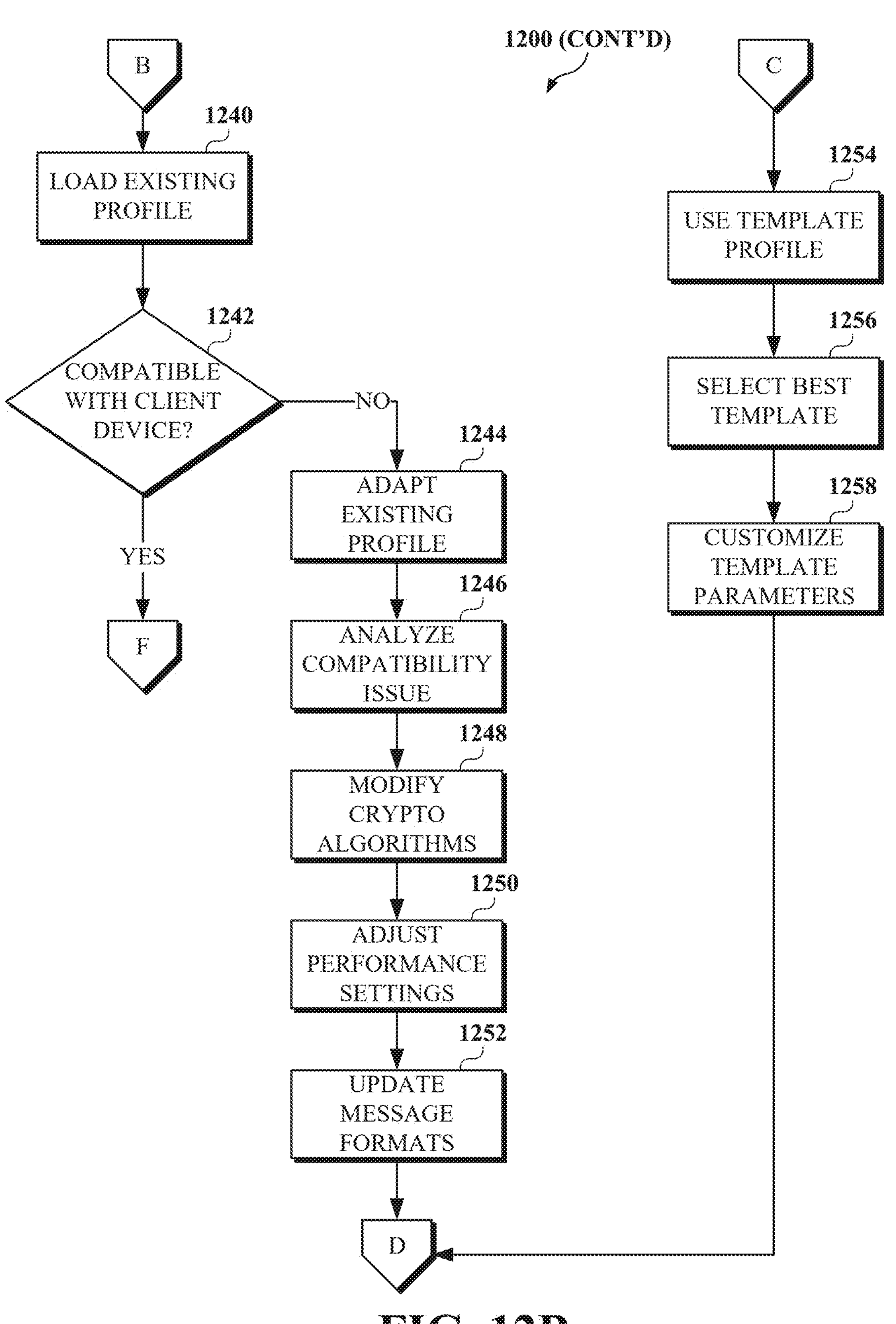
Figure 12C:
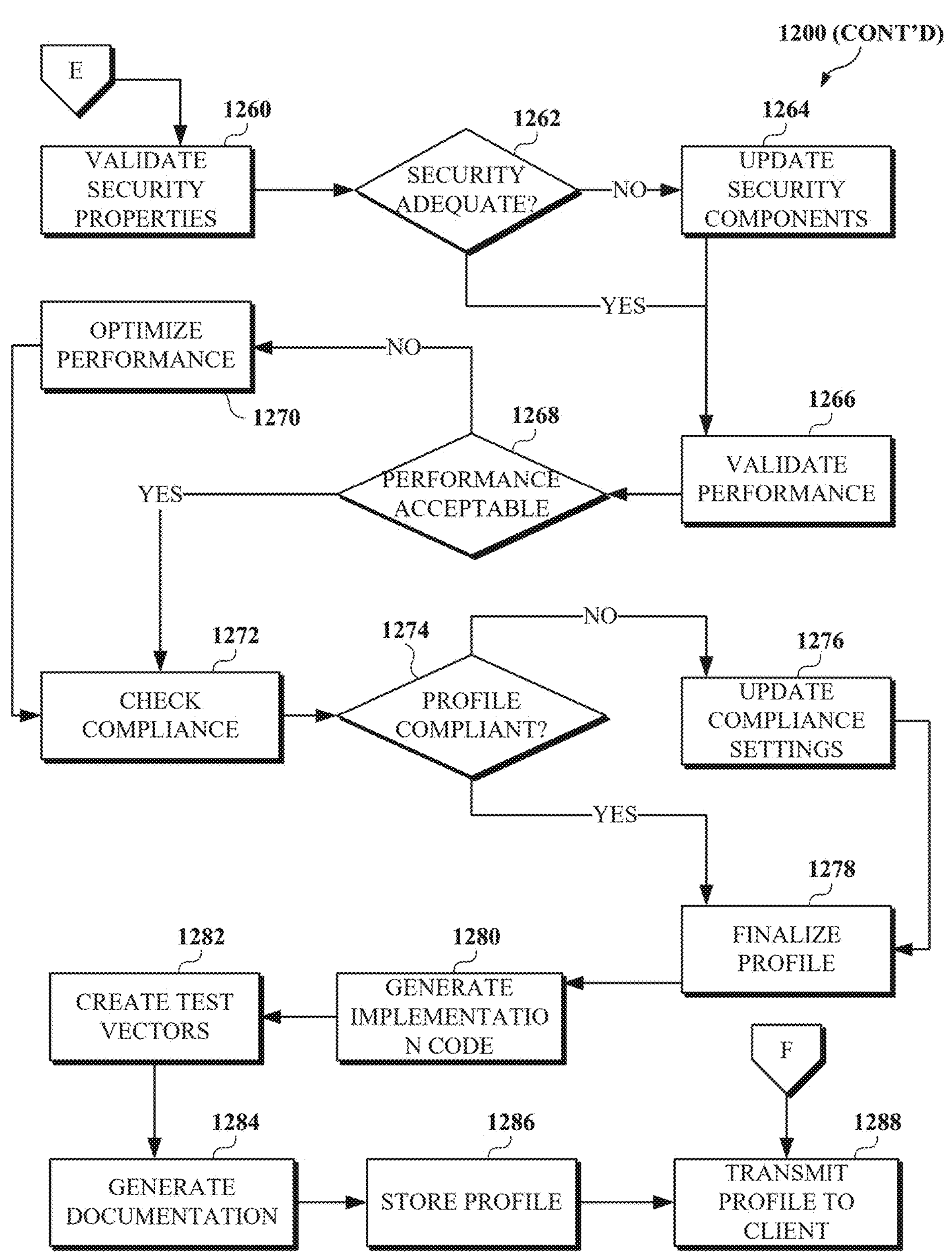

FIGS. 12A-12C is a flowchart of an example of a technique 1200 for handling profile requests from client devices through multiple pathways including returning cached compatible profiles, adapting existing profiles for hardware constraints, generating custom profiles via machine learning integration, and customizing template profiles. The technique 1200 can be implemented in whole or in part by the profile tool 332 of the server infrastructure 304 shown in FIG. 3. The technique 1200 may be triggered when the profile tool 332 receives profile requests from client devices through the profile creation tool 316.

At 1202, the technique 1200 parses client requirements to extract connection specifications, security preferences, and operational parameters from the incoming profile request.

For example, a client requirements parser (e.g., the profile tool 332 shown in FIG. 3) may analyze request data to identify target server information, connection type preferences such as high-security or low-latency configurations, user authentication requirements, and operational context including corporate versus personal usage scenarios. This requirements parsing establishes the foundation for selecting or generating appropriate profiles that meet specific client needs.

At 1204, the technique 1200 extracts hardware capabilities from the client request to understand the technical constraints and optimization opportunities available for profile generation. For example, a hardware capabilities extractor (e.g., the profile tool 332 shown in FIG. 3) may parse capability data including processor architecture specifications, available cryptographic acceleration features, memory configurations, and performance characteristics provided by the client device through the testing tool 320. This capability extraction enables the server to generate profiles that are compatible with client hardware while maximizing performance through hardware-specific optimizations.

At 1206, the technique 1200 determines security level requirements based on client specifications, organizational policies, and compliance requirements applicable to the requesting client. For example, a security level analyzer (e.g., the profile tool 332 shown in FIG. 3) may evaluate requested security parameters, apply organizational security policies retrieved from policy databases, assess compliance requirements for the client organization, and establish at least minimum security thresholds that generated profiles must satisfy. This security level determination facilitates the creation of profiles that meet appropriate security standards while accommodating client requirements and regulatory compliance needs.

At 1208, the technique 1200 checks the profile database to search for existing profiles that may satisfy the client requirements without requiring custom generation or adaptation. For example, a profile database searcher (e.g., the profile tool 332 shown in FIG. 3) may query profile repositories using client requirements as search criteria, evaluate stored profiles against hardware compatibility requirements, and assess existing profile suitability for the requested security level and operational context.

At 1210, the technique 1200 evaluates whether a suitable profile is found by testing whether an existing database profile meets the client requirements without requiring modification. For example, a profile suitability evaluator (e.g., the profile tool 332 shown in FIG. 3) may compare database search results against client specifications, validate profile compatibility with reported hardware capabilities, and assess whether existing profiles satisfy security and performance requirements. This evaluation determines whether existing profiles can be used directly or whether custom generation or adaptation procedures are required.

At 1212, when no suitable profile is found (at 1210), the technique 1200 evaluates whether a custom profile should be generated by testing whether the client requirements are sufficiently unique or complex to warrant machine learning-based profile generation. For example, a custom profile necessity evaluator (e.g., the profile tool 332 shown in FIG. 3) may analyze requirement complexity, assess whether standard templates can accommodate the specifications, and determine whether novel profile generation would provide significant advantages over template-based approaches. This evaluation determines the appropriate profile generation strategy based on requirement complexity and available resources. If custom profile generation is not required, the technique 1200 proceeds to 1254 (shown on FIG. 12B).

At 1214, when custom profile generation is required (at 1212), the technique 1200 prepares \ML context by assembling relevant information and formatting input parameters for machine learning-based profile generation. For example, a context preparation system (e.g., the profile tool 332 shown in FIG. 3) may format client requirements into structured prompts, include hardware capability specifications, incorporate security policy requirements, and prepare contextual information that guides the machine learning model toward generating appropriate profile specifications. This context preparation facilitates effective machine learning model utilization for custom profile generation.

At 1216, the technique 1200 transmits the request to an ML by sending the prepared context and requirements to a machine learning model for custom profile generation. For example, a machine learning interface (e.g., the profile tool 332 shown in FIG. 3) may communicate with one or more LLMs or other machine learning services, transmit formatted requirements and constraints, specify desired profile characteristics, and request generation of novel profile configurations. This machine learning integration enables the technique 1200 to generate custom profiles optimized for client hardware capabilities and connection requirements when standard profiles are insufficient.

At 1218, the technique 1200 receives the generated profile from the ML containing custom specifications tailored to the client requirements and constraints. For example, a profile reception system (e.g., the profile tool 332 shown in FIG. 3) may obtain machine learning model output, parse generated profile specifications, extract cryptographic operation sequences, and prepare the generated content for validation and processing procedures.

At 1220, the technique 1200 validates the generated profile to verify that the received generated profile is syntactically correct, semantically valid, and suitable for implementation. For example, a generated profile validator (e.g., the profile tool 332 shown in FIG. 3) may analyze profile syntax for correctness, validate semantic consistency of cryptographic operations, verify algorithm compatibility with client capabilities, and assess profile completeness for successful implementation.

At 1222, the technique 1200 evaluates whether the generated profile is valid by testing whether validation procedures confirm profile correctness and suitability for client deployment. For example, a profile validity evaluator (e.g., the profile tool 332 shown in FIG. 3) may assess validation results, determine profile acceptability based on validation criteria, and evaluate whether the generated profile meets quality standards for client distribution. This validity evaluation determines whether generated profiles can proceed to implementation or require additional refinement.

At 1224, when the generated profile is not valid (at 1222), the technique 1200 modifies the prompt to address validation issues and improve subsequent machine learning generation attempts. For example, a prompt modification system (e.g., the profile tool 332 shown in FIG. 3) may analyze validation failure patterns, adjust context parameters to address identified issues, refine requirement specifications to improve generation accuracy, and enhance prompt structure to guide the machine learning model toward producing valid outputs. This prompt modification enables iterative improvement of machine learning-based profile generation.

At 1226, the technique 1200 parses generated components of the generated profile to extract and organize the various elements of the validated profile for further processing and implementation. For example, a component parsing system (e.g., the profile tool 332 shown in FIG. 3) may analyze profile structure, identify distinct operational components, extract cryptographic specifications, and organize profile elements for systematic processing.

At 1228, the technique 1200 extracts the initialization sequence from the parsed profile components to identify the initialization setup operations required for connection establishment. For example, an initialization sequence extractor (e.g., the profile tool 332 shown in FIG. 3) may parse initialization procedures, identify key generation requirements, extract system setup parameters, and organize initial cryptographic operations into implementable sequences.

At 1230, the technique 1200 extracts the handshake flow from the parsed profile components to identify the negotiation and authentication procedures for secure channel establishment. For example, a handshake flow extractor (e.g., the profile tool 332 shown in FIG. 3) may parse authentication sequences, identify key exchange protocols, extract certificate validation procedures, and organize handshake operations into coherent implementation flows. This handshake flow extraction captures the connection negotiation procedures required for secure channel establishment.

At 1232, the technique 1200 extracts the data exchange logic from the parsed profile components to identify the procedures for secure data transmission and reception during active connections. For example, a data exchange logic extractor (e.g., the profile tool 332 shown in FIG. 3) may parse data encryption procedures, identify data integrity verification methods, extract data handling protocols, and organize data exchange operations for implementation. This data exchange logic extraction captures the operational procedures required for secure data transmission throughout connection lifecycles.

At 1234, the technique 1200 extracts key management specifications from the parsed profile components to identify key lifecycle procedures including generation, distribution, rotation, and revocation operations. For example, a key management extractor (e.g., the profile tool 332 shown in FIG. 3) may parse key lifecycle specifications, identify key rotation procedures, extract key distribution mechanisms, and organize key management operations for implementation. This key management extraction captures the procedures required for maintaining cryptographic key security throughout connection lifecycles.

At 1236, the technique 1200 extracts error handling procedures from the parsed profile components to identify appropriate responses to various failure conditions and exceptional circumstances. For example, an error handling extractor (e.g., the profile tool 332 shown in FIG. 3) may parse error detection procedures, identify recovery mechanisms, extract fallback strategies, and organize error handling responses for implementation. This error handling extraction captures the procedures required for maintaining connection reliability and graceful failure management. From 1236, the technique 1200 proceeds to 1260 (shown on FIG. 12C).

At 1240 (shown on FIG. 12B), when a suitable profile is found in the database (at 1210 of FIG. 12A), the technique 1200 loads the existing profile to prepare for compatibility assessment and potential client deployment. For example, an existing profile loader (e.g., the profile tool 332 shown in FIG. 3) may retrieve profile data from database storage, load profile specifications into processing memory, prepare profile parameters for compatibility analysis, and initialize profile data structures for subsequent processing operations.

At 1242, the technique 1200 evaluates whether the existing profile is compatible with the client device by testing whether the loaded profile can be implemented successfully on the requesting client hardware configuration. For example, a compatibility evaluator (e.g., the profile tool 332 shown in FIG. 3) may compare profile algorithm requirements against client hardware capabilities, validate profile performance characteristics against client constraints, and assess profile implementation feasibility on the client device. This compatibility evaluation determines whether existing profiles can be deployed directly or require adaptation procedures.

At 1244, when the existing profile is determined not to be compatible (at 1242), the technique 1200 adapts the existing profile to address compatibility issues and accommodate client hardware constraints while preserving profile functionality and security characteristics. For example, a profile adaptation system (e.g., the profile tool 332 shown in FIG. 3) may modify algorithm selections to match available hardware capabilities, adjust performance parameters to accommodate resource constraints, and update protocol specifications to maintain compatibility while preserving security objectives. This profile adaptation enables reuse of existing profiles while accommodating diverse client hardware configurations.

At 1246, the technique 1200 analyzes compatibility issues to identify specific problems preventing direct deployment of the existing profile on the client device. For example, a compatibility issue analyzer (e.g., the profile tool 332 shown in FIG. 3) may identify unsupported algorithms in the existing profile, detect performance parameter mismatches with client capabilities, assess protocol version compatibility issues, and categorize compatibility problems for targeted resolution. This compatibility analysis guides adaptation procedures toward addressing specific client compatibility requirements.

At 1248, and if necessary, the technique 1200 modifies cryptographic algorithms in the existing profile to address compatibility issues while maintaining security and functionality requirements. For example, a cryptographic algorithm modifier (e.g., the profile tool 332 shown in FIG. 3) may substitute incompatible algorithms with supported alternatives, adjust algorithm parameters to match client capabilities, validate algorithm security equivalence, and update algorithm dependencies to maintain profile integrity. This algorithm modification facilitates profile adaptation for diverse client hardware configurations while preserving security characteristics.

At 1250, and if necessary, the technique 1200 adjusts performance settings in the existing profile to optimize operation for the specific client hardware capabilities and resource constraints. For example, a performance settings adjuster (e.g., the profile tool 332 shown in FIG. 3) may modify buffer sizes to match available memory, adjust connection timeouts for network characteristics, optimize thread allocation for processor configurations, and tune performance parameters for client hardware utilization. This performance adjustment optimizes adapted profiles for client-specific operational characteristics.

At 1252, the technique 1200 updates message formats in the existing profile to address protocol compatibility requirements and communication format specifications. For example, a message format updater (e.g., the profile tool 332 shown in FIG. 3) may modify protocol message structures, adjust data encoding formats, update communication protocol versions, and revise message handling procedures to maintain compatibility with client communication capabilities. The main purpose is to ensure backward and forward compatibility so that newer clients can communicate with older servers and older clients can work with newer servers. This step eliminates the need for comprehensive migrations that typically require months or years to update underlying cryptographic systems. This message format updating facilitates successful communication between adapted profiles and client implementations.

At 1254, when custom profile generation is not required (at 1212 of FIG. 12A), the technique 1200 uses a template profile approach to generate profiles based on predefined patterns and client-specific customization. For example, a template profile selector (e.g., the profile tool 332 shown in FIG. 3) may identify appropriate template categories, select template profiles that match client requirements, and prepare templates for customization based on client specifications. This template-based approach provides efficient profile generation for common scenarios without requiring machine learning-based custom generation.

At 1256, the technique 1200 selects the best template from available options based on client requirements, hardware capabilities, and security specifications. For example, a template selection system (e.g., the profile tool 332 shown in FIG. 3) may evaluate template compatibility with client specifications, assess template optimization for client hardware, compare template security characteristics against requirements, and select templates that provide the best match for client needs.

At 1258, the technique 1200 customizes parameters of the template to adapt the selected template based on the request (e.g., based on any specified client requirements and hardware characteristics). For example, a template customization system (e.g., the profile tool 332 shown in FIG. 3) may adjust template algorithm selections for client hardware compatibility, modify template performance parameters for client optimization, customize template security settings for client requirements, and adapt template specifications for client operational contexts. From 1258, the technique 1200 proceeds to 1226 (shown in FIG. 12A).

At 1260 (shown on FIG. 12C), the technique 1200 validates security properties of the generated, adapted, or customized profile to verify that security requirements are satisfied appropriately. For example, a security property validator (e.g., the profile tool 332 shown in FIG. 3) may assess cryptographic strength of profile algorithms, validate key management security procedures, verify authentication mechanism adequacy, and confirm that overall profile security meets organizational and compliance requirements.

At 1262, the technique 1200 evaluates whether the security defined in the profile is adequate by testing whether validated security properties meet established security requirements and thresholds. For example, a security adequacy evaluator (e.g., the profile tool 332 shown in FIG. 3) may compare security validation results against policy requirements, assess security strength against threat models, and determine whether profile security characteristics satisfy organizational and compliance standards. This security adequacy evaluation determines whether profiles meet deployment security criteria. At 1264, when security is not adequate (at 1262), the technique 1200 updates security components to enhance profile security characteristics and address identified security deficiencies. For example, a security component updater (e.g., the profile tool 332 shown in FIG. 3) may strengthen cryptographic algorithms, increase key lengths, enhance authentication requirements, and improve security parameters to meet security adequacy requirements. From 1264 and when security is determined to be adequate at 1262, the technique 1200 proceeds to 1266.

At 1266, the technique 1200 validates performance characteristics of the profile to verify that performance requirements and optimization objectives are satisfied appropriately. For example, a performance validator (e.g., the profile tool 332 shown in FIG. 3) may assess profile computational efficiency, validate resource utilization characteristics, verify performance optimization for client hardware, and confirm that profile performance meets operational requirements. This performance validation facilitates deployment of profiles that provide suitable operational characteristics to the client device.

At 1268, the technique 1200 evaluates whether performance is acceptable by testing whether validated performance characteristics meet established performance requirements and efficiency thresholds. For example, a performance acceptability evaluator (e.g., the profile tool 332 shown in FIG. 3) may compare performance validation results against operational requirements, assess efficiency characteristics against client needs, and determine whether profile performance satisfies deployment criteria. If performance is determined to be acceptable, the technique 1200 proceeds to 1272; otherwise, the technique 1200 proceeds to 1270.

At 1270, when performance is not acceptable, the technique 1200 modifies the profile to optimize performance characteristics to enhance profile efficiency and address identified performance deficiencies. For example, a performance optimizer (e.g., the profile tool 332 shown in FIG. 3) may adjust algorithm selections for better efficiency, optimize resource utilization parameters, enhance hardware acceleration utilization, and improve performance characteristics to meet acceptability requirements. From 1270, the technique 1200 proceeds to 1272.

At 1272, the technique 1200 checks (e.g., evaluates, tests, etc.) compliance requirements to verify that the profile satisfies regulatory, industry, and/or organizational compliance standards applicable to the client organization. For example, a compliance checker (e.g., the profile tool 332 shown in FIG. 3) may validate profile adherence to regulatory requirements, verify compliance with industry standards, assess conformance to organizational policies, and confirm that profile specifications meet applicable compliance frameworks.

At 1274, the technique 1200 evaluates whether the profile is compliant by testing whether compliance validation confirms adherence to applicable regulatory and policy requirements. For example, a compliance evaluator (e.g., the profile tool 332 shown in FIG. 3) may assess compliance validation results, determine profile conformance to applicable standards, and evaluate whether profile specifications satisfy deployment compliance criteria. This compliance evaluation determines whether profiles meet regulatory and policy requirements for client deployment. If the profile is determined to be compliant, the technique 1200 proceeds to 1278; otherwise the technique 1200 proceeds to 1276.

At 1276, the technique 1200 updates compliance settings to address identified compliance deficiencies and facilitate adherence to applicable regulatory and policy requirements. For example, a compliance settings updater (e.g., the profile tool 332 shown in FIG. 3) may modify profile parameters to meet regulatory requirements, adjust security settings for compliance standards, update operational procedures for policy adherence, and enhance profile specifications to satisfy compliance criteria.

At 1278, the technique 1200 finalizes the profile by completing all validation, optimization, and compliance procedures to prepare the profile for implementation and client deployment. For example, a profile finalizer (e.g., the profile tool 332 shown in FIG. 3) may complete final validation checks, optimize profile parameters for deployment, organize profile specifications for implementation, and prepare profile data structures for client transmission. This profile finalization completes the profile generation process and prepares profiles for client deployment.

At 1280, the technique 1200 generates implementation code to provide executable instructions that enable client devices to implement the finalized profile specifications. The implementation code generator transforms abstract profile specifications into actual executable code that can run on the client device, incorporating hardware-specific optimizations and using platform-appropriate APIs such as keychain on iOS or keystore on Android. For example, an implementation code generator (e.g., the profile tool 332 shown in FIG. 3) may create executable profile code, generate configuration scripts for client deployment, produce implementation instructions for profile execution, and prepare code artifacts that facilitate profile implementation on client devices. The generated executable code enables the client device to connect to secure communication servers and establish secure connections based on the customized profile specifications. This implementation code generation bridges the gap between profile specifications and client execution capabilities.

At 1282, the technique 1200 creates test vectors to provide validation data and test cases that enable client devices to verify correct profile implementation and operation. Cryptographic implementation bugs can completely compromise security. The test vector creator automatically generates comprehensive test cases that validate profile implementation and catch errors that manual testing might miss. For example, a test vector creator (e.g., the profile tool 332 shown in FIG. 3) may generate Known Answer Tests (KATs) with predetermined inputs and expected outputs, Monte Carlo tests, boundary condition tests, malformed input tests, state transition tests, and cross-platform compatibility tests that facilitate profile implementation verification.

At 1284, the technique 1200 generates documentation to provide implementation guidance, operational instructions, and maintenance information that supports profile deployment and ongoing operation. The documentation generator addresses the common problem where developers create initial documentation but fail to update it through multiple development iterations and issue resolution cycles. This automated system ensures that all stakeholders, from system administrators to security auditors, have accurate and current information that is automatically generated and synchronized with the actual implementation. For example, a documentation generator (e.g., the profile tool 332 shown in FIG. 3) may create implementation guides, produce operational documentation, generate maintenance instructions, and prepare reference materials that facilitate successful profile deployment and operation. This documentation generation supports effective profile utilization and maintenance.

At 1286, the technique 1200 stores the profile in server databases to maintain profile repositories for future reuse and reference by subsequent client requests. For example, a profile storage system (e.g., the profile tool 332 shown in FIG. 3) may save finalized profiles to database repositories, organize profiles for efficient retrieval, index profiles for search optimization, and maintain profile metadata for future utilization.

At 1288, the technique 1200 transmits the profile to the client device by delivering the complete profile package including implementation code, test vectors, and documentation to the requesting client. For example, a profile transmission system (e.g., the profile tool 332 shown in FIG. 3) may establish secure communication channels with client devices, transmit complete profile packages, provide profile integrity verification information, and coordinate with client-side components including the profile creation tool 316 to facilitate successful profile deployment and implementation. This profile transmission completes the server-side profile generation process and enables client devices to implement customized profiles for secure communication operations.

Figure 13A:
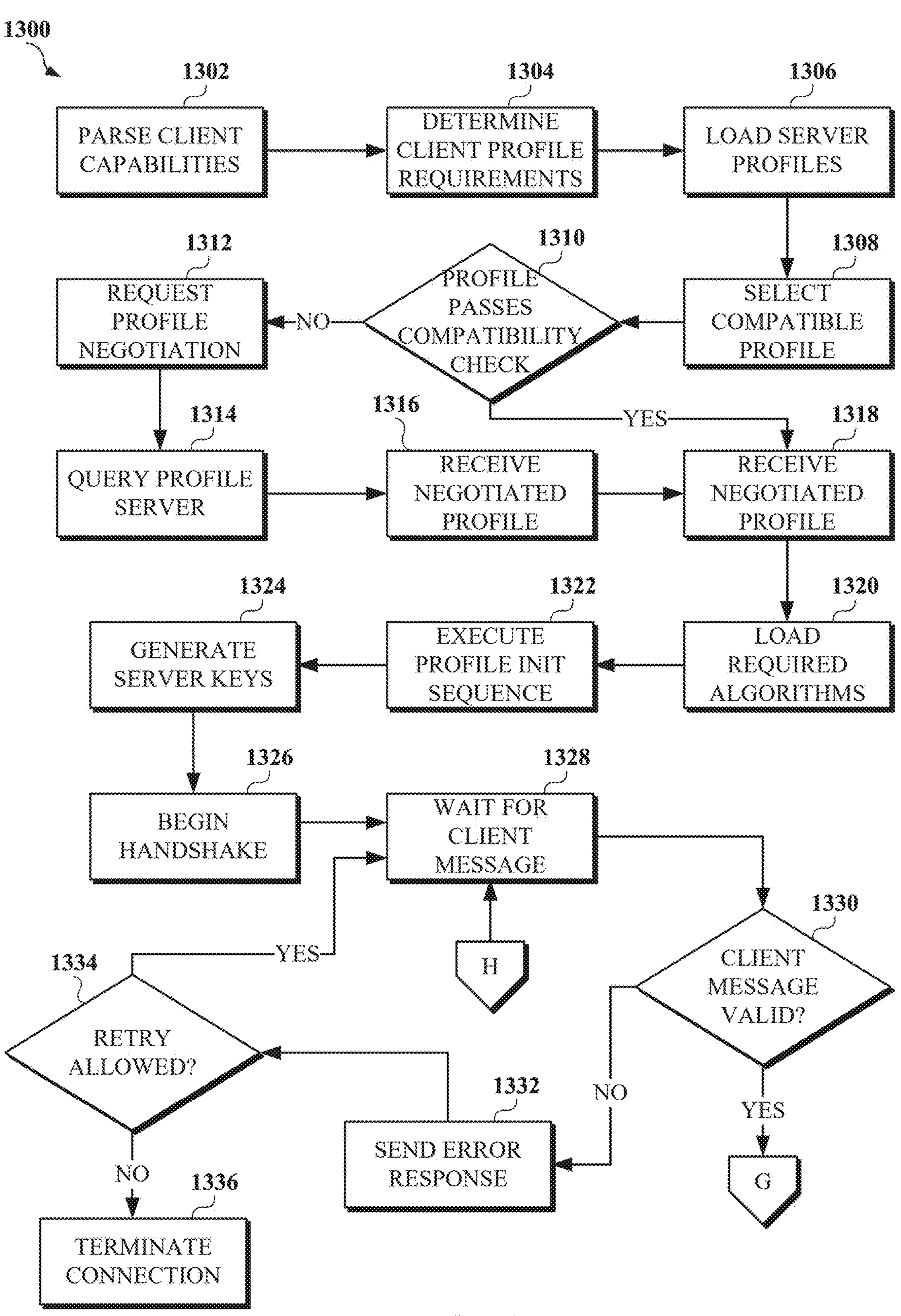
FIGS. 13A-13C is a flowchart of an example of a technique for handling actual client connections by selecting compatible profiles, executing handshake protocols, establishing encrypted data channels, routing traffic, and managing key rotation throughout the connection lifecycle.
Figure 13B:
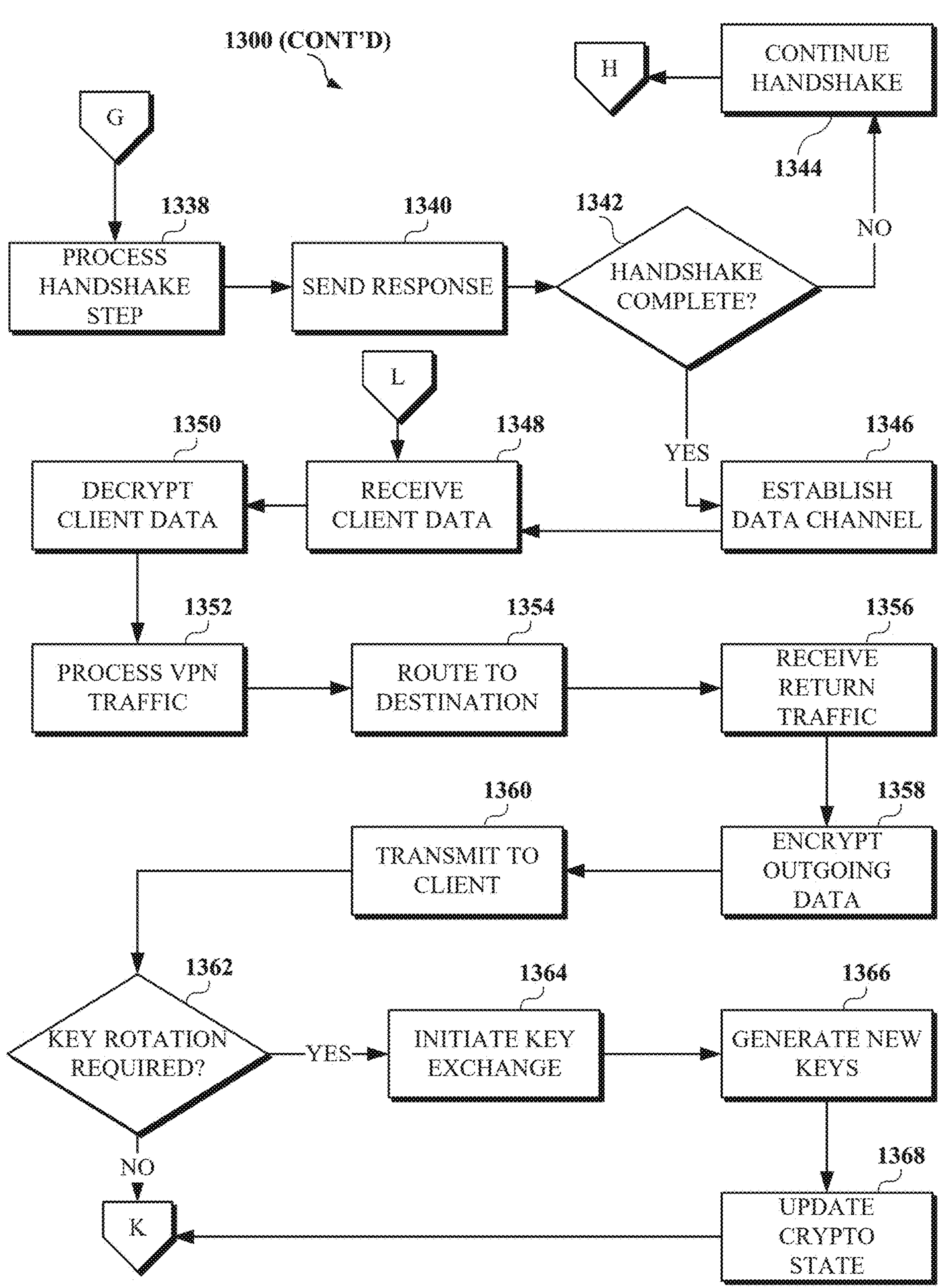
Figure 13C:
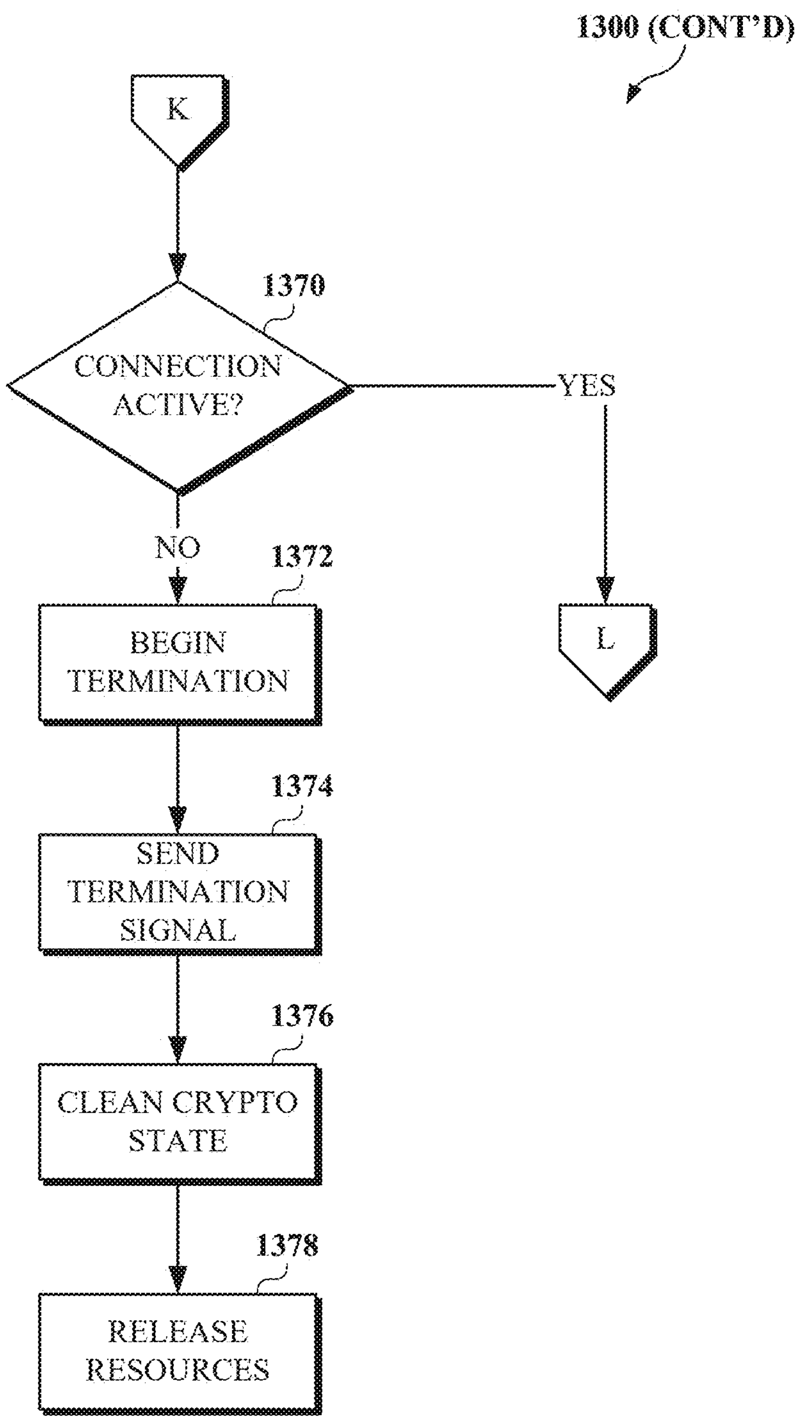

FIGS. 13A-13C is a flowchart of an example of a technique 1300 for handling actual client connections by selecting compatible profiles, executing handshake protocols, establishing encrypted data channels, routing traffic, and managing key rotation throughout the connection lifecycle. The technique 1300 can be implemented in whole or in part by the VPN server 334 of the server infrastructure 304 shown in FIG. 3. The technique 1300 may be triggered when the VPN server 334 receives connection requests from client devices executing the profile state machine execution tool 312.

At 1302, the technique 1300 parses client capabilities to extract hardware specifications, supported algorithms, and performance characteristics from the incoming connection request. For example, a client capabilities parser (e.g., the VPN server 334 shown in FIG. 3) may analyze connection request data to identify client hardware acceleration features, supported cryptographic algorithms, available memory and processing resources, and network performance characteristics. This capabilities parsing enables the server to select appropriate profiles and configure connection parameters that are compatible with client device capabilities and constraints.

At 1304, the technique 1300 determines client profile requirements by analyzing the parsed capabilities and connection context to establish appropriate profile selection criteria. For example, a profile requirements analyzer (e.g., the VPN server 334 shown in FIG. 3) may evaluate client security preferences, assess performance optimization opportunities based on hardware capabilities, determine compatibility requirements for successful connection establishment, and establish selection criteria for appropriate server-side profile matching. This requirements determination guides the server toward selecting profiles that facilitate successful connection establishment and operation.

At 1306, the technique 1300 loads server profiles from local repositories to provide candidate profiles for compatibility assessment and client matching. For example, a server profile loader (e.g., the VPN server 334 shown in FIG. 3) may retrieve available profiles from server profile databases, load profile specifications into processing memory, organize profiles for compatibility evaluation, and prepare profile data structures for selection procedures.

At 1308, the technique 1300 selects a compatible profile from loaded server profiles based on client capabilities and requirements established in previous steps. For example, a compatible profile selector (e.g., the VPN server 334 shown in FIG. 3) may compare client capabilities against profile requirements, evaluate profile performance characteristics against client constraints, assess profile algorithm compatibility with client support, and select profiles that provide suitable matches for client connection requirements. This profile selection facilitates successful connection establishment by identifying server profiles that are compatible with client capabilities.

At 1310, the technique 1300 evaluates whether the selected profile passes compatibility checks by testing whether the profile can be successfully implemented with the client device configuration. For example, a compatibility checker (e.g., the VPN server 334 shown in FIG. 3) may validate algorithm compatibility between server and client configurations, verify performance parameter feasibility for the client device, assess protocol version compatibility for successful communication, and confirm that selected profiles meet compatibility requirements for connection establishment. This compatibility evaluation determines whether selected profiles can proceed to implementation or require negotiation procedures. If the profile passes compatibility check, the technique 1300 proceeds to 1318; otherwise the technique 1300 proceeds to 1312.

At 1312, when the profile does not pass compatibility checks, the technique 1300 requests profile negotiation to obtain alternative profiles that may provide better compatibility with client constraints. For example, a profile negotiation requester (e.g., the VPN server 334 shown in FIG. 3) may initiate profile negotiation procedures, request alternative profile options from profile generation services, specify client compatibility constraints for profile modification, and prepare negotiation parameters for profile adaptation processes. This profile negotiation request facilitates obtaining suitable profiles when direct compatibility matching is unsuccessful.

At 1314, the technique 1300 queries the profile server to obtain negotiated profiles that address compatibility issues identified during initial profile selection. For example, a profile server interface (e.g., the VPN server 334 shown in FIG. 3) may communicate with the profile tool 332, transmit client compatibility requirements and constraints, request profile adaptation or generation services, and coordinate with server infrastructure components to obtain suitable profiles for client connection establishment.

At 1316, the technique 1300 receives the negotiated profile from the profile server containing modifications or adaptations that address client compatibility requirements. For example, a negotiated profile receiver (e.g., the VPN server 334 shown in FIG. 3) may obtain adapted profile data from the profile tool 332, parse negotiated profile specifications, validate received profile integrity, and prepare negotiated profiles for implementation procedures.

At 1318, the technique 1300 receives the negotiated profile or the selected profile, as the case may be, and prepares for profile implementation and connection establishment procedures. A profile specification is not immediately executable and requires validation, parameter resolution, resource allocation, and runtime preparation before it can be used for actual connections. The profile preparation system ensures that when a client attempts to connect, all necessary resources are ready for immediate execution, including sufficient RAM allocation and available TUN interface creation capabilities. For example, a profile preparation system (e.g., the VPN server 334 shown in FIG. 3) may validate negotiated profile completeness, organize profile specifications for implementation, prepare profile execution parameters, and initialize profile implementation procedures for connection establishment. This profile preparation facilitates successful implementation of negotiated profiles for client connections.

At 1320, the technique 1300 loads required algorithms specified by the selected or negotiated profile to prepare cryptographic systems for connection establishment. For example, an algorithm loader (e.g., the VPN server 334 shown in FIG. 3) may initialize cryptographic libraries, load algorithm implementations specified by the profile, configure algorithm parameters for connection requirements, and prepare cryptographic systems for profile execution. This algorithm loading facilitates implementation of profile-specified cryptographic operations for secure connection establishment.

At 1322, the technique 1300 executes the profile initialization sequence to perform foundational setup operations required before connection handshake procedures. For example, a profile initialization executor (e.g., the VPN server 334 shown in FIG. 3) may perform system parameter validation, execute cryptographic system initialization, establish communication parameters specified by the profile, and prepare server systems for handshake protocol execution.

At 1324, the technique 1300 generates server keys required for cryptographic operations during connection establishment and data exchange phases. For example, a server key generator (e.g., the VPN server 334 shown in FIG. 3) may create asymmetric key pairs for key exchange protocols, generate ephemeral keys for session security, establish key derivation parameters for connection-specific keys, and prepare cryptographic key materials according to profile specifications. This server key generation provides the cryptographic materials required for secure connection establishment and operation.

At 1326, the technique 1300 begins the handshake process by initiating connection negotiation procedures with the client device according to profile specifications. For example, a handshake initiator (e.g., the VPN server 334 shown in FIG. 3) may send initial handshake messages to the client device, transmit server certificates and authentication information, initiate key exchange protocols specified by the profile, and begin connection establishment procedures that lead to secure channel creation. This handshake initiation starts the interactive connection establishment process between server and client devices.

At 1328, the technique 1300 waits for client messages during handshake procedures to receive client responses and continuation of connection establishment protocols. For example, a client message receiver (e.g., the VPN server 334 shown in FIG. 3) may monitor communication channels for client handshake messages, receive client certificates and authentication information, obtain client key exchange data, and collect client responses required for handshake protocol progression. This client message reception facilitates interactive handshake protocol execution between server and client devices.

At 1330, the technique 1300 evaluates whether the client message is valid by testing message integrity, format compliance, and protocol correctness. For example, a client message validator (e.g., the VPN server 334 shown in FIG. 3) may verify message format compliance with protocol specifications, validate message integrity through cryptographic verification, assess message content correctness for handshake progression, and confirm that client messages meet protocol requirements for successful handshake completion. This message validation facilitates reliable handshake protocol execution and connection security. If client message is determined to be valid, the technique 1300 proceeds to 1338 (shown on FIG. 13B); otherwise the technique 1300 proceeds to 1332.

At 1332, when the client message is not valid, the technique 1300 sends an error response to notify the client of message validation issues and provide guidance for correction. For example, an error response sender (e.g., the VPN server 334 shown in FIG. 3) may generate error messages describing validation failures, transmit diagnostic information to assist client troubleshooting, provide guidance for message correction, and notify clients of specific issues preventing handshake progression. This error response facilitates handshake problem resolution and connection establishment success.

At 1334, the technique 1300 evaluates whether retry is allowed by testing whether handshake retry attempts are permitted according to profile specifications and server policies. For example, a retry evaluator (e.g., the VPN server 334 shown in FIG. 3) may assess retry attempt counts against configured limits, evaluate error conditions for retry suitability, determine whether additional handshake attempts may succeed, and apply retry policies to manage connection establishment procedures. This retry evaluation balances connection establishment persistence with resource management and security considerations. If retry is determined to be allowed, the technique 1300 proceeds back to 1328; otherwise the technique 1300 proceeds to 1336.

At 1336, when retry is not allowed, the technique 1300 terminates the connection by ending handshake procedures and releasing allocated resources. For example, a connection terminator (e.g., the VPN server 334 shown in FIG. 3) may send connection termination notifications to the client device, release allocated server resources, clean up connection state information, and terminate unsuccessful connection establishment attempts. This connection termination manages failed handshake situations and maintains server resource availability.

At 1338 (shown in FIG. 13B), when the client message is valid (at 1330 of FIG. 13A), the technique 1300 processes the handshake step by executing appropriate handshake protocol operations based on the received client message. For example, a handshake step processor (e.g., the VPN server 334 shown in FIG. 3) may validate client certificates, process client key exchange information, execute authentication procedures specified by the profile, and perform handshake operations required for connection establishment progression.

At 1340, the technique 1300 sends a response to the client device containing server handshake information and progression data required for continued connection establishment. For example, a handshake response sender (e.g., the VPN server 334 shown in FIG. 3) may transmit server key exchange data, send authentication confirmations, provide handshake progression information, and deliver server responses required for handshake protocol completion.

At 1342, the technique 1300 evaluates whether the handshake is complete by testing whether all required handshake protocol steps have been successfully executed. For example, a handshake completion evaluator (e.g., the VPN server 334 shown in FIG. 3) may verify that all handshake steps have been completed successfully, validate that secure channel establishment has succeeded, confirm that authentication procedures have finished appropriately, and assess whether connection establishment is ready for data exchange operations. This handshake completion evaluation determines when connection establishment transitions to operational data exchange. If handshake is determined to be complete, the technique 1300 proceeds to 1346; otherwise the technique 1300 proceeds to 1344.

At 1344, when the handshake is not complete, the technique 1300 continues handshake procedures by returning to wait for additional client messages and handshake progression. For example, a handshake continuation controller (e.g., the VPN server 334 shown in FIG. 3) may prepare for additional handshake steps, maintain handshake state information for continued processing, and coordinate handshake protocol continuation until completion criteria are satisfied. This handshake continuation facilitates complete connection establishment through all required protocol steps.

At 1346, when the handshake is determined to be complete (at 1342), the technique 1300 establishes the data channel by configuring communication channels for operational data exchange between server and client devices. For example, a data channel establisher (e.g., the VPN server 334 shown in FIG. 3) may configure data encryption parameters, establish secure communication channels, initialize data handling procedures specified by the profile, and prepare systems for encrypted data transmission and reception. This data channel establishment transitions successfully completed connections to operational data exchange mode.

At 1348, the technique 1300 receives client data through established communication channels during operational connection phases. For example, a client data receiver (e.g., the VPN server 334 shown in FIG. 3) may monitor communication channels for client data transmissions, receive encrypted data packets from client devices, collect client traffic for processing and routing, and manage data reception procedures for operational connections. This client data reception facilitates operational VPN traffic handling and routing services.

At 1350, the technique 1300 decrypts client data using established encryption keys and algorithms to recover plaintext data for processing and routing. For example, a client data decryptor (e.g., the VPN server 334 shown in FIG. 3) may apply decryption algorithms specified by the profile, use established session keys for data decryption, validate data integrity during decryption processes, and recover plaintext data for VPN traffic processing. This client data decryption enables processing and routing of client traffic through VPN infrastructure.

At 1352, the technique 1300 processes VPN traffic by analyzing decrypted client data and preparing traffic for routing to intended destinations. For example, a VPN traffic processor (e.g., the VPN server 334 shown in FIG. 3) may analyze packet headers and routing information, apply traffic filtering and security policies, validate traffic against organizational access controls, and prepare traffic for routing to appropriate destination networks. This VPN traffic processing facilitates secure and controlled traffic routing through VPN infrastructure.

At 1354, the technique 1300 routes traffic to destination networks by forwarding processed client traffic to intended recipients through appropriate network infrastructure. For example, a traffic router (e.g., the VPN server 334 shown in FIG. 3) may forward traffic to destination networks, route packets through appropriate network interfaces, manage traffic routing according to network policies, and coordinate traffic delivery to intended recipients. This traffic routing provides the VPN service function of enabling secure access to destination networks through encrypted tunnels.

At 1356, the technique 1300 receives return traffic from destination networks intended for transmission back to client devices through encrypted VPN channels. For example, a return traffic receiver (e.g., the VPN server 334 shown in FIG. 3) may monitor destination networks for return traffic, receive response packets intended for client devices, collect return traffic for encryption and transmission, and manage bidirectional traffic flow through VPN infrastructure. This return traffic reception facilitates complete bidirectional communication through VPN services.

At 1358, the technique 1300 encrypts outgoing data intended for transmission to client devices using established encryption keys and algorithms. For example, an outgoing data encryptor (e.g., the VPN server 334 shown in FIG. 3) may apply encryption algorithms specified by the profile, use established session keys for data encryption, add data integrity protection during encryption processes, and prepare encrypted data for transmission to client devices. This outgoing data encryption facilitates secure transmission of return traffic through VPN infrastructure.

At 1360, the technique 1300 transmits data to client devices through established communication channels to complete bidirectional traffic flow. For example, an encrypted data transmitter (e.g., the VPN server 334 shown in FIG. 3) may send encrypted data packets to client devices, manage transmission through established communication channels, coordinate data delivery timing and sequencing, and facilitate reliable data transmission to client devices. This data transmission completes the VPN traffic routing cycle and provides bidirectional secure communication services.

At 1362, the technique 1300 evaluates whether key rotation is required by testing whether key lifetime policies or security requirements mandate cryptographic key renewal. For example, a key rotation evaluator (e.g., the VPN server 334 shown in FIG. 3) may assess key usage duration against rotation policies, monitor key usage counts for rotation thresholds, evaluate security requirements for key renewal, and determine whether cryptographic key rotation procedures should be initiated. This key rotation evaluation maintains connection security through appropriate key lifecycle management. If key rotation is determined to be required, the technique 1300 proceeds to 1364; otherwise the technique 1300 proceeds to 1370 (shown in FIG. 13C).

At 1364, when key rotation is required, the technique 1300 initiates key exchange procedures to establish new cryptographic keys for continued secure communication. For example, a key exchange initiator (e.g., the VPN server 334 shown in FIG. 3) may begin key rotation protocols with client devices, coordinate key exchange procedures according to profile specifications, manage key transition timing to maintain connection continuity, and initiate cryptographic key renewal processes. This key exchange initiation maintains connection security through proactive key management.

At 1366, the technique 1300 generates new keys required for continued secure communication after key rotation procedures. For example, a new key generator (e.g., the VPN server 334 shown in FIG. 3) may create replacement encryption keys, generate new session keys for continued communication, establish updated key derivation parameters, and produce fresh cryptographic materials for ongoing connection security. This new key generation provides updated cryptographic materials for continued secure communication.

At 1368, the technique 1300 updates cryptographic state by installing new keys and transitioning encryption systems to use updated cryptographic materials. For example, a cryptographic state updater (e.g., the VPN server 334 shown in FIG. 3) may install new encryption keys in cryptographic systems, update encryption and decryption contexts with new key materials, transition communication channels to use updated keys, and coordinate cryptographic state changes for continued secure operation. This cryptographic state updating facilitates seamless key rotation while maintaining connection security and continuity. From 1368, the technique 1300 proceeds to 1370.

At 1370, the technique 1300 evaluates whether the connection remains active by testing whether client communication continues and connection termination has not been requested. For example, a connection activity evaluator (e.g., the VPN server 334 shown in FIG. 3) may monitor client communication activity, assess connection health and status, evaluate whether termination conditions have been met, and determine whether connection operations should continue or begin termination procedures. This connection activity evaluation manages connection lifecycle and resource utilization. If the connection is determined to still be active, the technique 1300 proceeds to 1348 (shown on FIG. 13B); otherwise the technique 1300 proceeds to 1372.

At 1372, when the connection is no longer active, the technique 1300 begins termination procedures to gracefully end the connection and clean up allocated resources. For example, a termination initiator (e.g., the VPN server 334 shown in FIG. 3) may prepare connection termination procedures, coordinate termination timing with client devices, organize resource cleanup operations, and initiate graceful connection closure processes. This termination initiation facilitates orderly connection closure and resource management.

At 1374, the technique 1300 sends a termination signal to notify client devices of connection closure and coordinate graceful disconnection procedures. For example, a termination signal sender (e.g., the VPN server 334 shown in FIG. 3) may transmit connection closure notifications to client devices, coordinate termination timing between server and client systems, provide termination status information, and facilitate orderly disconnection procedures. This termination signal facilitates coordinated connection closure between server and client devices.

At 1376, the technique 1300 cleans cryptographic state by securely removing encryption keys and resetting cryptographic systems after connection termination. For example, a cryptographic state cleaner (e.g., the VPN server 334 shown in FIG. 3) may securely erase session keys and connection-specific cryptographic materials, reset encryption and decryption contexts, clear cryptographic buffers and intermediate data, and remove sensitive cryptographic information from server systems. This cryptographic state cleaning facilitates secure connection termination and prevents unauthorized access to connection-specific cryptographic materials.

At 1378, the technique 1300 releases resources by deallocating server resources and returning system capacity to available pools for subsequent connection requests. For example, a resource releaser (e.g., the VPN server 334 shown in FIG. 3) may deallocate connection-specific memory and processing resources, release network interface capacity, return cryptographic processing resources to available pools, and clean up data structures used during connection operation. This resource release completes the connection lifecycle and prepares server systems for subsequent connection requests from other client devices.

FIGS. 14A-14H is an example of a swim lane diagram of a technique 1400 illustrating steps performed at a client device for establishing a secure connection according to implementations of this disclosure. The technique 1400 can be implemented in whole or in part by the general application 306, a common API 1401, the profile execution tool 308, the profile interpreter tool 310, the profile state machine execution tool 312, the cryptographic subsystem 314, the profile creation tool 316, the binary management tool 318, the testing tool 320, the local store 322, the config management tool 326, and the server infrastructure 304 shown in FIG. 3.

The technique 1400 may be triggered when a user indicates an intent to establish a secure connection, such as by activating a "connect" control element in a user interface, which may cause a connection request specifying target parameters and requirements to be transmitted to the general application 306.

The technique 1400 includes a detailed swim lane diagram that spans multiple sheets to accommodate the comprehensive interaction flow between various system components. Each sheet displays only the actors and tools directly involved in the operations shown on that particular sheet, facilitating clear visualization of component interactions throughout the connection establishment process. The common API 1401 serves as a central coordination interface that facilitates communication between the general application 306 and various specialized subsystems including cryptographic, testing, and profile management components. The common API 1401 provides a unified interface that abstracts the complexity of subsystem interactions and enables the general application 306 to orchestrate secure connection establishment without requiring direct knowledge of individual subsystem implementations.

Figure 14A:
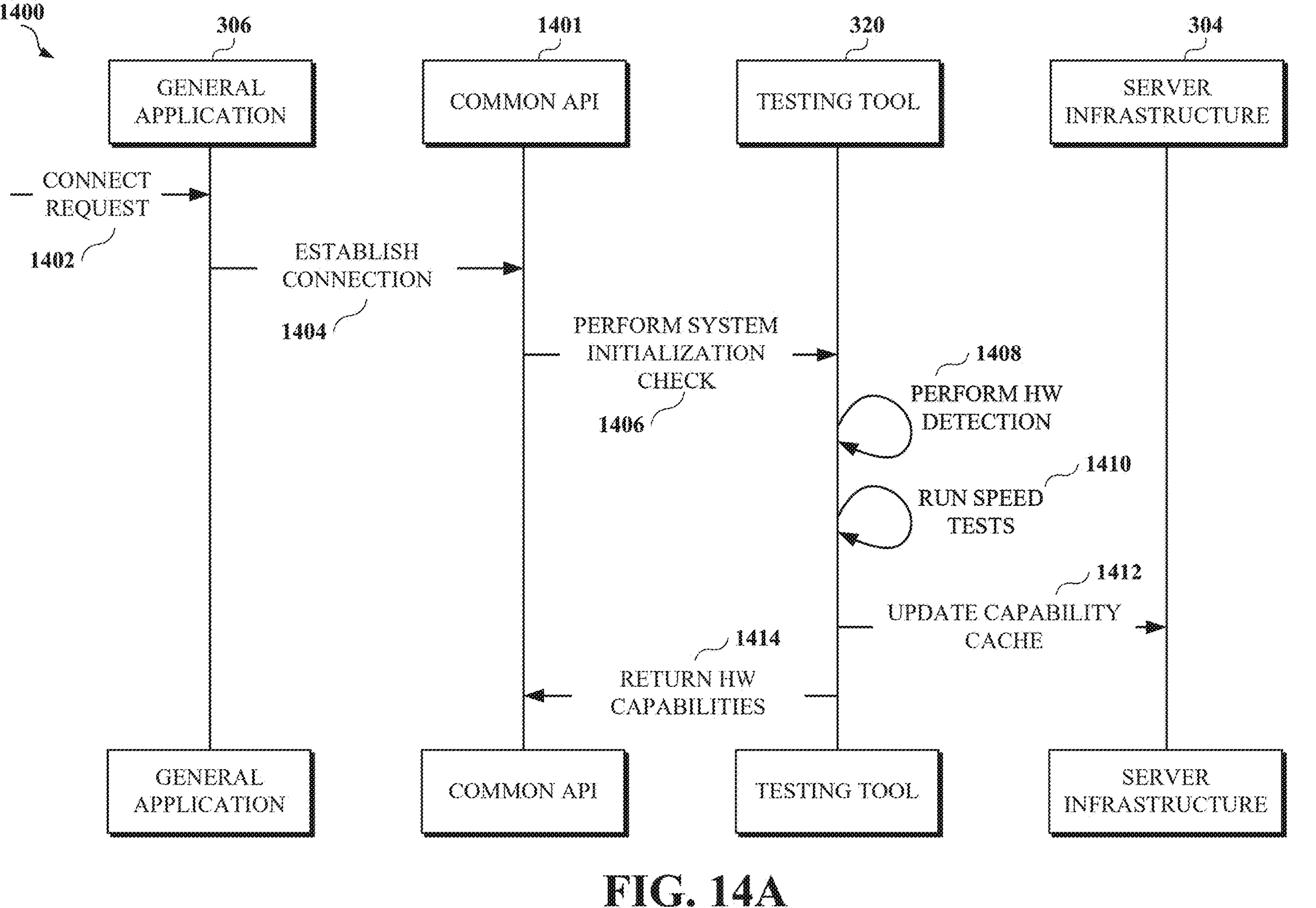
FIG. 14A illustrates user initiation and system initialization check procedures.

FIG. 14A illustrates user initiation and system initialization check procedures. The user initiation process includes user activation of connection controls, transmission of connection requests to the main application, and invocation of the common API for connection coordination. The system initialization check procedures include hardware capability verification through comprehensive device assessment, speed testing when cached results are invalid, and HWID-based caching to optimize subsequent capability determinations.

At 1402, the technique 1400 receives a connection request at the general application. For example, a user interface system (e.g., the general application 306 shown in FIG. 3) may receive a user-initiated connection request containing target server information, security preferences, and operational requirements that specify the desired secure communication parameters. The connection request may include destination server addresses, preferred security levels, performance requirements, and user authentication credentials that guide subsequent connection establishment procedures.

At 1404, the technique 1400 establishes a connection by transmitting the connection request to the common API 1401 for processing and coordination. For example, a connection coordination system (e.g., the general application 306 shown in FIG. 3) may forward the connection request to the common API 1401 to initiate systematic connection establishment procedures through appropriate subsystem coordination. This step begins the orchestrated connection establishment process by engaging the common API to manage the complex interactions between multiple specialized subsystems.

At 1406, the technique 1400 performs a system initialization check by requesting hardware capability verification from the testing subsystem. For example, a system initialization coordinator (e.g., the common API 1401 shown in FIG. 3) may initiate hardware capability assessment procedures through the testing tool 320 to determine device-specific optimization opportunities and compatibility constraints. This initialization check facilitates informed decision-making throughout the connection establishment process by providing current hardware capability information.

At 1408, the technique 1400 performs hardware detection to identify device-specific capabilities and acceleration features when hardware capabilities have not been recently tested or cached results are invalid. For example, a hardware detection system (e.g., the testing tool 320 shown in FIG. 3) may execute comprehensive capability scanning to identify processor architecture, cryptographic acceleration features, and available hardware security modules. This hardware detection step provides fundamental capability information that enables subsequent optimization and compatibility decisions throughout the connection establishment process.

At 1410, the technique 1400 runs speed tests to measure performance characteristics of cryptographic operations when hardware capabilities have not been recently tested or cached results are invalid. For example, a performance benchmarking system (e.g., the testing tool 320 shown in FIG. 3) may execute standardized cryptographic performance assessments to quantify encryption throughput, key generation timing, and hash function performance on the current hardware configuration. These speed tests provide quantitative performance data that enables intelligent algorithm selection and performance optimization during profile creation and execution procedures.

At 1412, the technique 1400 updates the capability cache by storing newly determined hardware capabilities and performance characteristics for future reference. For example, a capability caching system (e.g., the testing tool 320 shown in FIG. 3) may transmit updated capability information to the server infrastructure 304 for centralized capability management and coordination across multiple client devices within organizational environments. This cache update facilitates efficient capability management and reduces redundant testing in subsequent connection attempts.

At 1414, the technique 1400 returns hardware capabilities to the common API to provide capability information for subsequent connection establishment procedures. For example, a capability reporting system (e.g., the testing tool 320 shown in FIG. 3) may deliver formatted capability data including processor specifications, acceleration features, and performance characteristics to the common API 1401 for utilization in profile selection and configuration procedures. This capability return enables informed decision-making throughout the connection establishment process based on current hardware characteristics.

Figure 14B:
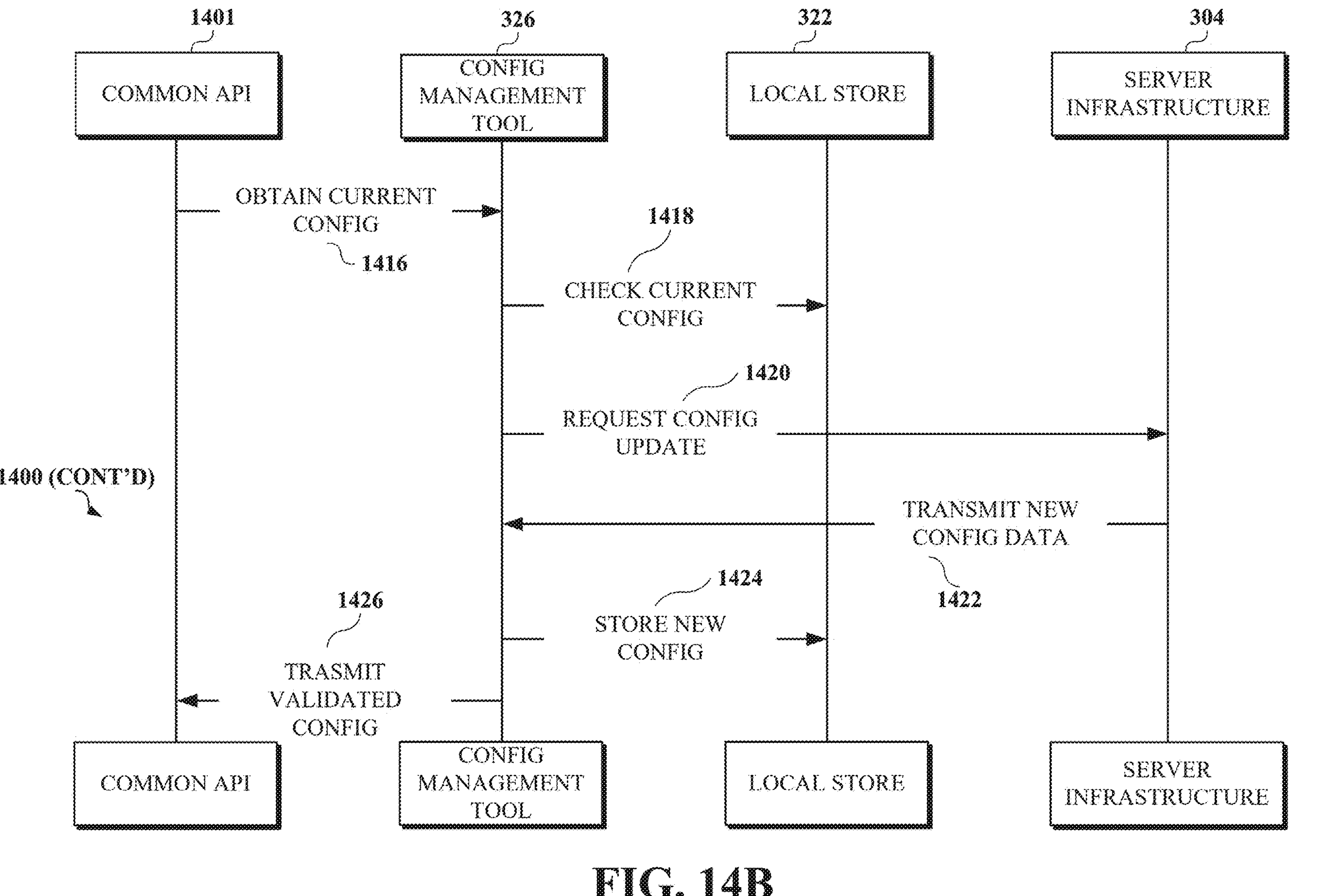
FIG. 14B depicts configuration validation processes including retrieval and verification of current configuration parameters.

FIG. 14B depicts configuration validation processes including retrieval and verification of current configuration parameters. The configuration validation operations include checking local configuration cache for currency and validity, downloading configuration updates when needed to maintain policy compliance, and validating configuration parameters against detected hardware capabilities to facilitate optimal system operation.

At 1416, the technique 1400 obtains current configuration by requesting configuration parameters from the configuration management subsystem. For example, a configuration coordination system (e.g., the common API 1401 shown in FIG. 3) may initiate configuration retrieval procedures through the config management tool 326 to obtain current security policies, operational parameters, and organizational requirements. This configuration retrieval facilitates policy-compliant connection establishment by providing current organizational and security requirements.

At 1418, the technique 1400 checks current configuration by validating stored configuration parameters against freshness criteria and policy requirements. For example, a configuration validation system (e.g., the config management tool 326 shown in FIG. 3) may query the local store 322 to assess configuration currency, validate policy compliance, and determine whether configuration updates are needed. This configuration check facilitates reliable connection establishment by providing validated configuration parameters for subsequent operations.

At 1420, the technique 1400 requests a configuration update from server infrastructure when local configuration is determined to be outdated or missing. For example, a configuration update requester (e.g., the config management tool 326 shown in FIG. 3) may transmit configuration update requests to the server infrastructure 304 to obtain current organizational policies, security requirements, and operational parameters. This configuration update request facilitates policy compliance by obtaining current organizational and security requirements from centralized policy management systems.

At 1422, the technique 1400 transmits new configuration data from server infrastructure to provide updated organizational policies and security requirements. For example, a configuration distribution system (e.g., the server infrastructure 304 shown in FIG. 3) may deliver updated policy parameters, security requirements, and operational configurations to the config management tool 326 for local implementation and storage. This configuration transmission facilitates policy compliance by providing current organizational requirements for connection establishment procedures.

At 1424, the technique 1400 stores new configuration by caching updated policy and operational parameters for subsequent utilization. For example, a configuration storage system (e.g., the config management tool 326 shown in FIG. 3) may store updated configuration data in the local store 322 with appropriate metadata including timestamps, version information, and policy applicability criteria. This configuration storage facilitates efficient policy application and reduces network communication requirements for subsequent connection attempts.

At 1426, the technique 1400 transmits validated configuration to the common API to provide current policy and operational parameters for connection establishment procedures. For example, a configuration delivery system (e.g., the config management tool 326 shown in FIG. 3) may deliver validated configuration parameters including security policies, operational requirements, and organizational constraints to the common API 1401 for utilization in subsequent connection establishment operations. This configuration transmission enables policy-compliant connection establishment through provision of current organizational requirements.

Figure 14C:
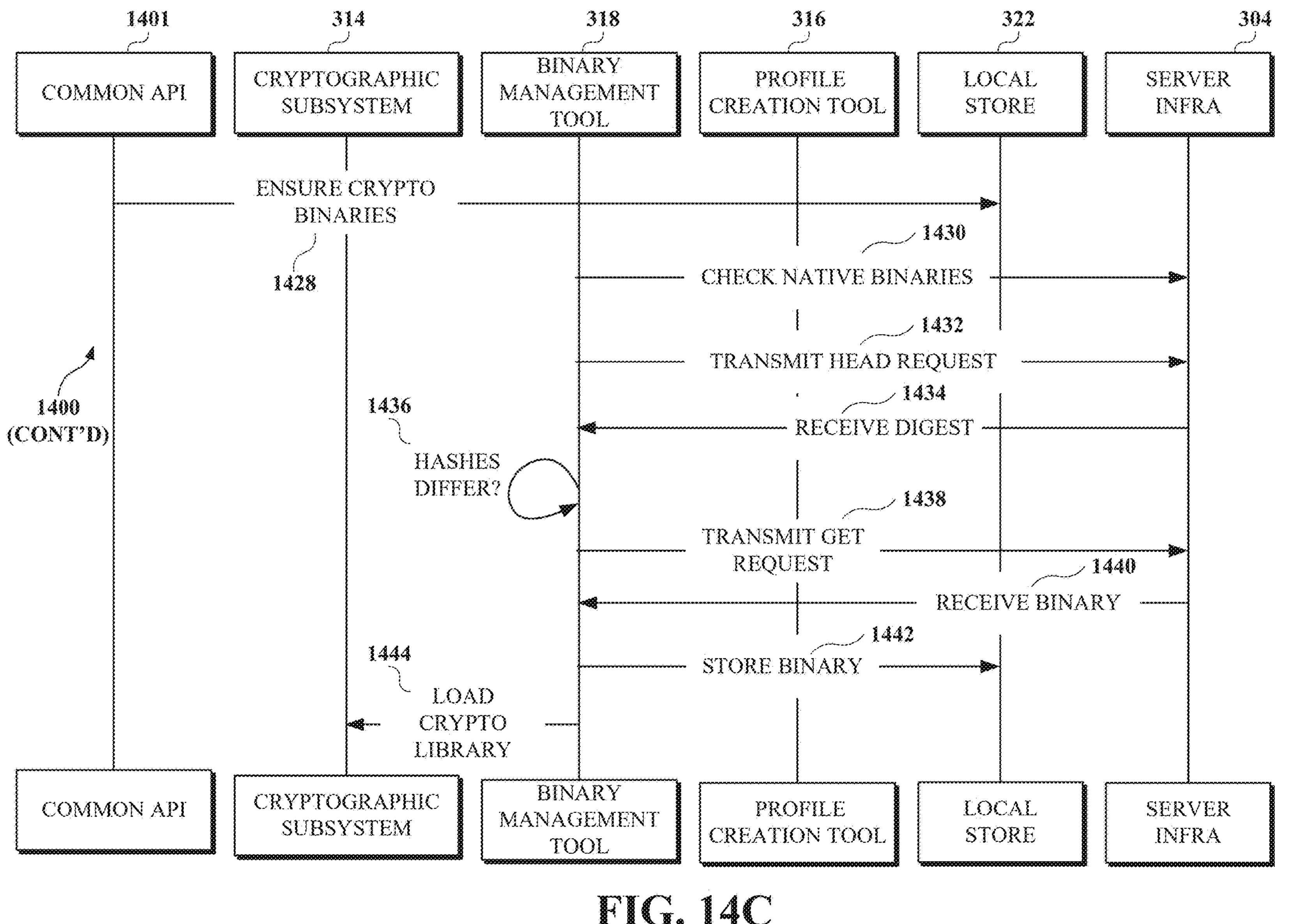
FIG. 14C continues configuration validation operations including update procedures and storage management, along with binary management processes.

FIG. 14C continues configuration validation operations including update procedures and storage management, along with binary management processes. The binary management operations include verification that cryptographic libraries are current and compatible, smart download procedures with hash checking to minimize bandwidth utilization, and loading of optimized binaries into the cryptographic subsystem for enhanced performance based on hardware capabilities.

At 1428, the technique 1400 facilitates crypto binaries by initiating cryptographic library management procedures through the common API. For example, a binary management coordinator (e.g., the common API 1401) may initiate cryptographic library verification and update procedures through coordination with the binary management tool 318 to facilitate availability of required cryptographic implementations. This crypto binary management facilitates reliable cryptographic operations by providing current and optimized cryptographic library implementations.

At 1430, the technique 1400 checks native binaries by validating availability and currency of hardware-optimized cryptographic libraries. For example, a native binary checker (e.g., the binary management tool 318 shown in FIG. 3) may query the server infrastructure 304 to assess availability of updated native cryptographic libraries optimized for the current hardware configuration. This native binary check facilitates performance optimization by identifying opportunities for hardware-accelerated cryptographic operations.

At 1432, the technique 1400 transmits a HEAD request to obtain cryptographic hash information for binary verification procedures when binaries are determined to be missing or outdated. For example, a hash verification system (e.g., the binary management tool 318 shown in FIG. 3) sends HTTP HEAD requests with Want-Content-Digest headers to the server infrastructure 304 to obtain cryptographic hashes for binary integrity verification. This HEAD request transmission facilitates efficient binary update determination without requiring full binary downloads when local versions are current.

At 1434, the technique 1400 receives a digest containing cryptographic hash information for binary verification and update determination. For example, a digest reception system (e.g., the server infrastructure 304 shown in FIG. 3) delivers Content-Digest response headers containing cryptographic hashes of current binary versions to the binary management tool 318 for comparison against local binary versions. This digest reception facilitates efficient update determination by enabling hash-based comparison between local and server binary versions.

At 1436, the technique 1400 determines whether hashes differ by comparing local binary hashes against received server hashes to assess update requirements. For example, a hash comparison system (e.g., the binary management tool 318 shown in FIG. 3) may compare cryptographic hashes of local binary implementations against server-provided hashes to determine whether binary updates are needed. This hash comparison facilitates efficient update management by identifying specific binaries that require updating while avoiding unnecessary downloads of current binary versions.

At 1438, the technique 1400 transmits a GET request to download updated binary implementations when hash comparison indicates that local binaries differ from server versions. For example, a binary download requester (e.g., the binary management tool 318 shown in FIG. 3) may send HTTP GET requests to the server infrastructure 304 to obtain updated cryptographic library implementations that match current server versions. This GET request transmission facilitates binary currency by obtaining updated cryptographic implementations when local versions are outdated.

At 1440, the technique 1400 receives a binary containing updated cryptographic library implementations for installation and utilization. For example, a binary reception system (e.g., the server infrastructure 304 shown in FIG. 3) may deliver updated cryptographic library binaries optimized for the client hardware configuration to the binary management tool 318 for local installation and integration. This binary reception facilitates cryptographic currency by providing updated library implementations for enhanced security and performance.

At 1442, the technique 1400 stores the binary by caching updated cryptographic library implementations for subsequent utilization. For example, a binary storage system (e.g., the binary management tool 318 shown in FIG. 3) may store received binary implementations in the local store 322 with appropriate metadata including version information, architecture specifications, and integrity verification data. This binary storage facilitates efficient cryptographic operations by maintaining current library implementations for subsequent connection establishment procedures.

At 1444, the technique 1400 loads a crypto library by installing updated cryptographic implementations into the cryptographic subsystem for operational utilization. For example, a library loading system (e.g., the binary management tool 318 shown in FIG. 3) may integrate updated cryptographic libraries into the cryptographic subsystem 314 to provide enhanced cryptographic capabilities for secure connection establishment. This crypto library loading facilitates improved cryptographic operations through utilization of current and optimized library implementations.

Figure 14D:
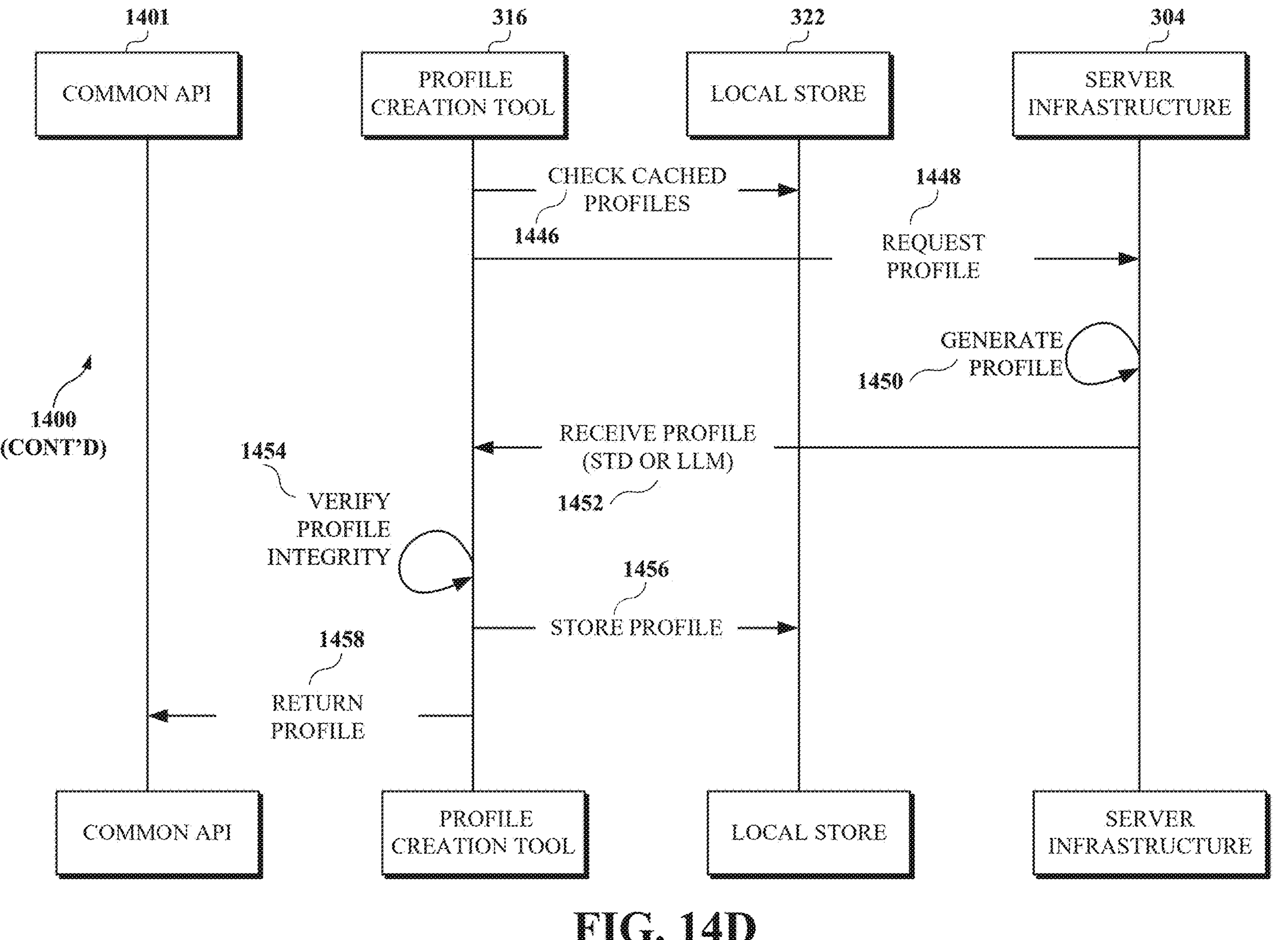
FIG. 14D shows profile creation and selection processes including profile generation and validation procedures.

FIG. 14D shows profile creation and selection processes including profile generation and validation procedures. The profile creation and selection operations include finding optimal protocol profiles from available repositories, generating custom profiles via ML integration when needed for specialized requirements, and validating and caching profiles to facilitate efficient reuse in subsequent connection attempts.

At 1446, the technique 1400 checks cached profiles by validating availability and suitability of stored profiles for the current connection requirements. For example, a profile cache checker (e.g., the profile creation tool 316 shown in FIG. 3) may query the local store 322 to assess availability of compatible profiles that satisfy current hardware capabilities and security requirements. This profile cache check facilitates efficient profile utilization by identifying suitable existing profiles while avoiding unnecessary profile generation when appropriate profiles are available.

At 1448, the technique 1400 requests a profile from server infrastructure when suitable cached profiles are unavailable or incompatible with current requirements. For example, a profile request system (e.g., the profile creation tool 316 shown in FIG. 3) may transmit profile generation requests including hardware capabilities and security requirements to the server infrastructure 304 for custom profile creation or adaptation procedures. This profile request facilitates appropriate profile acquisition by engaging server-side profile generation capabilities when local profiles are insufficient.

At 1450, the technique 1400 generates a profile by creating custom cryptographic specifications tailored to client requirements and capabilities. For example, a profile generation system (e.g., the server infrastructure 304 shown in FIG. 3) may create standard profiles from predefined templates or generate custom profiles using ML models (e.g., LLMs) when standard profiles are insufficient for specific client requirements. This profile generation provides appropriate cryptographic specifications that balance security requirements with hardware capabilities and performance constraints.

At 1452, the technique 1400 receives a profile containing standard or ML-generated cryptographic specifications for connection establishment procedures. For example, a profile reception system (e.g., the server infrastructure 304 shown in FIG. 3) may deliver generated profile specifications including cryptographic operation sequences, algorithm parameters, and protocol configurations to the profile creation tool 316 for validation and implementation. This profile reception facilitates appropriate cryptographic configuration by providing profiles optimized for specific client capabilities and requirements.

At 1454, the technique 1400 verifies profile integrity by validating received profile specifications for correctness, security compliance, and implementation feasibility. For example, a profile verification system (e.g., the profile creation tool 316 shown in FIG. 3) may validate profile syntax, verify security adequacy, and assess compatibility with current hardware capabilities to facilitate successful profile implementation. This profile verification facilitates reliable connection establishment by validating profile specifications before implementation and utilization.

At 1456, the technique 1400 stores the profile by caching validated cryptographic specifications for subsequent utilization when profile integrity verification succeeds. For example, a profile storage system (e.g., the profile creation tool 316 shown in FIG. 3) may store verified profile specifications in the local store 322 with appropriate metadata including hardware compatibility information, security characteristics, and usage context. This profile storage facilitates efficient profile reuse and reduces profile generation requirements for subsequent connection attempts with similar requirements.

At 1458, the technique 1400 returns the profile to the common API to provide validated cryptographic specifications for connection establishment procedures. For example, a profile delivery system (e.g., the profile creation tool 316 shown in FIG. 3) may deliver validated profile specifications including cryptographic operation sequences and protocol parameters to the common API 1401 for utilization in subsequent connection establishment operations. This profile return enables systematic connection establishment through provision of appropriate cryptographic specifications optimized for current hardware and security requirements.

Figure 14E:
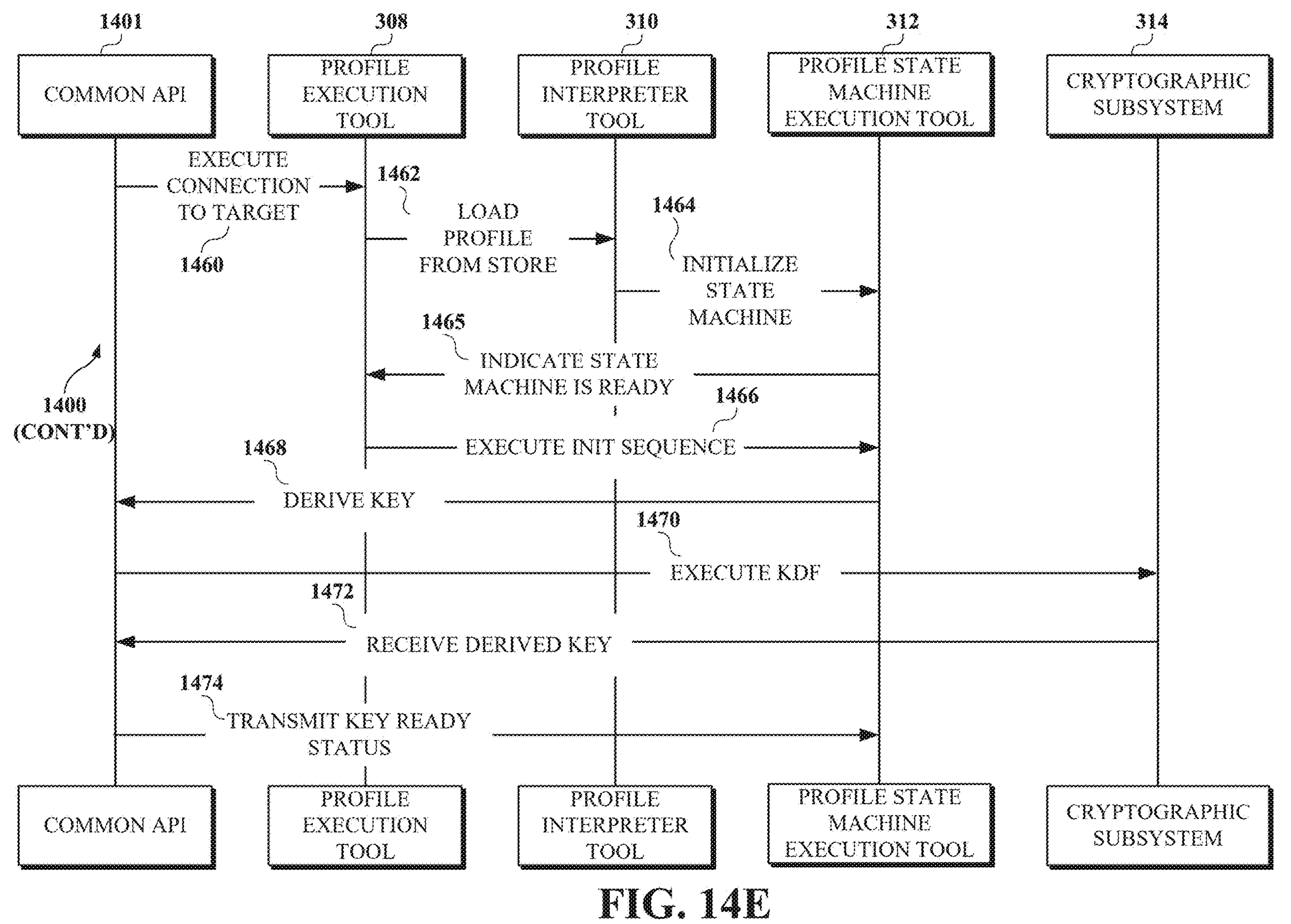
FIG. 14E demonstrates profile execution setup and protocol execution of initialization sequences including state machine preparation and key derivation operations.

FIG. 14E demonstrates profile execution setup and protocol execution of initialization sequences including state machine preparation and key derivation operations. The profile execution setup includes loading profiles into the interpreter for processing, initializing the state machine with appropriate execution contexts, and preparing for protocol execution through systematic component coordination. The protocol execution initialization includes executing profile-defined initialization sequences, performing handshake procedures with target servers, and handling profile-specific cryptographic operations according to established specifications.

At 1460, the technique 1400 executes connection to target by initiating secure communication establishment procedures with the designated server endpoint. For example, a connection execution coordinator (e.g., the common API 1401 shown in FIG. 3) may initiate connection establishment procedures through the profile execution tool 308 using validated profiles and configuration parameters to establish secure communication channels. This connection execution begins the active phase of secure communication establishment using validated profiles and system configurations.

At 1462, the technique 1400 loads a profile from store by retrieving validated cryptographic specifications for implementation and execution. For example, a profile loading system (e.g., the profile execution tool 308 shown in FIG. 3) may retrieve validated profile specifications from the profile interpreter tool 310 for parsing and state machine preparation procedures. This profile loading facilitates systematic profile implementation by providing cryptographic specifications to profile interpretation and execution systems.

At 1464, the technique 1400 initializes a state machine by preparing execution contexts and operational parameters for cryptographic protocol implementation. For example, a state machine initialization system (e.g., the profile interpreter tool 310 shown in FIG. 3) may configure the profile state machine execution tool 312 with profile-specific parameters, execution contexts, and state transition rules for systematic protocol execution. This state machine initialization facilitates systematic cryptographic protocol execution through preparation of appropriate execution environments and operational parameters.

At 1465, the technique 1400 indicates that the state machine is ready by signaling completion of initialization procedures and readiness for protocol execution. For example, a readiness signaling system (e.g., the profile state machine execution tool 312 shown in FIG. 3) may notify the profile execution tool 308 that state machine initialization has completed successfully and protocol execution procedures may commence. This readiness indication facilitates coordinated protocol execution by confirming successful state machine preparation and operational readiness.

At 1466, the technique 1400 executes an initialization sequence by performing foundational cryptographic setup operations required for secure communication establishment. For example, an initialization executor (e.g., the profile execution tool 308 shown in FIG. 3) may coordinate initial cryptographic operations through the profile state machine execution tool 312 including system parameter validation and preliminary security checks. This initialization sequence execution facilitates secure communication establishment by performing foundational cryptographic operations according to profile specifications.

At 1468, the technique 1400 derives a key by initiating key generation procedures required for secure communication operations. For example, a key derivation coordinator (e.g., the profile state machine execution tool 312 shown in FIG. 3) may request key derivation operations from the common API 1401 to generate cryptographic keys according to profile specifications and security requirements. This key derivation initiation facilitates secure communication by generating appropriate cryptographic key materials for connection establishment and data protection operations.

At 1470, the technique 1400 executes key derivation function (KDF) to generate cryptographic key materials. For example, a KDF executor (e.g., the common API 1401 shown in FIG. 3) may coordinate these operations through the cryptographic subsystem 314 to generate encryption keys, authentication keys, and integrity verification keys according to profile specifications. This KDF execution provides the cryptographic key materials required for secure communication establishment and ongoing data protection operations.

At 1472, the technique 1400 receives a derived key containing generated cryptographic key materials for utilization in secure communication operations. For example, a key reception system (e.g., the cryptographic subsystem 314 shown in FIG. 3) may deliver generated key materials including encryption keys and authentication keys to the common API 1401 for distribution to appropriate protocol execution components. This derived key reception facilitates secure communication by providing cryptographic key materials for connection establishment and data protection procedures.

At 1474, the technique 1400 transmits key ready status by signaling successful completion of key derivation procedures and readiness for protocol operations. For example, a key readiness coordinator (e.g., the common API 1401 shown in FIG. 3) may notify the profile state machine execution tool 312 that cryptographic key materials are available and protocol execution may proceed with handshake operations. This key ready status transmission facilitates coordinated protocol execution by confirming availability of required cryptographic materials for subsequent connection establishment procedures.

Figure 14F:
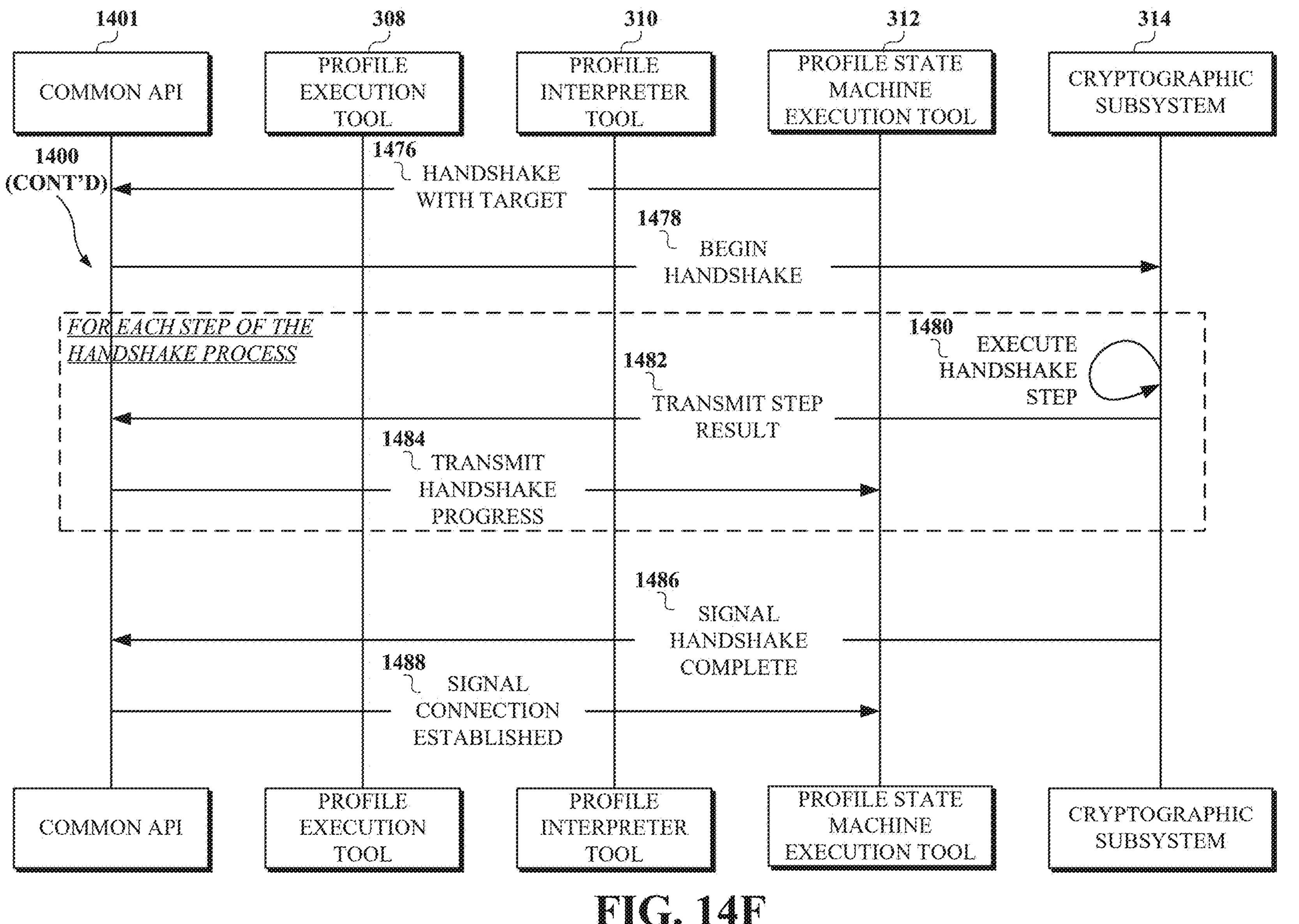
FIG. 14F illustrates protocol execution handshake sequences including cryptographic negotiation and authentication procedures.

FIG. 14F illustrates protocol execution handshake sequences including cryptographic negotiation and authentication procedures. The handshake execution involves systematic progression through multiple cryptographic negotiation steps, authentication challenge and response procedures, and coordination between client and server systems to establish secure communication channels according to profile specifications and security requirements.

At 1476, the technique 1400 performs handshake with target by initiating connection negotiation and authentication procedures with the designated server endpoint. For example, a handshake coordinator (e.g., the profile state machine execution tool 312 shown in FIG. 3) may initiate handshake protocol execution through the common API 1401 to establish secure communication channels with target servers according to profile specifications. This handshake initiation begins the interactive connection establishment phase including cryptographic negotiation and mutual authentication procedures.

At 1478, the technique 1400 begins handshake by starting cryptographic negotiation and authentication procedures with the target server. For example, a handshake initiator (e.g., the common API 1401 shown in FIG. 3) may coordinate handshake operations through the cryptographic subsystem 314 to execute certificate validation, key exchange, and authentication procedures according to profile specifications. This handshake beginning facilitates secure communication establishment through systematic execution of cryptographic negotiation and authentication protocols.

At 1480, the technique 1400 executes a handshake step by performing specific cryptographic operations required for connection negotiation and authentication. For example, a handshake step executor (e.g., the cryptographic subsystem 314 shown in FIG. 3) may execute certificate verification operations, key exchange computations, or authentication challenge responses according to handshake protocol requirements and profile specifications. This handshake step execution advances the connection establishment process through systematic completion of required cryptographic operations for each handshake phase.

At 1482, the technique 1400 transmits a step result by delivering handshake operation outcomes and continuation parameters for protocol progression. For example, a step result transmitter (e.g., the cryptographic subsystem 314 shown in FIG. 3) may deliver handshake step outcomes including validation results, computed values, and progression status to the common API 1401 for coordination with subsequent handshake operations. This step result transmission facilitates coordinated handshake progression by providing operation outcomes and status information for systematic protocol continuation.

At 1484, the technique 1400 transmits handshake progress by delivering status updates and progression information for connection establishment monitoring. For example, a progress transmitter (e.g., the common API 1401 shown in FIG. 3) may deliver handshake progression status including completed steps, pending operations, and estimated completion timing to the profile state machine execution tool 312 for coordination and monitoring. This handshake progress transmission facilitates systematic connection establishment monitoring and coordination throughout the handshake protocol execution process.

At 1486, the technique 1400 signals handshake complete by indicating successful completion of connection negotiation and authentication procedures. For example, a completion signaling system (e.g., the cryptographic subsystem 314 shown in FIG. 3) may notify the common API 1401 that handshake protocol execution has completed successfully and secure communication channels are ready for data exchange operations. This handshake completion signal facilitates transition to operational data exchange phases by confirming successful completion of connection establishment procedures.

At 1488, the technique 1400 signals connection established by indicating successful completion of secure communication channel establishment. For example, a connection establishment signaler (e.g., the common API 1401 shown in FIG. 3) may notify the profile state machine execution tool 312 that secure communication channels have been successfully established and data exchange operations may commence. This connection establishment signal facilitates transition to operational phases by confirming successful completion of all connection establishment procedures including handshake and channel setup operations.

Figure 14G:
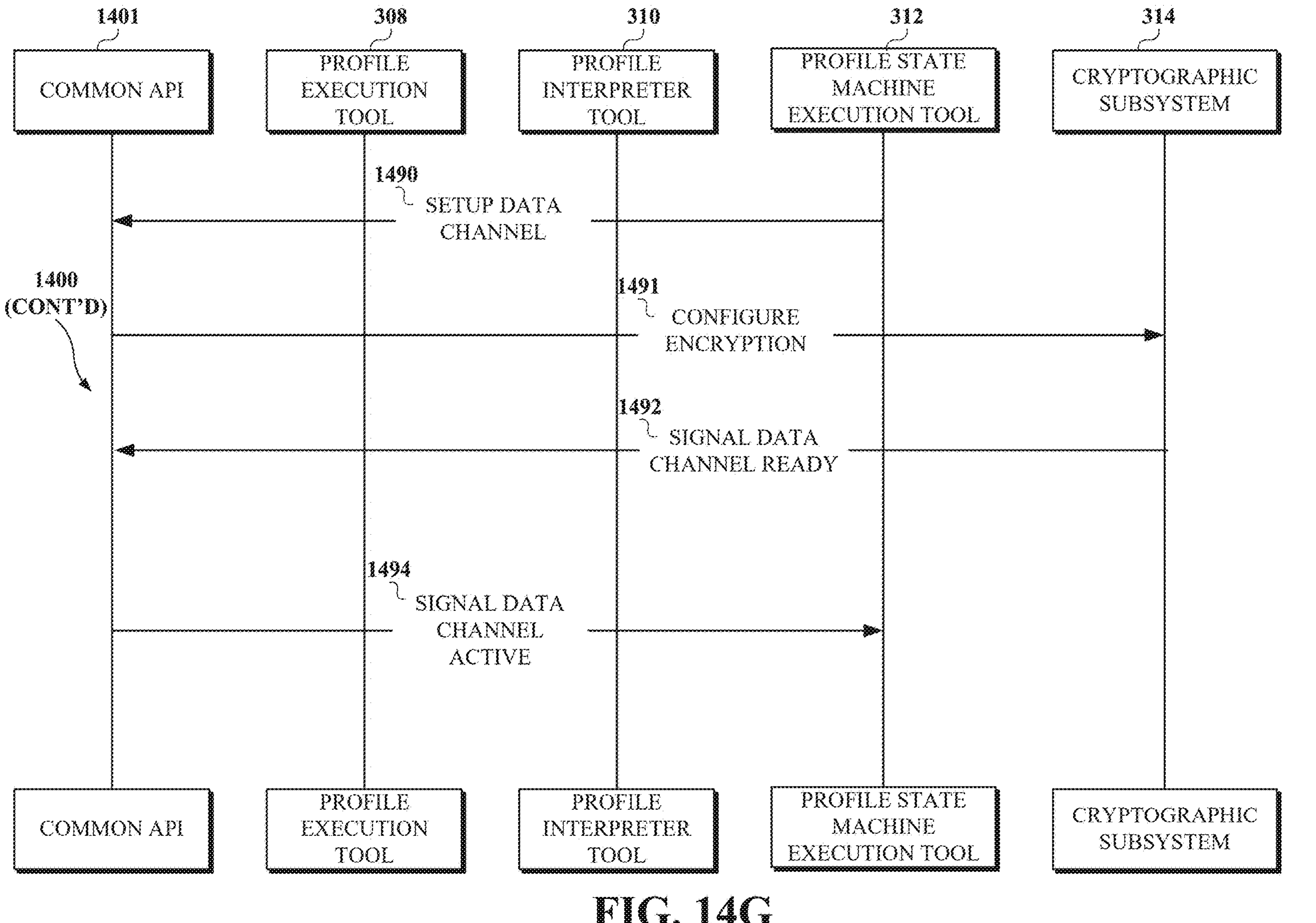
FIG. 14G depicts protocol execution data channel setup including encryption configuration and channel activation.

FIG. 14G depicts protocol execution data channel setup including encryption configuration and channel activation. The data channel establishment includes setup of encrypted data channels for operational communication, signaling of successful connection establishment to notify system components, and notification to users of connection readiness for secure data transmission and reception operations.

At 1490, the technique 1400 sets up a data channel by configuring secure communication channels for operational data exchange. For example, a data channel setup coordinator (e.g., the profile state machine execution tool 312 shown in FIG. 3) may initiate data channel configuration procedures through the common API 1401 to prepare encryption contexts and communication parameters for secure data transmission. This data channel setup facilitates operational communication by configuring secure channels according to established connection parameters and profile specifications.

At 1491, the technique 1400 configures encryption by establishing cryptographic parameters and contexts for secure data transmission. For example, an encryption configuration system (e.g., the common API 1401 shown in FIG. 3) may coordinate encryption setup procedures through the cryptographic subsystem 314 to configure data encryption algorithms, key contexts, and integrity verification mechanisms according to profile specifications. This encryption configuration facilitates secure data exchange by establishing appropriate cryptographic protections for operational communication channels.

At 1492, the technique 1400 signals data channel ready by indicating successful completion of encryption configuration and channel preparation procedures. For example, a channel readiness signaler (e.g., the cryptographic subsystem 314 shown in FIG. 3) may notify the common API 1401 that data channel encryption has been configured successfully and secure data transmission operations may commence. This data channel ready signal facilitates operational communication by confirming successful preparation of secure transmission capabilities according to established connection parameters.

At 1494, the technique 1400 signals data channel active by indicating operational readiness for secure data exchange operations. For example, a channel activation signaler (e.g., the common API 1401 shown in FIG. 3) may notify the profile state machine execution tool 312 that secure data channels are operational and ready for bidirectional data transmission between client and server endpoints. This data channel active signal completes the connection establishment process and facilitates transition to operational secure communication phases including data transmission, key rotation, and performance monitoring operations.

Figure 14H:
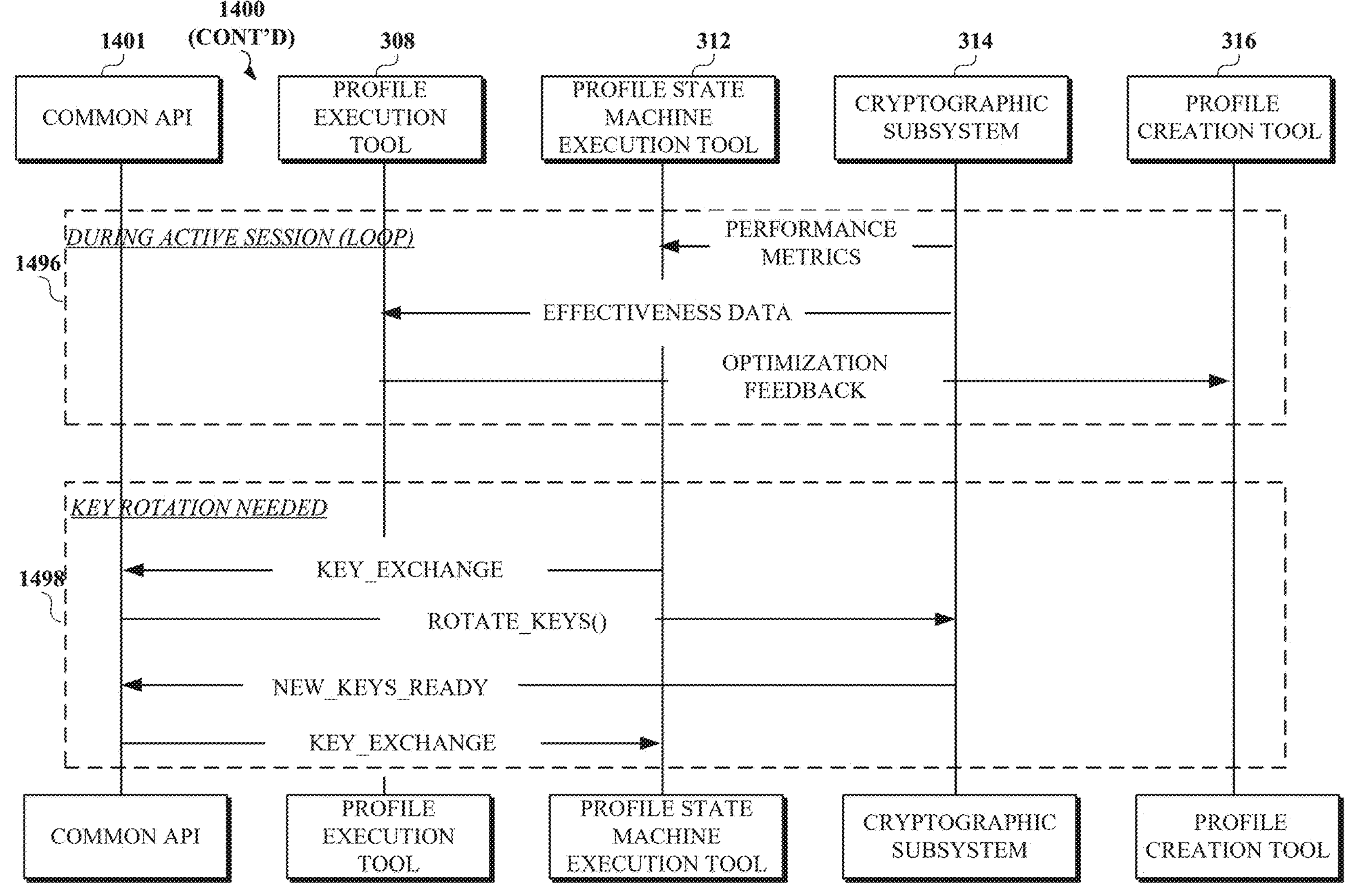
FIG. 14H shows background monitoring operations including performance assessment and optimization procedures.

FIG. 14H shows background monitoring operations including performance assessment and optimization procedures. The background monitoring includes continuous performance monitoring to assess connection effectiveness, key rotation procedures as needed to maintain security throughout connection lifecycles, and optimization feedback loops to improve system performance and adapt to changing operational requirements.

During active session operations (1496), the technique 1400 continuously collects performance metrics and effectiveness data to assess connection quality, throughput characteristics, and operational efficiency while providing optimization feedback to improve profile selection and system configuration for subsequent connections. When key rotation is needed (1498), the technique 1400 executes a coordinated key exchange sequence including key generation, rotation procedures, and installation of new cryptographic materials to maintain connection security throughout extended session lifecycles while facilitating seamless key transitions without interrupting ongoing data transmission operations.

Figure 15:
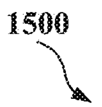
FIG. 15 is a flowchart of an example of a technique associated with capability-based secure communication channel establishment for client devices in dynamic cryptographic configuration systems.
Figure 15:
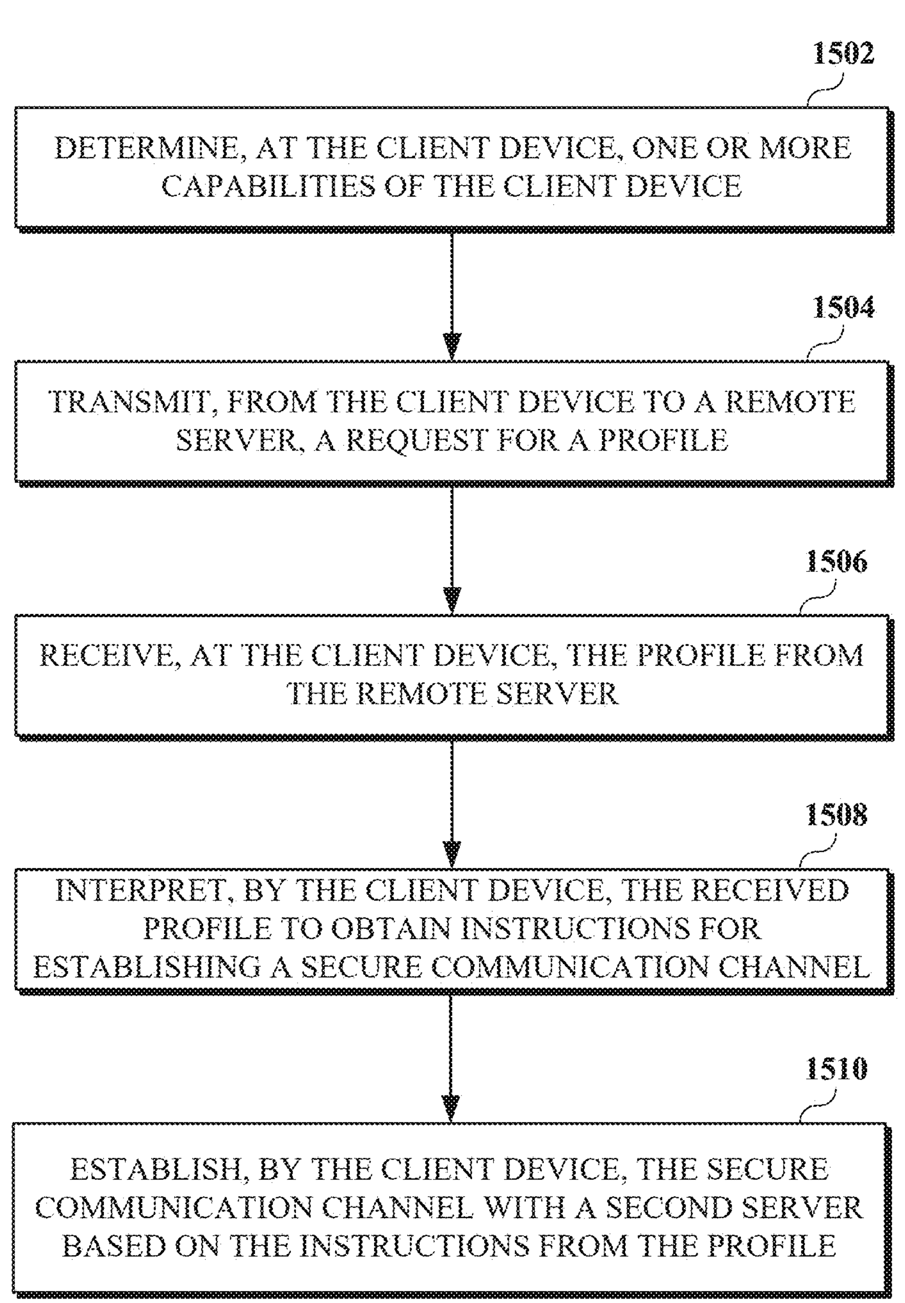
Figure 16:
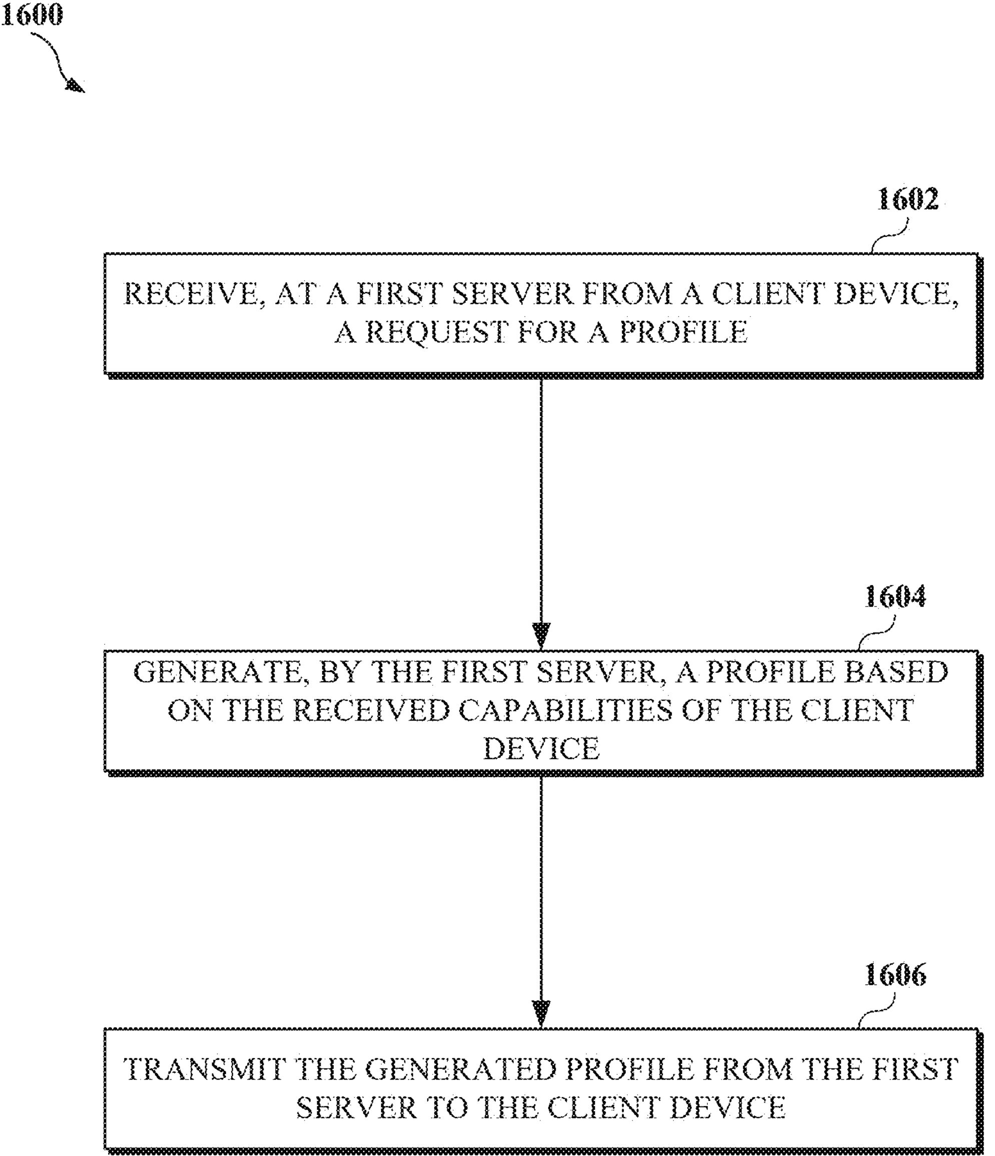
FIG. 16 is a flowchart of an example of a technique associated with dynamic cryptographic configuration in secure communication networks for providing security configurations to client devices.
Figure 17:
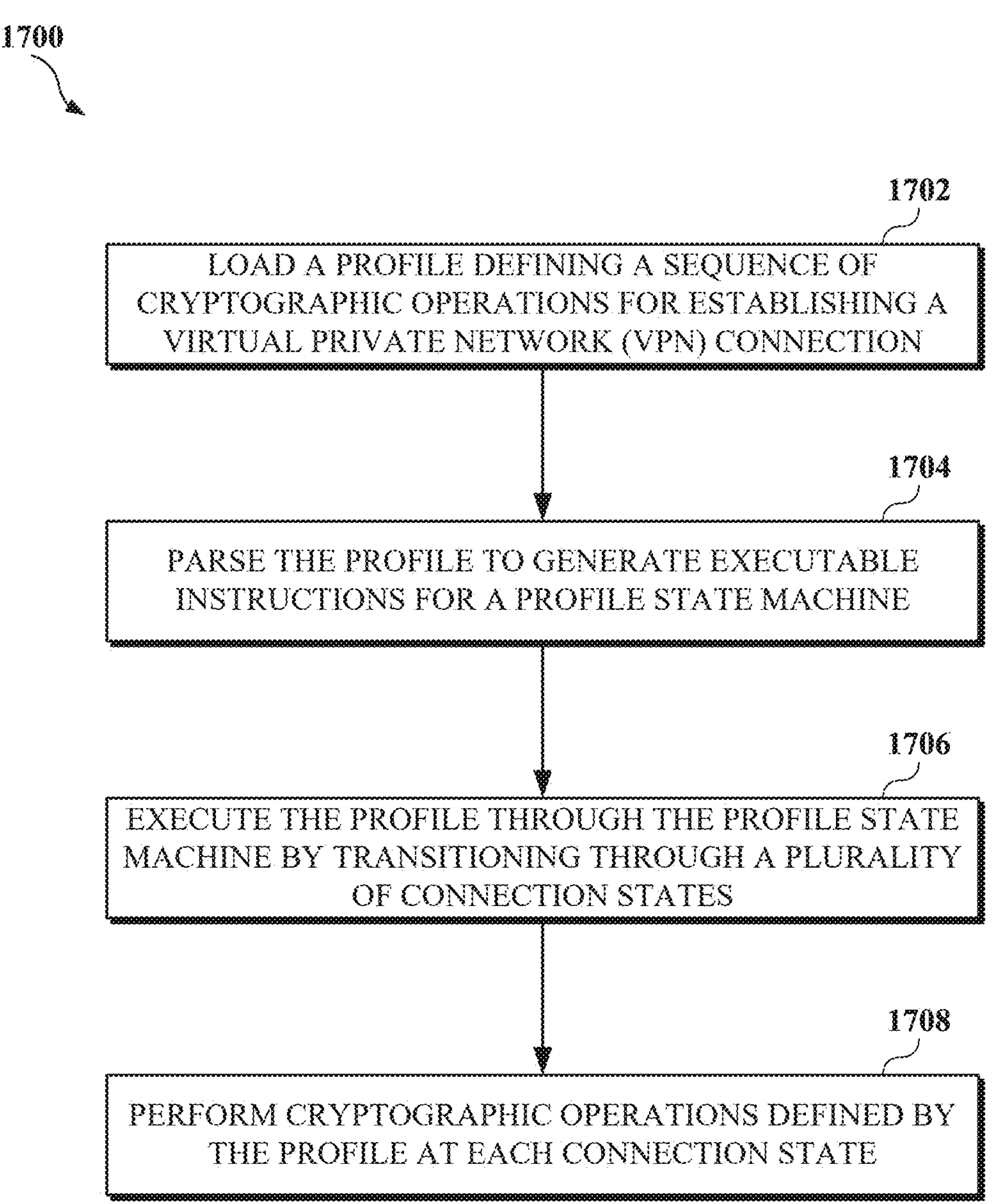
FIG. 17 is a flowchart of an example of a technique for state machine-driven secure VPN connection management.

To further describe some implementations in greater detail, reference is next made to examples of techniques which may be performed by or using dynamic cryptographic configuration systems in secure communication networks as described herein. FIG. 15 is a flowchart of an example of a technique 1500 associated with capability-based secure communication channel establishment for client devices in dynamic cryptographic configuration systems. FIG. 16 is a flowchart of an example of a technique 1600 associated with dynamic cryptographic configuration in secure communication networks for providing security configurations to client devices. FIG. 17 is a flowchart of an example of a technique 1700 for state machine-driven secure VPN connection management.

The techniques 1500, 1600, and 1700 can each be executed using computing devices, such as the systems, hardware, and software described with respect to FIGS. 1-14H. The techniques 1500, 1600, and 1700 can each be performed, for example, by executing a machine-readable program or other computer-executable instructions, such as routines, instructions, programs, or other code. The steps, or operations, of each of the techniques 1500, 1600, and 1700, or another technique, method, process, or algorithm described in connection with the implementations disclosed herein can be implemented directly in hardware, firmware, software executed by hardware, circuitry, or a combination thereof.

For simplicity of explanation, the techniques 1500, 1600, and 1700 are each depicted and described herein as a respective series of steps or operations. However, the steps or operations of the techniques 1500, 1600, and 1700 can occur in various orders and/or concurrently. Additionally, other steps or operations not presented and described herein may be used. Furthermore, not all illustrated steps or operations may be required to implement a technique in accordance with the disclosed subject matter.

Referring now to FIG. 15, at 1502, the technique 1500 determines one or more capabilities of the client device. For example, a testing tool (e.g., the testing tool 320 shown in FIG. 3) may execute hardware capability detection procedures to identify processor architecture, available cryptographic acceleration features, memory configurations, and specialized hardware security modules. The capability determination may include executing comprehensive hardware detection procedures as described in technique 400, where the system evaluates trigger conditions such as fresh installations, hardware updates, or on-demand testing requests. In some implementations, the capability determination may include performing benchmark tests to measure cryptographic operation performance, identifying available instruction sets such as AES-NI or Arm v8-A Cryptographic Extension, and assessing hardware acceleration capabilities. The testing may include evaluating symmetric and asymmetric encryption performance, hash function throughput, and random number generation capabilities. Hardware capability data may be cached using hardware identifier (HWID) verification to optimize subsequent capability assessments and avoid redundant testing operations.

At 1504, the technique 1500 transmits a request for a profile from the client device to a remote server. The request may include information related to the determined capabilities For example, a profile creation tool (e.g., the profile creation tool 316 shown in FIG. 3) may communicate with server infrastructure to obtain profiles optimized for the determined hardware capabilities. The request may include detailed hardware specifications, performance characteristics, security preferences, and operational context information such as corporate versus personal usage scenarios. The request may include processor type specifications, memory configuration details, and presence indicators for hardware-based cryptographic accelerators such as Trusted Platform Module capabilities. The request transmission may follow the profile creation procedures described in technique 600, where the system evaluates local profile availability before engaging server-side generation services. Network performance metrics may also be included in the request, such as measured latency and bandwidth characteristics that influence profile optimization decisions.

At 1506, the technique 1500 receives the profile from the remote server. For example, a profile reception system (e.g., the profile creation tool 316 shown in FIG. 3) may obtain customized cryptographic specifications that define communication parameters based on the client device capabilities. The profile may be generated through multiple pathways as described in technique 1200, including selection from predefined templates, adaptation of existing profiles for hardware constraints, or custom generation using machine learning models when standard profiles are insufficient. The received profile may specify cryptographic algorithms, key exchange methods, digital signature algorithms, and hashing algorithms optimized for the client hardware configuration. The profile may include specific cryptographic libraries required for algorithm execution, fallback profiles for error conditions, and rules for error handling during connection establishment. The profile may be digitally signed and include expiration times to maintain security currency.

At 1508, the technique 1500 interprets the received profile to obtain connection establishment instructions. For example, a profile interpreter tool (e.g., the profile interpreter tool 310 shown in FIG. 3) may parse profile specifications and transform them into executable instructions for state machine execution. The interpretation process may follow the procedures described in technique 800, including profile format parsing, metadata extraction, version compatibility checking, and content parsing for initialization sequences, handshake flows, and cryptographic operations. In some implementations, the interpretation may include validating profile syntax and version compatibility, parsing ordered sequences of cryptographic operations, and validating that specified algorithms are compatible with determined client capabilities. The interpretation may include algorithm substitution when specified algorithms are unavailable, hardware adaptation to optimize performance, and security component validation to verify cryptographic strength against established policies.

At 1510, the technique 1500 establishes the secure communication channel with a second server based on the interpreted instructions. For example, a profile state machine execution tool (e.g., the profile state machine execution tool 312 shown in FIG. 3) may execute cryptographic protocols through systematic state transitions as described in technique 900. The connection establishment may include executing state machine transitions through initialization, handshake, data exchange, and termination states according to profile specifications. The establishment may include initiating handshake sequences with key exchange operations, executing state machines with multiple connection phases, and performing cryptographic operations orchestrated by the profile state machine. The establishment process may include server key generation, handshake protocol execution with certificate validation, and data channel setup with encryption configuration. Performance monitoring may be implemented during connection operation to assess effectiveness and identify optimization opportunities for subsequent connections.

Referring now to FIG. 16, at 1602, the technique 1600 receives a request for a profile from a client device. For example, a profile tool (e.g., the profile tool 332 shown in FIG. 3) may obtain client requests that include hardware capability specifications, performance characteristics, and operational requirements for profile generation. The request may include detailed information about client device capabilities such as processor type specifications, memory configuration details, presence of hardware-based cryptographic accelerators, and network performance metrics including latency and bandwidth measurements. In some implementations, the request may follow the client requirements parsing procedures described in technique 1200, where the server extracts connection specifications, security preferences, and hardware capabilities from incoming profile requests. The request may include authentication credentials for client verification and organizational context information that influences profile generation decisions according to established security policies.

At 1604, the technique 1600 generates a profile based on the received client capabilities. For example, a profile generation system (e.g., the profile tool 332 shown in FIG. 3) may create customized specifications through multiple pathways including template selection, profile adaptation, or machine learning-based custom generation. The generation process may follow the comprehensive procedures described in technique 1200, including checking profile databases for existing compatible profiles, determining whether custom profile generation is required, and utilizing machine learning models when standard profiles are insufficient. The generation may include selecting profiles from predefined templates and customizing them based on received capabilities, or providing capabilities as input to machine learning models when no pre-existing profiles are compatible. The generated profile may include a set of instructions specifying ordered sequences of cryptographic operations, parameters for key exchange protocols, and configurations optimized for the client's hardware architecture and security requirements.

At 1606, the technique 1600 transmits the generated profile to the client device. For example, a profile transmission system (e.g., the profile tool 332 shown in FIG. 3) may deliver complete profile packages including implementation code, validation data, and documentation to requesting clients through secure communication channels. The transmission may follow the procedures described in technique 1200, including profile finalization, digital signing for authenticity verification, and secure delivery coordination with client-side components. The transmission may include compressed profile data to reduce bandwidth utilization, encrypted responses for secure delivery, and integrity verification information to facilitate client-side validation procedures. The transmitted profile may enable the client device to establish secure communication channels with target servers according to the customized instructions and optimized parameters specified in the generated profile.

Referring now to FIG. 17, at 1702, the technique 1700 loads a profile defining a sequence of cryptographic operations for establishing a virtual private network (VPN) connection. For example, a client device may load a profile that specifies the cryptographic algorithms, key exchange protocols, and security parameters needed for VPN establishment. Loading the profile may include retrieving a cached version of a previously validated profile from a local store and verifying an integrity hash of the cached profile before execution. The cached profile may be stored in non-volatile memory on the client device, allowing for faster connection establishment on subsequent attempts. Alternatively, the profile may be downloaded from a remote server or profile repository.

Prior to loading the profile, the client device may determine hardware capabilities of the device including detecting presence of cryptographic acceleration features and select the profile from a plurality of available profiles based on the determined hardware capabilities. The selected profile may specify cryptographic algorithms optimized for the detected acceleration features, such as AES-NI for hardware-accelerated encryption or specialized instructions for elliptic curve cryptography. The client device may also initialize a cryptographic subsystem prior to execution, where the cryptographic subsystem implements dynamic loading of native or virtual machine cryptographic libraries based on hardware capability. This enables the client device to adapt to different hardware configurations so that available acceleration features can be leveraged.

At 1704, the technique 1700 parses the profile to generate executable instructions for a profile state machine. For example, the client device may parse the profile to extract the sequence of cryptographic operations and translate them into a format that can be executed by the state machine. Parsing the profile may include validating syntax and version compatibility and translating profile definitions into cryptographic instruction sequences optimized for a hardware architecture of the device. The parsing operation may verify that the profile conforms to a defined schema or specification and that the version of the profile is compatible with the client device's software. The translation process may generate optimized instruction sequences that take advantage of hardware-specific features, such as vectorized instructions for cryptographic operations or hardware security modules.

The client device may validate profile security parameters prior to execution, including verifying algorithm strength against a security policy and confirming compatibility with detected hardware acceleration features. For example, the technique 1700 may check that encryption algorithms meet minimum key length requirements or that hashing algorithms satisfy organizational security policies. Alternative implementations may include pre-compiling profile instructions during an installation phase or using just-in-time compilation techniques to optimize performance.

At 1706, the technique 1700 executes the profile through the profile state machine by transitioning through a plurality of connection states. Each connection state may correspond to a different phase of VPN connection establishment. The profile state machine may include the plurality of connection states including an initialization state, a handshake state, a data exchange state, and a termination state, where each state defines state specific cryptographic operations. The initialization state may prepare cryptographic contexts and allocate resources needed for the connection. The handshake state may include instructions for performing certificate validation, key exchange messaging with a remote server, and authentication of session parameters before proceeding to data exchange.

For example, during the handshake state, the client device may validate the certificate of the server, perform a Diffie-Hellman key exchange, and authenticate using credentials or pre-shared keys. The data exchange state may handle ongoing encrypted communication between the client and server. The termination state may securely close the connection and clean up resources. Executing the profile through the profile state machine may include maintaining an execution context containing runtime data structures and cryptographic parameters, transitioning between connection states based on completion status of the cryptographic operations, and upon detecting a state transition failure, executing error handling procedures defined within the profile to attempt recovery before terminating the VPN connection. The execution context may store session keys, cipher states, sequence numbers, and other data needed to maintain the connection.

The technique 1700 may also monitor execution of the profile state machine and in response to detecting a connection failure, select a fallback profile for attempting connection establishment. The fallback profile may use more widely supported cryptographic algorithms or relaxed security parameters to increase compatibility. In some examples, the technique 1700 may execute the fallback profile through the profile state machine, where the fallback profile is configured to prioritize compatibility and basic functionality over performance optimization, and establish the secure VPN connection using the fallback profile in response to failure in execution of the profile.

At 1708, the technique 1700 performs cryptographic operations defined by the profile at each connection state. The cryptographic operations may be orchestrated by the profile state machine to establish a secure VPN connection. Performing the cryptographic operations may include executing, at the data exchange state, encryption, decryption, and periodic key rotation operations as defined by the profile. For example, the client device may encrypt outgoing packets, decrypt incoming packets, and periodically rotate session keys to maintain forward secrecy. Executing the key rotation operations may include generating new keys, coordinating key updates with a remote endpoint, and updating encryption and decryption contexts to maintain session continuity.

The key rotation process may occur at predetermined intervals, after a certain volume of data has been transmitted, or in response to security events. The client device may use a key derivation function to generate new encryption and authentication keys from a master secret. Coordination with the remote endpoint may involve handshake messages to synchronize the key transition and avoid packet loss during the rotation.

The technique 1700 may also collect performance metrics during the data exchange state, evaluate whether the collected metrics indicate suboptimal performance, and in response to detecting suboptimal performance, request a modified profile from a server infrastructure for subsequent connection attempts. Performance metrics may include throughput, latency, packet loss rates, CPU utilization, or cryptographic operation times. If performance falls below acceptable thresholds, the client device may request a profile with different cryptographic algorithms or parameters that may provide better performance for the current network conditions or hardware capabilities.

In implementations of the disclosure, software component updating may be optimized through hash-based comparison mechanisms that minimize unnecessary downloads. Some implementations may include determining hash values of local software versions, transmitting update check requests that include local hash values, receiving server responses containing corresponding server-side hash values, comparing hash values at client devices, and initiating downloads only when hash differences indicate that updates are required.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a CPU, a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, implemented by a client device for establishing a secure communication channel from the client device, the method comprising:
 - transmitting, to a remote server, a request for a security profile, the request including information related to one or more capabilities of the client device;
 - receiving the security profile from the remote server, wherein the security profile defines a set of communication parameters based on at least some of the one or more capabilities, the security profile comprising, within itself, an ordered sequence of cryptographic operations, protocols, and parameters specifying how to establish the secure communication channel;
 - interpreting the received security profile by:
   - parsing a handshake flow specified within the security profile, the handshake flow defining negotiation and authentication procedures for establishing the secure communication channel;
   - parsing a cryptographic operations order specified within the security profile, the cryptographic operations order specifying a sequence of cryptographic operations to be performed for establishing the secure communication channel; and
   - generating instructions from the parsed security profile for executing the cryptographic operations order to establish the secure communication channel; and
 - establishing the secure communication channel with a second server based on the generated instructions.

2. The method of claim 1, further comprising:
 - determining the one or more capabilities of the client device by performing a hardware detection process that identifies at least one of a central processing unit type, memory configuration, or available cryptographic hardware acceleration.

3. The method of claim 1, wherein the security profile includes a specific cryptographic algorithm and a corresponding cryptographic library required to execute the specific cryptographic algorithm, the method further comprises:
 - prior to establishing the secure communication channel, verifying a presence of the corresponding cryptographic library on the client device; and
 - downloading the corresponding cryptographic library from an update server based on a determination that the corresponding cryptographic library is not present.

4. The method of claim 3, wherein downloading the corresponding cryptographic library comprises:
 - transmitting a request to download a native version of the corresponding cryptographic library optimized for a specific hardware architecture of the client device; and
 - based on a determination that the native version is unavailable or fails to load, transmitting another request to download a virtual machine based version of the corresponding cryptographic library.

5. The method of claim 3, wherein downloading the corresponding cryptographic library comprises:
 - sending another request for the corresponding cryptographic library that specifies a target architecture of the client device; and
 - receiving a version of the corresponding cryptographic library compiled for the specified target architecture.

6. The method of claim 1, further comprising:
 - caching the received security profile on the client device; and
 - using the cached security profile for subsequent connection attempts without requesting a new security profile from the remote server.

7. The method of claim 1, further comprising:
 - maintaining a cache of multiple security profiles including a fallback security profile; and
 - upon failure to establish the secure communication channel using the security profile, selecting and executing the fallback security profile from the cache.

8. A device, comprising:
 - a memory subsystem; and
 - processing circuitry, the processing circuitry configured to execute instructions stored in the memory subsystem to:
   - transmit, to a remote server, a request for a security profile, the request including information related to one or more capabilities of the device;
   - receive the security profile from the remote server, wherein the security profile defines a set of communication parameters based on at least some of the one or more capabilities, the security profile comprising, within itself, an ordered sequence of cryptographic operations, protocols, and parameters specifying how to establish a secure communication channel;
   - interpret the received security profile by instructions to:

parse a handshake flow specified within the security profile, the handshake flow defining negotiation and authentication procedures for establishing the secure communication channel;

parse a cryptographic operations order specified within the security profile, the cryptographic operations order specifying a sequence of cryptographic operations to be performed for establishing the secure communication channel; and generate instructions from the parsed security profile for executing the cryptographic operations order to establish the secure communication channel; and establish the secure communication channel with a second server based on the generated instructions.

9. The device of claim 8, wherein, to establish the secure communication channel, the processing circuitry is configured to execute instructions in the memory subsystem to:

initiate a handshake sequence with the second server according to the handshake flow specific within the security profile, wherein the handshake sequence includes key exchange operations and wherein the security profile specifies parameters for the key exchange operations, including key type and key length.

10. The device of claim 8, wherein the set of communication parameters in the security profile includes at least one of an encryption algorithm, a hashing algorithm, a key exchange method, and a digital signature algorithm.

11. The device of claim 8, the processing circuitry further configured to execute instructions in the memory subsystem to:

after establishing the secure communication channel, monitor performance metrics of the secure communication channel; and transmit a second request to the remote server for a revised security profile to optimize the secure communication channel based on the performance metrics.

12. The device of claim 8, wherein the processing circuitry is configured to:

interpret error handling sequences defined within the security profile; and implement recovery mechanisms based on the error handling sequences during connection establishment.

13. The device of claim 8, wherein, to interpret the received security profile, the processing circuitry is configured to execute instructions stored in the memory subsystem to:

validate that cryptographic algorithms specified in the security profile are compatible with the one or more capabilities of the device; and verify cryptographic strengths of the cryptographic algorithms against a security policy.

14. One or more non-transitory computer-readable storage media comprising instructions that, when executed by one or more processors, perform operations for establishing a secure communication channel from a client device, the operations comprising:

transmitting, to a remote server, a request for a security profile, the request including information related to one or more capabilities of the client device;

receiving the security profile from the remote server, wherein the security profile defines a set of communication parameters based on at least some of the one or more capabilities, the security profile comprising, within itself, an ordered sequence of cryptographic operations, protocols, and parameters specifying how to establish the secure communication channel;

interpreting the received security profile by:

parsing a handshake flow specified within the security profile, the handshake flow defining negotiation and authentication procedures for establishing the secure communication channel;

parsing a cryptographic operations order specified within the security profile, the cryptographic operations order specifying a sequence of cryptographic operations to be performed for establishing the secure communication channel; and generating instructions from the parsed security profile for executing the cryptographic operations order to establish the secure communication channel; and establishing the secure communication channel with a second server based on the generated instructions.

15. The one or more non-transitory computer-readable storage media of claim 14, wherein the operations further comprising:

determining the one or more capabilities of the client device by performing a hardware detection process that identifies at least one of a central processing unit type, memory configuration, or available cryptographic hardware acceleration.

16. The one or more non-transitory computer-readable storage media of claim 14, wherein the security profile includes a specific cryptographic algorithm and a corresponding cryptographic library required to execute the specific cryptographic algorithm, the operations further comprise:

prior to establishing the secure communication channel, verifying a presence of the corresponding cryptographic library on the client device; and downloading the corresponding cryptographic library from an update server based on a determination that the corresponding cryptographic library is not present.

17. The one or more non-transitory computer-readable storage media of claim 16, wherein downloading the corresponding cryptographic library comprises:

transmitting a request to download a native version of the corresponding cryptographic library optimized for a specific hardware architecture of the client device; and based on a determination that the native version is unavailable or fails to load, transmitting another request to download a virtual machine based version of the corresponding cryptographic library.

18. The one or more non-transitory computer-readable storage media of claim 17, wherein downloading the required cryptographic library comprises:

sending another request for the corresponding cryptographic library that specifies a target architecture of the client device; and receiving a version of the corresponding cryptographic library compiled for the target architecture.

19. The method of claim 1, wherein interpreting the received security profile further comprises:

parsing error handling rules specified within the security profile, the error handling rules defining recovery procedures for error conditions arising during establishment of the secure communication channel; and implementing a recovery mechanism based on the parsed error handling rules upon detecting an error condition during establishment of the secure communication channel.

20. The method of claim 1, wherein interpreting the received security profile further comprises:

validating that cryptographic algorithms specified within the security profile are compatible with the one or more capabilities of the client device; and performing algorithm substitution by identifying a compatible alternative algorithm when a cryptographic algorithm specified within the security profile is unavailable on the client device.

* * * * *